(12) United States Patent
Lyons et al.

(10) Patent No.: US 6,208,266 B1
(45) Date of Patent: Mar. 27, 2001

(54) REMOTE DATA ACQUISITION AND PROCESSING SYSTEM

(75) Inventors: Michael J. Lyons, Voluntown, CT (US); Barry C. Sauls, Manchester; Wayne A. Mitzen, Merrimack, both of NH (US); Douglas K. Bostrom, Atlanta, GA (US); Charles E. Richardson, Chapel Hill, NC (US)

(73) Assignee: Scientific Telemetry Corporation, Middleboro, MA (US)

( * ) Notice: Subject to any disclaimer, the term of this patent is extended or adjusted under 35 U.S.C. 154(b) by 0 days.

(21) Appl. No.: 08/847,871

(22) Filed: Apr. 28, 1997

Related U.S. Application Data

(63) Continuation-in-part of application No. 08/518,321, filed on Aug. 23, 1995.

(51) Int. Cl.[7] .................................................. G08B 23/00
(52) U.S. Cl. ............................... 340/870.02; 340/870.01; 348/160; 382/100
(58) Field of Search ...................... 340/870.02, 870.03, 340/870.01; 382/100; 348/100

(56) References Cited

U.S. PATENT DOCUMENTS

| | | | |
|---|---|---|---|
| 4,646,084 | * | 2/1987 | Burrowes ........................ 340/870.03 |
| 4,680,704 | * | 7/1987 | Konicek .......................... 340/870.02 |
| 4,817,131 | | 3/1989 | Thornborough et al. ............. 379/107 |
| 4,866,761 | | 9/1989 | Thornborough et al. ............. 379/107 |
| 5,140,351 | | 8/1992 | Garcia et al. ......................... 385/117 |
| 5,298,894 | | 3/1994 | Cerny et al. ..................... 340/870.02 |
| 5,430,430 | * | 7/1995 | Gilbert ............................ 340/870.02 |
| 5,673,331 | * | 9/1997 | Lewis .............................. 340/870.02 |
| 5,764,158 | * | 6/1998 | Franklin .......................... 340/870.02 |
| 5,870,140 | * | 2/1999 | Gillberry ......................... 340/870.02 |
| 5,923,269 | * | 7/1999 | Shuey .............................. 340/870.02 |
| 5,933,092 | * | 8/1999 | Ouellette ......................... 340/870.02 |

OTHER PUBLICATIONS

Intellon; "SCC CB01RF CEBus RF Carrier Board"; Mar. 1996; Intellon.
Intellon; "Technical Data Sheet—SSC R400 RF Network Interface Controller"; Aug. 1996; pp. 1–40; Intellon.
Motorola "Motorola Semiconductor Technical Data—MRFIC0903"; Date unknown; place of publication unknown.
Motorola; "General Purpose RF Cascode Amplifier—MRFIC0916"; Motorola Semiconductor Technical Data.
Motorola; "900 MHz Transmit Mixer—MRFIC2002"; Motorola Semiconductor Technical Data.
Motorola; "900 MHz LDMOS Integrated Power Amplifier—MRFIC0914"; 1996; pp. 1–5; Motorola.
Motorola; "GHz PLL Frequency Sunthesizers—MC145191"; 1995; pp. 1–23; Motorola.
Motorola; "Low Power DC—1.8 GHz LNA, Mixer and VCO"; pp.1–3; 1996; Motorola.
Intellon Corporation; "CELinx rf Spread Spectrum Carrier RF Transceiver"; 1995; pp. 1–15; Intellon Corporation.
Intellon; "Marketing Bulletin for RF Spread Spectrum Technology"; Intellon Corporation.

* cited by examiner

*Primary Examiner*—Michael Horabik
*Assistant Examiner*—Albert K. Wong
(74) *Attorney, Agent, or Firm*—Nixon Peabody LLP; Grant E. Pollack

(57) ABSTRACT

A remote data acquisition and processing system is provided. One embodiment of the system of the present invention for use in monitoring utility operation includes at least one optical imaging device for generating computer-readable image data of a visual representation, generated by a utility meter, of utility operation-related data. A host processor, which is remotely located from the optical imaging device and the utility meter, is also provided in this embodiment of the present invention for generating the utility operation-related data from the image data and for storing the image data.

15 Claims, 38 Drawing Sheets

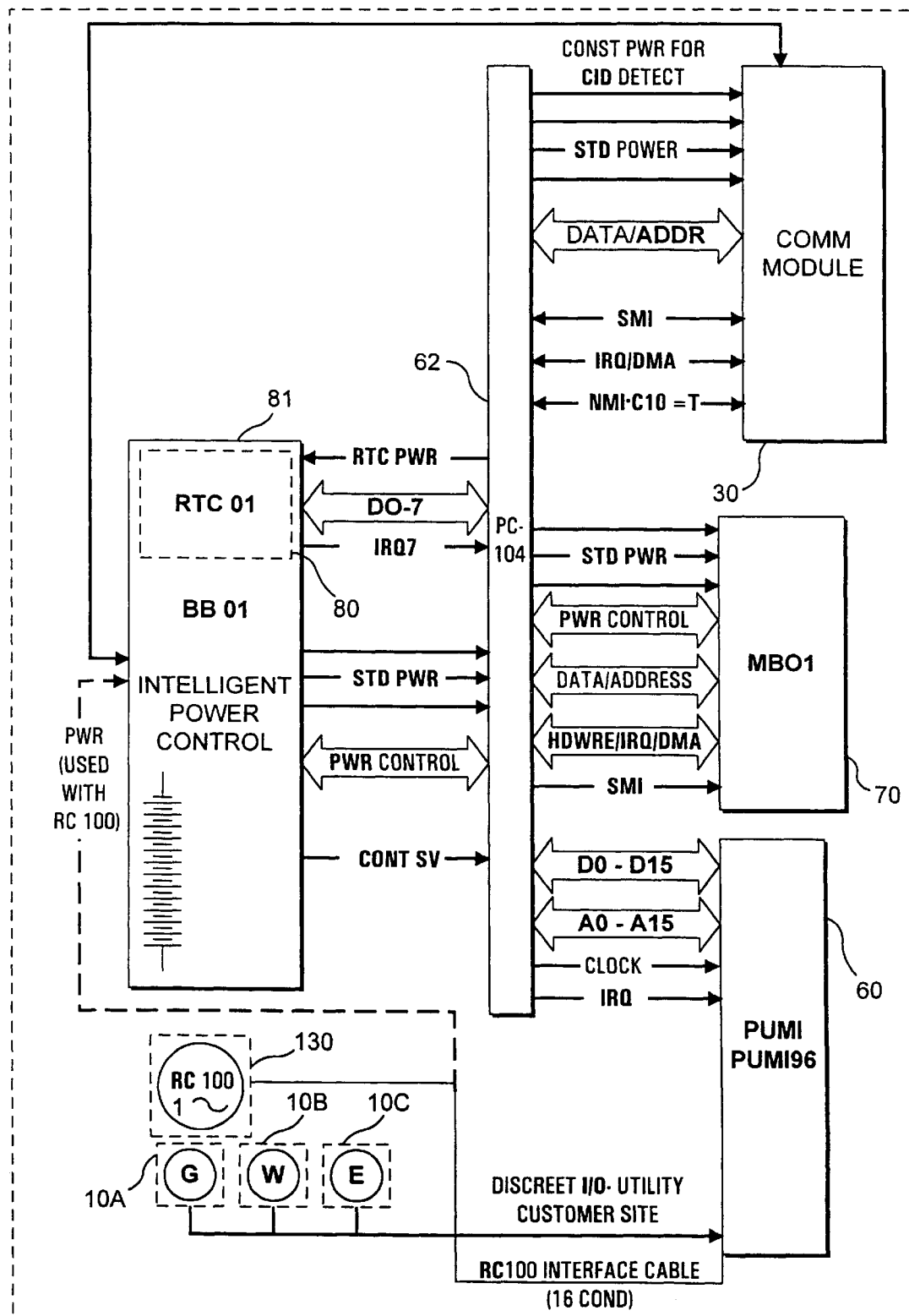
F I G. 7

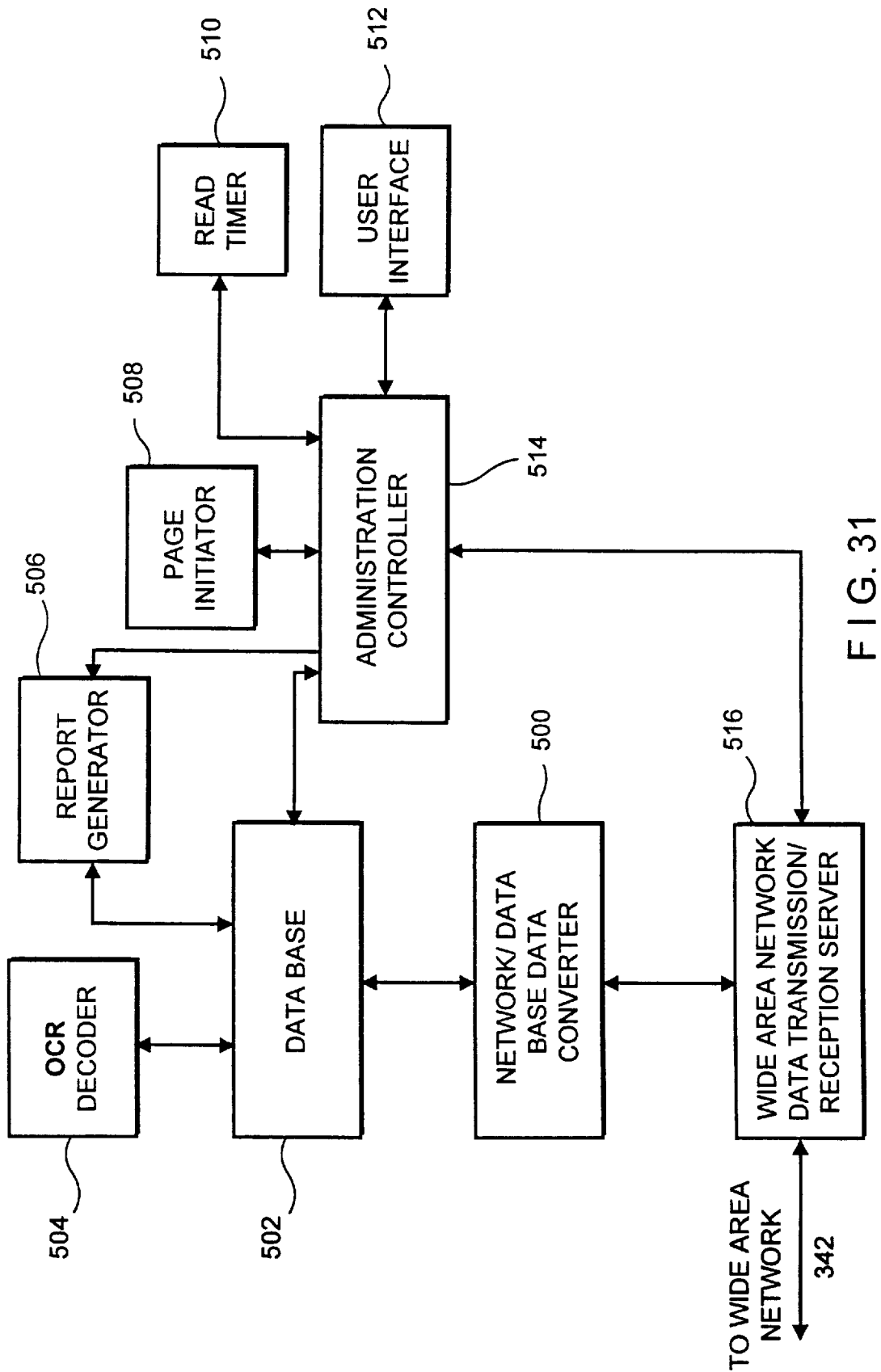
F I G. 31

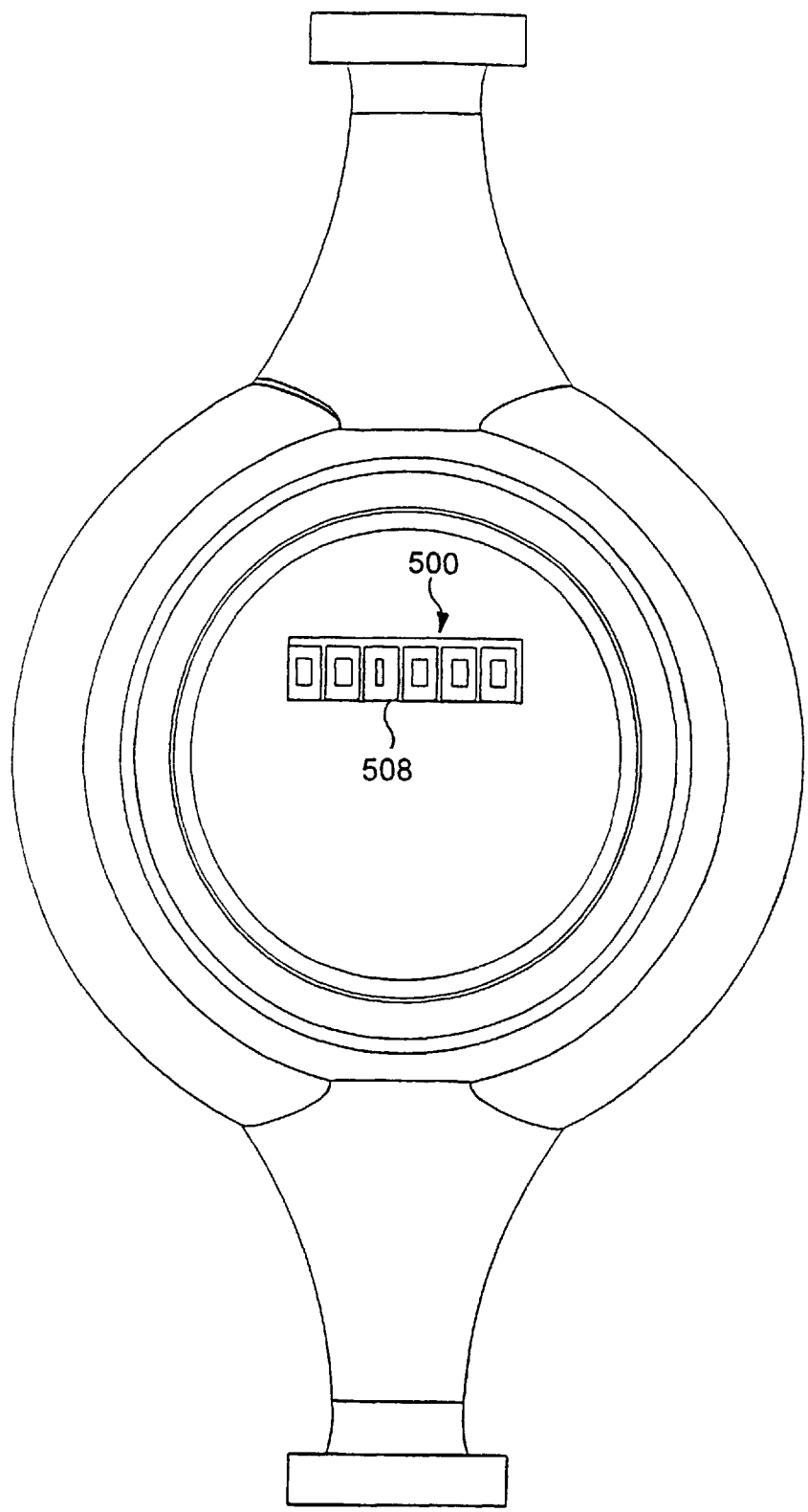
F I G. 32

REMOTE DATA ACQUISITION AND PROCESSING SYSTEM

This application is a continuation-in-part of copending application Ser. No. 08/518,321, filed Aug. 23, 1995, entitled "Modular System For Automatically And Remotely Monitoring And Managing Utility Consumption."

BACKGROUND OF THE INVENTION

1. Field of the Invention

The present invention relates generally to a distributed, information gathering and processing system, and more specifically, to such a system for remotely acquiring and processing data related to a phenomenon or phenomena being monitored by metering devices. Although the present invention has particular usefulness in the area of acquiring and processing utility service consumption and/or distribution information, and will be described in connection with same, other uses are contemplated for the present invention, including remote acquisition and processing of data from distributed pollution monitoring devices for use e.g. in pollution analysis and/or control applications, remote acquisition and processing of information related to vending machine usage and/or operation, and other uses.

2. Brief Description of Related Prior Art

Utility companies, such as those providing electric, gas and water service, measure the consumption of their respective services by customers via meters attached to the customer premises. Such meters continually monitor and record the amount of the service in question consumed by a particular customer and such measurements are used by the utility company for billing and system management purposes. Two types of conventional utility meters exist: machine readable and non-machine-readable type meters.

Machine-readable utility meters typically come in one of two types, pulse/Hall effect and encoder type meters. Pulse and encoder meters are considered machine readable because they produce a signal corresponding to the amount of utility service used by a particular customer, which signal can be read mechanically and/or electronically.

Pulse type meters, e.g., water meters, utilize a pulse generated by an internally mounted magnet coupled to the meter vane; each pulse corresponds to one unit of utility consumption. The pulses are used to increment a mechanical counter or odometer mounted outside of the customer premises.

Encoder type meters have a digital circuit board built into the meter's register head which is used to electronically measure the level of customer utility consumption. The digital circuit board is wired to an externally mounted induction-coupled or standard pin-type receptacle. The meter is read by inserting a data collection device, also known as a gun, into the receptacle. The gun sends a signal into the meter which in turn causes the meter to send a digital representation of the current meter reading into the gun where it is stored. The information can later be downloaded to a utility company computer to process same.

Non-machine-readable meters consist of those meters that can only be read via visual inspection of meter display mechanisms (e.g., analog dials and/or alphanumeric digital displays located on the meter faces).

One typical system utilized by utility companies for accessing utility usage information requires one or more human meter readers to visit every customer premises and physically read each customer's utility meter, whether by visual inspection (e.g., if the meter being read is a non-machine-readable type of meter) or by use of a gun (e.g., if the meter being read is an encoder type of machine-readable meter). In practice, this system of meter reading is extremely costly and time consuming, because the utility company must pay the meter readers for the time spent traveling to and from customer sites and reading the meters. In addition, unrealized revenues due to extending credit to utility consumers for months at a time can disturb the utility company's cashflow and investment. Thus, the utility industry has recognized the need for an automated system for reading and more closely managing utility consumption. In response to this need, various systems have been provided for automatically reading and processing utility meters.

One such conventional system involves use of meters equipped with radio frequency (RF) transmitters which transmit meter reading data to one or more remote locations so as to eliminate the need for human readers to go to each customer premises to read the customers' meters. Essentially, an RF meter of the type used in this conventional system consists of a pulse or encoder type of machine-readable meter having a small RF transmitter built into the meter head. The RF transmitter transmits signals corresponding to the pulses generated by the meter, in the case of a pulse-type meter, or in the case of an encoder-type of meter, the digital representation of the current meter reading, as an indication of the level of utility usage to either a utility company vehicle being driven in the vicinity, known as mobile RF, or to a remote receiver location in the vicinity, known as fixed RF. The information can later be downloaded to the utility company computer. One example of such a system is disclosed in Brunius, et al., U.S. Pat. No. 4,614, 945, which utilizes a vehicle to access utility consumption information transmitted by RF transponders attached to the meters at the consumers' premises. A major shortcoming of this type of conventional system is that only machine-readable meters may be automatically read using the system; non-machine-readable meters still must be read via visual inspection by human meter readers.

Other types of conventional automatic meter reading systems utilize remote data units, or RDUs, also known as meter interface units, or MIUs, located at the consumer premises to automatically accumulate utility consumption data from the customer meters and communicate this information back to either a storage site or the utility company over a telephone network. Such conventional systems are of two types: outbound and inbound systems.

In a conventional outbound system, the utility company periodically calls each customer RDU to retrieve customer consumption data stored by the RDU. One example of an outbound system is disclosed in Honick, U.S. Pat. No. 4,852,152. In the Honick system, a utility company central computer communicates with an RDU located at the customer's premises through a special subscriber test trunk telephone line which enables the utility computer to be connected to a particular RDU without ringing the customer's telephone. The system allows the utility computer to call and access any RDU in the system at any time as long as the phone at the customer site is not is use. Such access, known as a demand read, may be necessary when, for example, the utility needs to prepare a final bill because utility service to a customer is to be terminated or discontinued. However, this system has the significant disadvantage of requiring expensive special test trunk access circuitry which must be installed at each telephone exchange to enable the utility computer to communicate with the RDU without ringing the consumer's telephone line. Further disadvantageously, this system also cannot be used automatically read non-machine-readable meters, but rather, solely can be used to automatically read machine-readable meters.

Another conventional outbound system is disclosed in Sollinger, U.S. Pat. No. 4,811,011. The Sollinger system includes a sensor at each customer's premises for automatically reading the customer's meters, a microcomputer for accepting and storing the data from the sensor, a communications interface connected to the microcomputer, a main computer at a location remote from the customer's premises, and a communications link between the customer's premises and the main computer, wherein the main computer continually polls each customer's meter to initiate transmission of the reading data to the remote location over the communications link. The Sollinger system further comprises means for periodically transmitting the reading data to utility company computers for billing purposes. Unfortunately, in this system, the main computer must continually poll each customer premises rather than having the utility usage data sent automatically from the customer premises to the main computer. Also, disadvantageously, this system is unable to automatically read non-machine-readable meters, and is only able to automatically read machine-readable meters.

Conventional inbound systems are programmed to place a call to a utility billing computer or to a storage facility to download meter readings at specific, pre-defined time intervals. In addition, some conventional inbound systems are bi-directional, meaning that they allow the utility company to make readings on demand much like in a conventional outbound system.

One prior art inbound system is disclosed in Verma, U.S. Pat. No. 4,833,618. The Verma system comprises RDUs located at each customer's premises for accumulating and reporting utility usage data from machine-readable utility meters at the premises, and a utility data processor or UDP located at the utility site for collecting the usage data sent from the RDUs over a conventional telephone network. The system is designed to count each rotation of the least significant dial of the utility meters. Verma also discloses an encoder meter in which the need for a sensor interface is eliminated by providing the meter with built-in circuitry which encodes the utility usage information into an electrical signal which is read directly by the microcomputer.

Also in Verma's disclosed system, at a specified, predetermined times during one day of a billing cycle (which Verma terms a "report time"), the RDUs call the UDP and transmits the utility usage information, which the RDUs have accumulated and stored, to the UDP via the conventional telephone network. The report time is programmed into the RDUs. In addition, an answer window is opened on the system on a predetermined regular basis, e.g., each day, during which the UDP can call the RDUs to obtain utility usage information. This answer window is also programmed into the RDUs. Only during the answer window can the RDUs receive a call from the UDP. Thus, only during the answer window can the utility company recover usage information on demand. The report times may be programmed into the RDUs at the time of installation or by the UDP during a communication therewith.

During the answer window, the RDUs are awakened and await calls from the UDP. All calls that come to the RDUs during the answer window, whether from the UDP or a third party, are detected through ring detection circuitry, which then prevents the telephone from ringing inside the customer premises. Each incoming call then receives a signal from the RDU receiving the call, which signal requests log-in information and a password. If the log-in information and password are not conveyed to the RDU receiving the call (such as is the case when a third party other than the utility company is calling during the answer window), the RDU will terminate the call. If the proper log-in information and password are given to the RDU, the RDU will know that the UDP is calling and will transmit the desired information.

Disadvantageously, Verma's disclosed system interferes with normal utility customer telephone service by preventing third party calls from being received by utility customers during the answer window. Also disadvantageously, Verma's disclosed system requires use of machine-readable utility meters, and cannot automatically acquire and process reading data from non-machine-readable utility meters.

Examples of other conventional meter readings systems are disclosed in Pettis, U.S. Pat. No. 3,922,490; Thomborough et al., U.S. Pat. No. 4,817,131; Thomborough et al., U.S. Pat. No. 4,866,761; Garcia et al., U.S. Pat. No. 5,140,351; White et al., U.S. Pat. No. 5,239,575; and Cerny et al., U.S. Pat. No. 5,298,894. Unfortunately, each of these conventional systems suffers from the aforesaid and/or other disadvantages and drawbacks of the prior art systems discussed above.

SUMMARY OF THE INVENTION

In accordance with the present invention, a remote data acquisition and processing system is provided which is capable of overcoming the aforesaid and other disadvantages of the prior art. In one embodiment of the present invention, a system is provided for remotely monitoring and accumulating utility usage data from utility customer sites and transmitting such data to a remote storage facility where it can be accessed by a utility company. This embodiment of the present invention also includes a system for remotely managing and controlling utility consumption, and comprises a Remote Meter Processor or RMP located at the customer site for automatically monitoring and accumulating utility usage data, a Store Forward Site or SFS at a location remote from the utility customer site and the utility company for accumulating the utility usage data for later access by the utility company and a consumer interconnection medium or CIM connected to a wide band link for automatically transmitting the utility usage data to the SFS.

In this embodiment, the RMP is a self-contained unit which houses data acquisition, processing, control, memory, and data transmission circuitry. Data acquisition is accomplished through a Programmable Utility Meter Interface or PUMI which is capable of being programmed to automatically access utility usage data from any type of commercial meter, including both machine readable and non-machine-readable meters. Data acquisition and processing are controlled by a microprocessor located within the RMP. Customer usage data is acquired from the designated meter by the PUMI and is sent to the microprocessor where it is converted to a common file format for transmission to the SFS. The microprocessor can be programmed to cause the RMP to acquire and transmit data to the SFS at any specified predetermined interval.

In this embodiment, data transmission can be accomplished by any CIM, including, but not limited to, a conventional telephone network, a cellular telephone network, cable TV, RF, ISDN and suitable computer networks (e.g., wide area and Internet networks). The data are transmitted over the CIM to a wide band link for subsequent transmission to the SFS. Data are continually accumulated by the SFS from a number of RMP's corresponding to a number of customers and is stored by the SFS until accessed and downloaded by the particular utility company for billing purposes.

This embodiment is further provided with an adaptive calling process which is a means of moving the periodic interval at which the RMP automatically accesses information. Such a function may be necessary when the RMP is having difficulty in transmitting information because the customer phone is in use when the CIM utilized is the conventional telephone network. The adaptive calling process analyzes previous connections and attempted connects to determine the optimum low volume time period for initiating automatic assess by the RMP.

Also, this embodiment is a bi-directional type of system, in that it is capable of automatically collecting and sending data to the SFS for access by the utility company, and the utility company can call the RMP on demand at any time to access utility usage. Additionally, the utility can transmit information such as programming updates, service disconnect commands, new autonomous update mode times, and other control and system options or functions to the SFS to be downloaded to the RMP during its next autonomous update mode call. It is further provided that an incoming call from the utility company causes the customer's telephone to go off-hook and the system initiates a bi-directional data connection to the utility company computer. Under most circumstances, innocent third part calls are permitted to pass through unimpeded. If any of the customer's telephones are taken off-hook during either a demand read or during the autonomous update mode, the utility company and the RMP will disconnect, allowing normal operation of the telephone circuit. This insures uninterrupted access to the telephone line by the resident of emergency and other calls. This embodiment also contains a power supply which is adapted to selectively disconnect electrical utility service at the customer site while retaining electrical utility service to the RMP.

Another embodiment of the system of the present invention essentially comprises one or more optical imaging devices for generating computer-readable image data representative of human-readable visual representations of respective portions of utility operation-related data displayed by machine-readable and/or non-machine-readable utility meters. Preferably, the optical imaging devices each include an array of charge coupled optical scanning elements for scanning the metering displays and/or dials of the meters whereby to produce the image data. A host computer processor is provided remotely from the imaging and metering devices for generating from the image data the respective portions of the utility operation-related data. The host computer processor accomplishes this by processing the image data using computer image processing techniques, such as optical character recognition techniques, to extract or generate from the image data the respective portions of the utility operation-related data. The host processor also stores the image data for later recall, and/or for display in the form of computer-generated images or hard copies of the visual representations represented by the image data (e.g., for use in verifying individual customer meter readings so as to ensure accurate billing).

Preferably, the system of this embodiment also includes a plurality of controllers located remotely from the host processor, imaging devices, and metering devices, for generating control signals for independently causing respective ones of the optical imaging devices to generate images and also for causing the controllers to transmit to the controllers the images generated by the imaging devices. The controllers are adapted to temporarily store the images transmitted to them from the imaging devices, and thereafter, to transmit the images to the host processor for processing.

Preferably, the transmission of the image data from the optical imaging devices to the controllers is accomplished via wireless communications links between the controllers and the devices. The wireless communications links may comprises spread-spectrum radio frequency links (e.g., transmitting at between 902 and 928 MHz), although other types of communications links (e.g., cellular telephone, hardwired telephone network, cable television connections, integrated services data network, microwave, and/or satellite communications links) may also be used without departing from this embodiment of the present invention.

Transmission of image data between the controllers and the host processor in this embodiment is accomplished via a public or private communications network connecting the controllers to the host processor. Preferably, this network takes the form of a wide area computer network, such as an Internet computer network, through which the controllers and the host processor exchange data via appropriate hardware and software (e.g., modems, communications software, etc.), and telecommunications facilities (e.g., public and/or private switched data and/or telecommunications networks). The host processor and controllers may also be appropriately provisioned to connect to the wide area network via wireless means, such as Unlicensed National Information Infrastructure (U-NII) communications devices operating within a frequency spectrum located at 5.15 to 5.35 GHz and 5.725 to 5.825 GHz.

Also, in this embodiment of the present invention, the host processor preferably includes a power management and information gathering timing mechanism for causing the controllers and imaging devices to periodically alternate between active periods and inactive ("sleep") periods. Ordinarily, the controllers and imaging devices operate in low power consumption, "sleep" condition wherein only essential components of the controllers and imaging devices are active. However, periodically, the host processor timing mechanism triggers the host processor to generate control signals which are transmitted to the controllers for causing the controllers to enter "active" mode. Once in active mode, the controllers generate control signals for causing the imaging devices to enter active mode, scan the meters to produce the image data, and transmit the image data to the controllers. The controllers then transmit the image data to the host processor. Thereafter, the controllers and imaging devices are either commanded by the host processor to return to sleep mode, or automatically return thereto.

The host processor preferably is also adapted to generate and store data files in which the respective portions of utility operation-related data are associated with respective utility customers. In this embodiment, this is accomplished based upon identification information supplied with the image data to the host processor for permitting association of the respective portion of utility data with the respective imaging device that generated the image data representative of the respective portions of utility data. The data files may then be transmitted to the utility for further processing by the utility (e.g., for facilitating billing of utility customers and/or controlling distribution of utility services based at least in part upon the files).

Advantageously, this embodiment of the present invention is able to automatically generate reading data of both machine readable and non-machine readable types of metering devices, and to process such data for use in e.g., customer billing. Further advantageously, this embodiment is able to accomplish these functions without requiring that the non-machine readable metering device being read be internally modified (e.g., to include mechanisms for making such metering devices machine readable).

These and other features and advantages of the present invention will become apparent as the following Detailed Description proceeds and upon reference to the Drawings, wherein like numerals depict like parts, and in which:

BRIEF DESCRIPTION OF THE DRAWINGS

FIG. 7 is a block diagram of a preferred construction of the RMP of the preferred embodiment illustrated in FIG. 1.

FIG. 31 is a functional block diagram of the host processor of the embodiment of FIG. 18.

FIGS. 32–34 are plan views of respective face portions of conventional utility meters for facilitating discussion of operation of the embodiment of the present invention shown in FIG. 18.

Although the following Detailed Description will proceed with reference being made to specific embodiments of the present invention, it should be understood that the present invention is not intended to be limited to these embodiments. Rather, many alternatives, modifications, and variations thereof will be apparent to those skilled in the art. Accordingly, the present invention should be viewed broadly, as being limited only as set forth in the hereinafter appended Claims.

DESCRIPTION OF THE PREFERRED EMBODIMENTS

Figure 1:
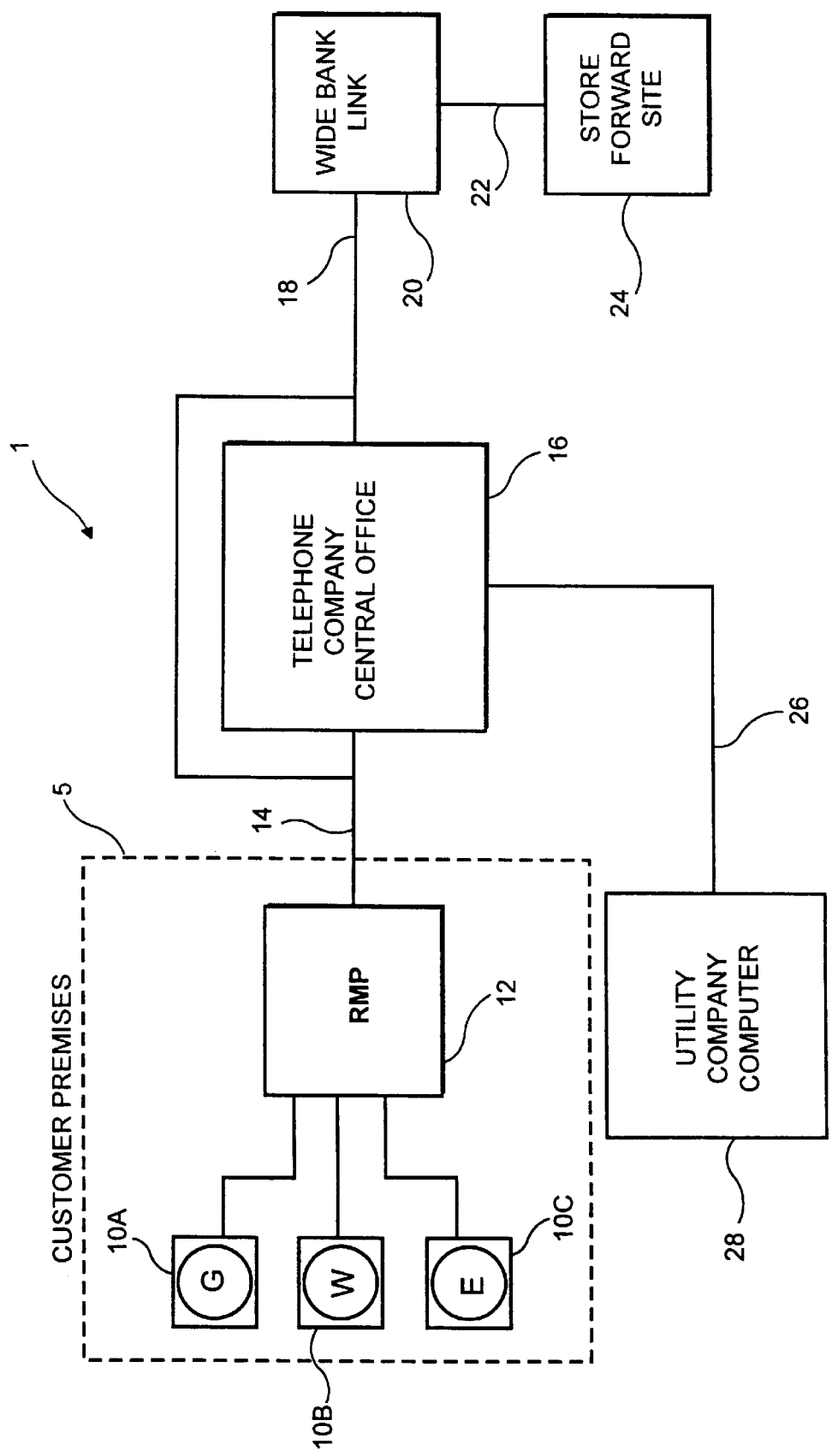
FIG. 1 is a block diagram of one embodiment of the present invention.

Referring now to FIG. 1, a block diagram of one preferred embodiment 1 of the data acquisition and processing system of the present invention is shown. Located at the customer premises 5 are gas meter 10A, electric meter 10B and water meter 10C. Each one of gas meter 10A, electric meter 10B and water meter 10C can be of the pulse type, encoder type or non-machine readable type. Also provided at the customer premises 5 is an RMP 12. RMP 12 is capable of automatically accessing utility usage data from gas meter 10A, electric meter 10B and water meter 10C and transmitting such data through CIM 14 to a wide band link 20. A wide band link is any data transmission network capable of bi-directional high speed data transmission. Any wide band link having the ability to form a virtual connection to the SFS 24, such as the current Packet Switched Data Network or equivalent, can be used. From the wide band link 20, the data is sent through the wide band link interconnect 22 to SFS 24 where it is stored until accessed by the utility company.

The system 1 is set up such that RMP 12 will transmit data from each customer premises 5 periodically, usually once during the particular utility company's billing cycle, to SFS 24. The operation of the system 1 in this manner is identified as the autonomous update mode. The particular utility company will stagger such transmissions by its total population of customers over the billing cycle, the end result being that SFS 24 will receive data each day corresponding to a portion of the utility company's customers. Each day, the utility company can then access and download the data which was transmitted and stored in SFS 24 during the previous day's transmissions and use such data for billing purposes. In operation, the utility company computer 28 places a call over telephone line 26 to the telephone company central office 16 which in turn uses telephone company wide band link access 18 to gain access to wide band link 20. Access to wide band link 20 at the telephone company central office 16 is through providers such as AT&T, MCI Communications and Sprint Net. From wide band link 20, the desired data can be accessed and downloaded from SFS 24 through wide band link interconnect 22 using protocols available at SFS 24 such as Kermit, ZMODEM, XMODEM or any batch variation of the same. Each utility company is assigned a particular address at SFS 24 corresponding to the location at which its usage data is being stored. Typically, in MS-DOS or UNIX systems, this is achieved by creating subdirectories for each utility. The data is then downloaded from SFS 24 over wide band link interconnect 22 to wide band link 20. The data is then sent over telephone company wide band link access 18 to the telephone company central office 16 which in turns send the data over telephone line 26 to the utility company computer 28.

Information such as service termination or reconnect commands, new or updated programs, and current time and date information can be placed at SFS 24 by the utility company to be automatically downloaded by a particular RMP 12 during its next transmission in the autonomous update mode. This is accomplished by having the standard call initiating sequence of RMP 12 examine an update file during the initial data exchange at the beginning of the autonomous update mode.

In addition, the system 1 is capable of being operated in a demand mode. In the demand mode, the utility company is able to access utility usage data from and control utility connection status at a particular customer premises 5 on demand. In operation, the utility company computer 28 places a call over telephone line 26 to telephone company central office 16. From the telephone company central office 16, CIM 14 is used to access a particular RMP 12 at a particular customer premises 5. Each RMP 12 at each customer premises 5 is given a unique address so that it can be accessed in this way. RMP 12 then accesses the utility usage information from one or more of gas meter 10A, electric meter 10B or water meter 10C, depending upon which particular utility company is seeking data, and sends the data out over CIM 14 to telephone company central office 16 which in turn sends the data to the utility company computer 28 over telephone line 26. Available modes of sending or transmitting data include V.xxbis, BELL or other international standards through protocols as required by the particular SFS 24.

Any type of CIM 14 having access to wide band link 20 can be used to transmit the utility usage data from the customer premises 5 to SFS 24, as previously described. Selected CIMs comprise a conventional telephone network, cable television, a cellular telephone network, RF and the Integrated Services Digital Network, or ISDN.

Figure 2:
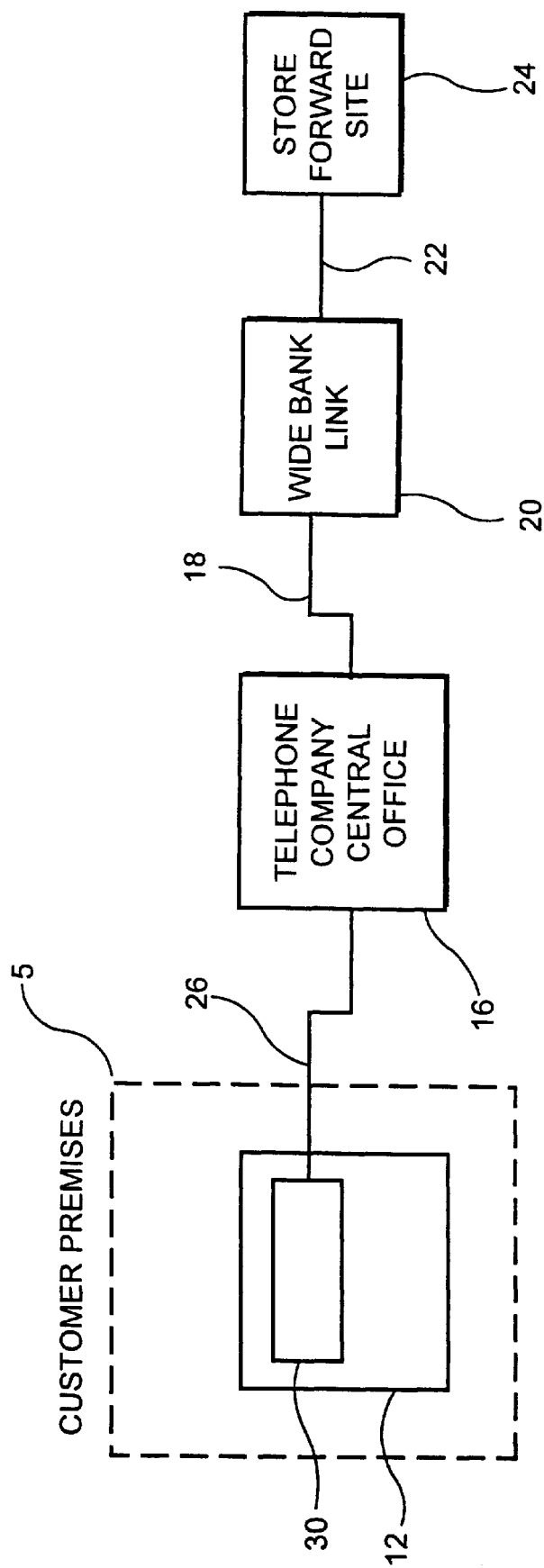
FIG. 2 is a block diagram of one preferred construction of the CIM of the preferred embodiment illustrated in FIG. 1 which utilizes a conventional telephone network.

Referring now to FIG. 2, a block diagram of CIM 14 is shown utilizing a conventional telephone network. In this embodiment, RMP 12 is equipped with a modem 30 configured for use with a conventional telephone network which is adapted to transmit data to and receive data from the telephone company central office 16 through the utilization of telephone line 26.

Figure 3:
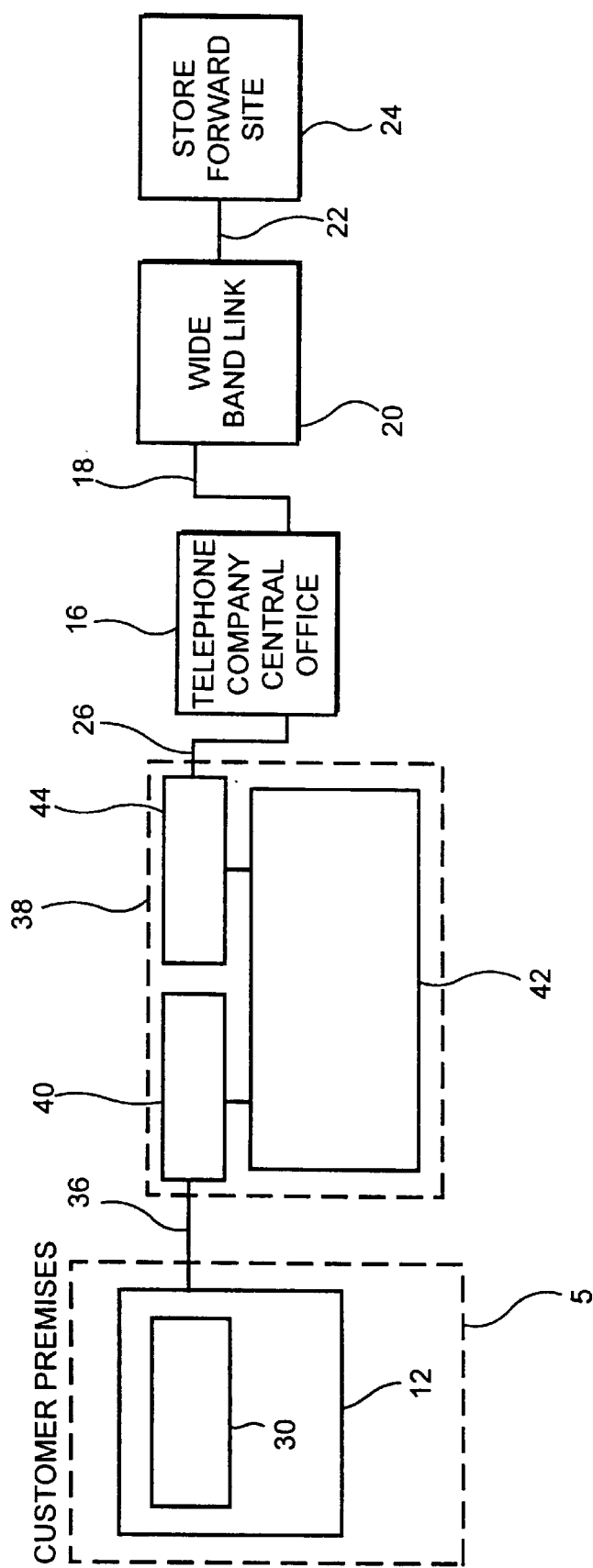
FIG. 3 is a block diagram of another preferred construction of the CIM of the preferred embodiment illustrated in FIG. 1 which utilizes a cable television network.

Referring now to FIG. 3, a block diagram of CIM 14 is shown utilizing cable television or CATV. In this embodiment, RMP 12 is equipped with modem 30 configured for use with a cable television network. This is done by connecting modem 30 to a CATV interface device such as a Motorola MHW10000. Modem 30 then transmits the data to CATV head end 38 through the utilization of CATV cable 36 comprising subcarriers on the public assess or CATV control channels. The data then passes through multiplexer/demultiplexer 40 to CATV head end computer 42. CATV head end computer 42 then sends the data to telephone company central office 16 through the use of telephone line 26 using modem 44. A virtual connection is then made through wide bank link 20 to SFS 24.

Figure 4:
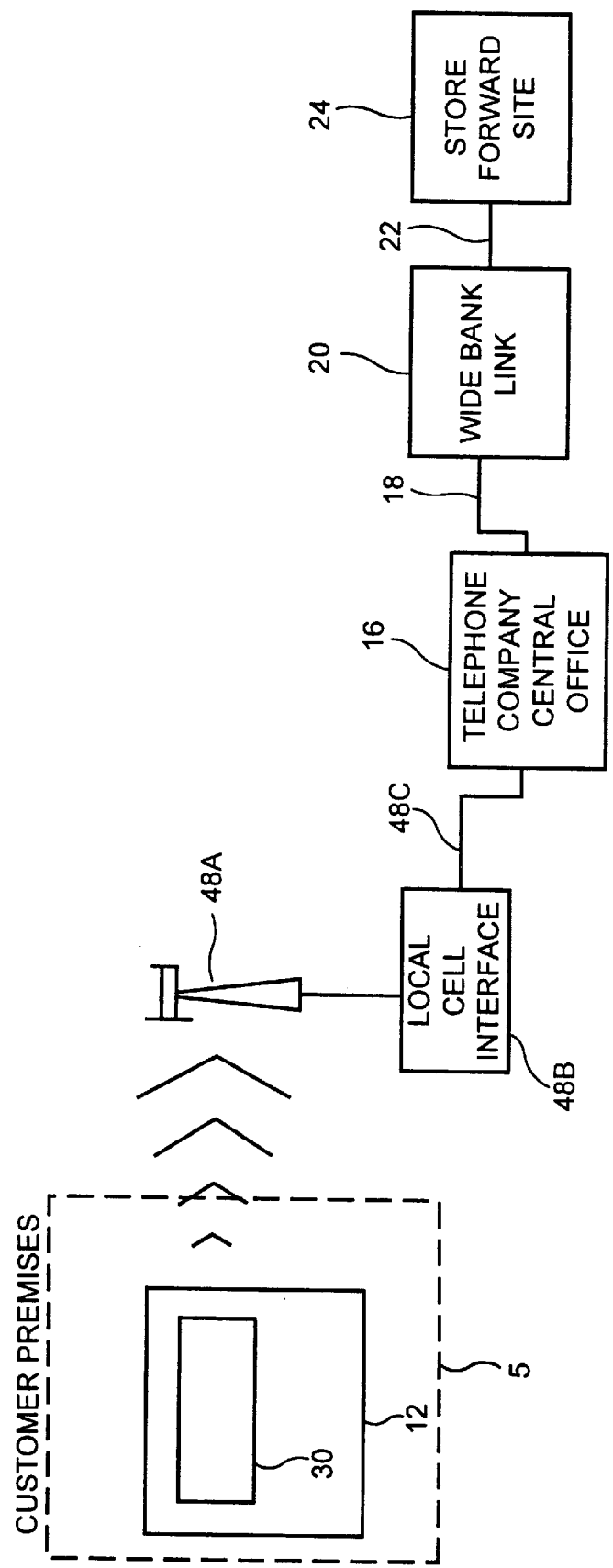
FIG. 4 is a block diagram of yet another preferred construction of the CIM of the preferred embodiment illustrated in FIG. 1 which utilizes a cellular telephone network.

Referring now to FIG. 4, a block diagram of CIM 14 is shown utilizing a cellular telephone network. In this embodiment, RMP 12 is equipped with modem 30, such as a Rockwell RC144ACL/C40, configured for use with a cellular telephone network. Modem 30 then transmits the data to cellular tower 48A using a modem-ready cellular transceiver. Next, the data is sent from local call interface 48B to telephone company central office 16 through intercellular connection 48C. The data is then sent to SFS 24 through a virtual connection over wide band link 20.

Figure 5:
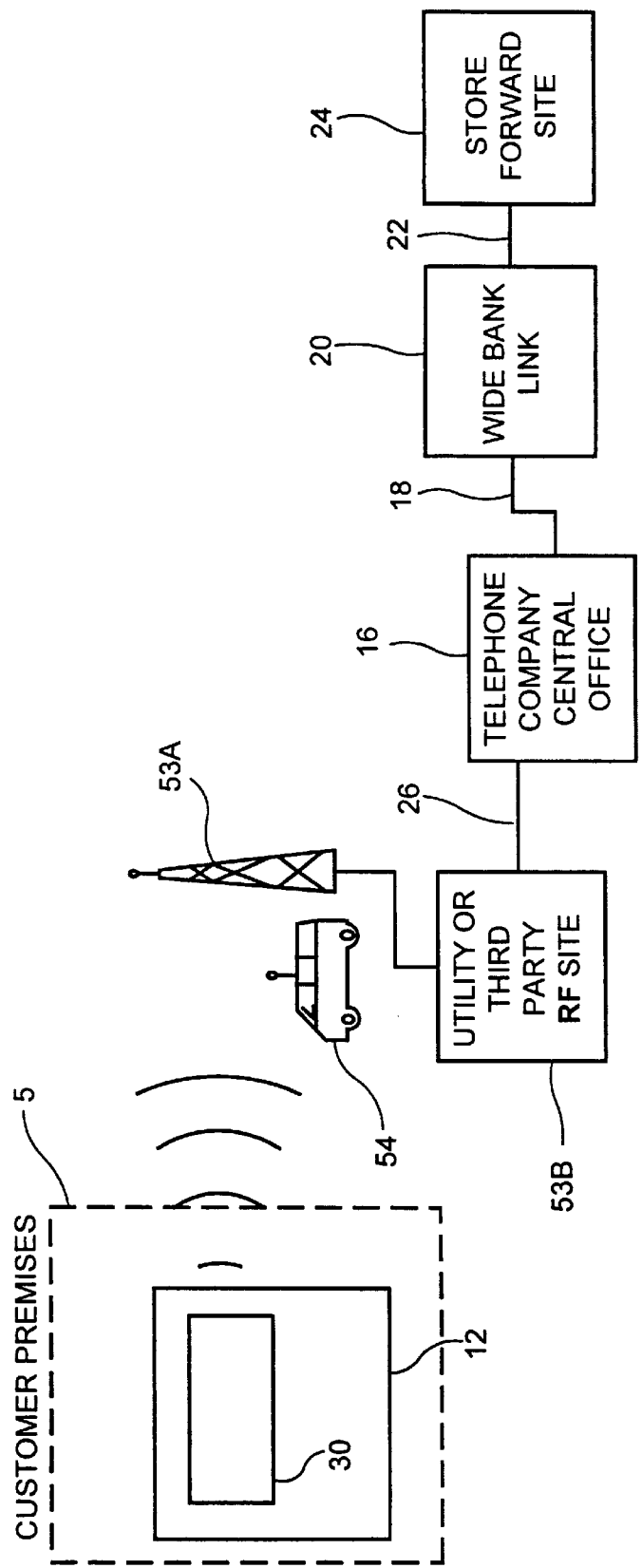
FIG. 5 is a block diagram of still another preferred construction of the CIM of the preferred embodiment illustrated in FIG. 1 which utilizes an RF network.

Referring now to FIG. 5, a block diagram of CIM 14 is shown utilizing RF. In this embodiment, RMP 12 is equipped with modem 30 configured to control an RF transceiver which transmits the data using radio frequency waves to either RF remote location 53A, a fixed RF site, or vehicle 54, a mobile RF site. If RF remote location 53A is used, the data is then sent through the RF site 53B and telephone line 26 to the telephone company central office 16 and ultimately to SFS 24 over wide band link 20. In a mobile configuration, data collection by the mobile van is downloaded to SFS 24 via disk, tape or other means, as determined by the particular RF system employed.

Figure 6:
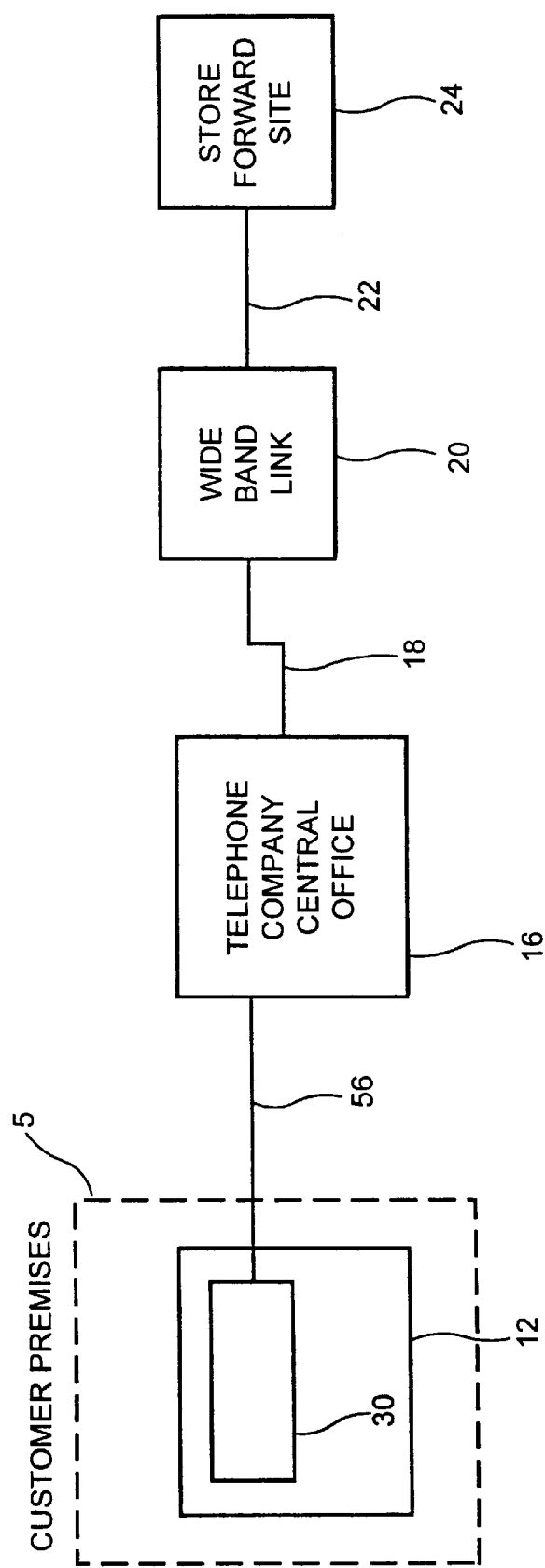
FIG. 6 is a block diagram of another preferred construction of the CIM of the preferred embodiment illustrated in FIG. 1 which utilizes an ISDN network.

Referring now to FIG. 6, a block diagram of CIM 14 is shown utilizing ISDN. ISDN is an international telecommunications standard that enables a communications channel to carry digital data simultaneously with voice and video information. In such a configuration, RMP 12 is equipped with modem 30 configured for use with an ISDN network. This is done by connecting modem 30 to an ISDN interface device such as a Motorola MC145490EVK. Modem 30 transmits the data to telephone company central office 16 using ISDN local line 56. A virtual connection is then made over wide bank link 20 to SFS 24.

Referring now to FIG. 7, a block diagram of RMP 12 is shown comprising programmable utility meter interface or PUMI 60, main board 70, real time clock 80 located on baseboard 81, PC104 bus 62, and modem 30, configured for the type of CIM 14 that is to be used. Interconnection of these modules is accomplished utilizing a peripheral interconnection scheme, and preferably the PC-104 standard as described by the PC-104 Consortium.

Figure 8A:
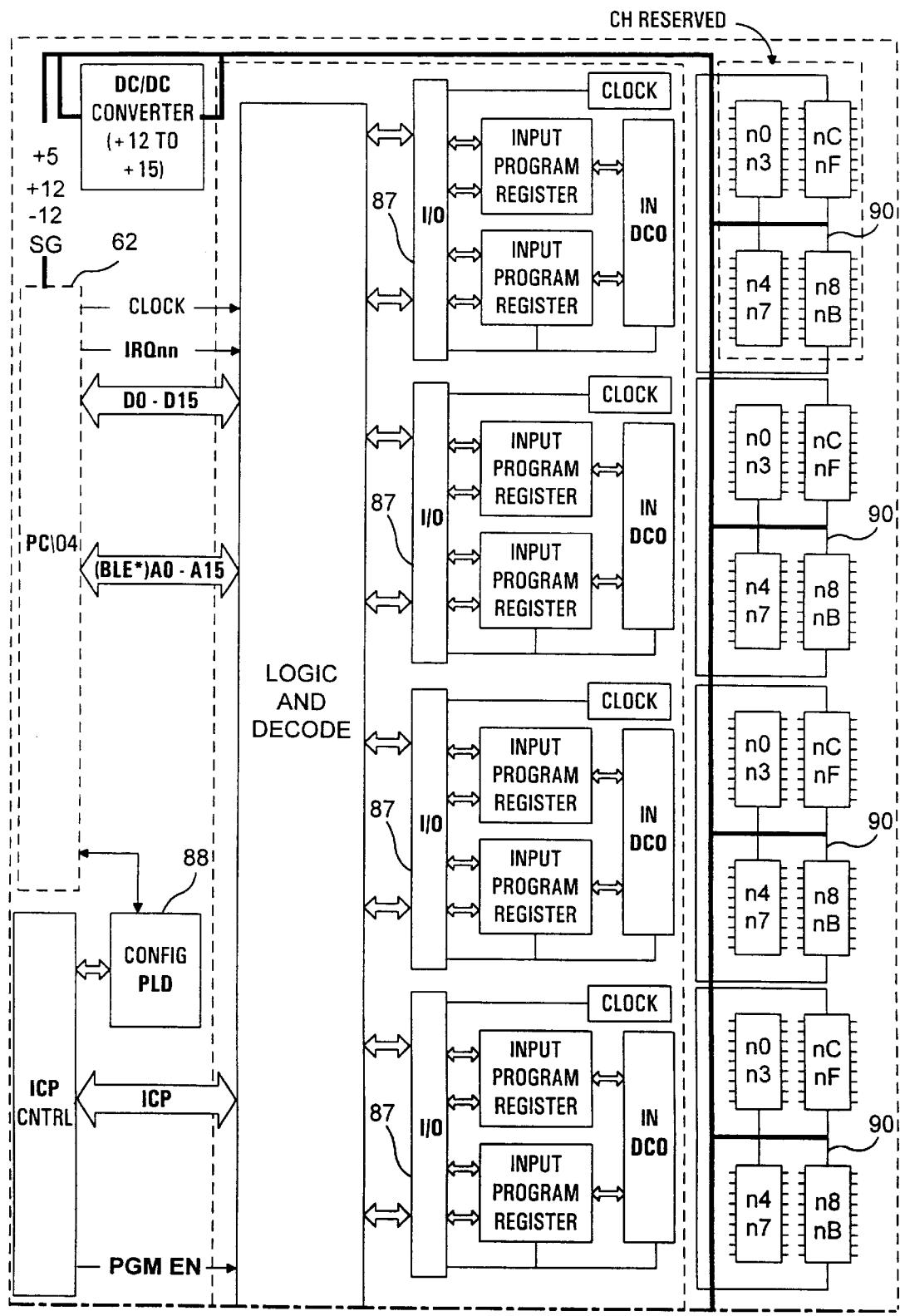
FIG. 8 is a block diagram of a preferred construction of the PUMI shown in FIG. 7.
Figure 8B:
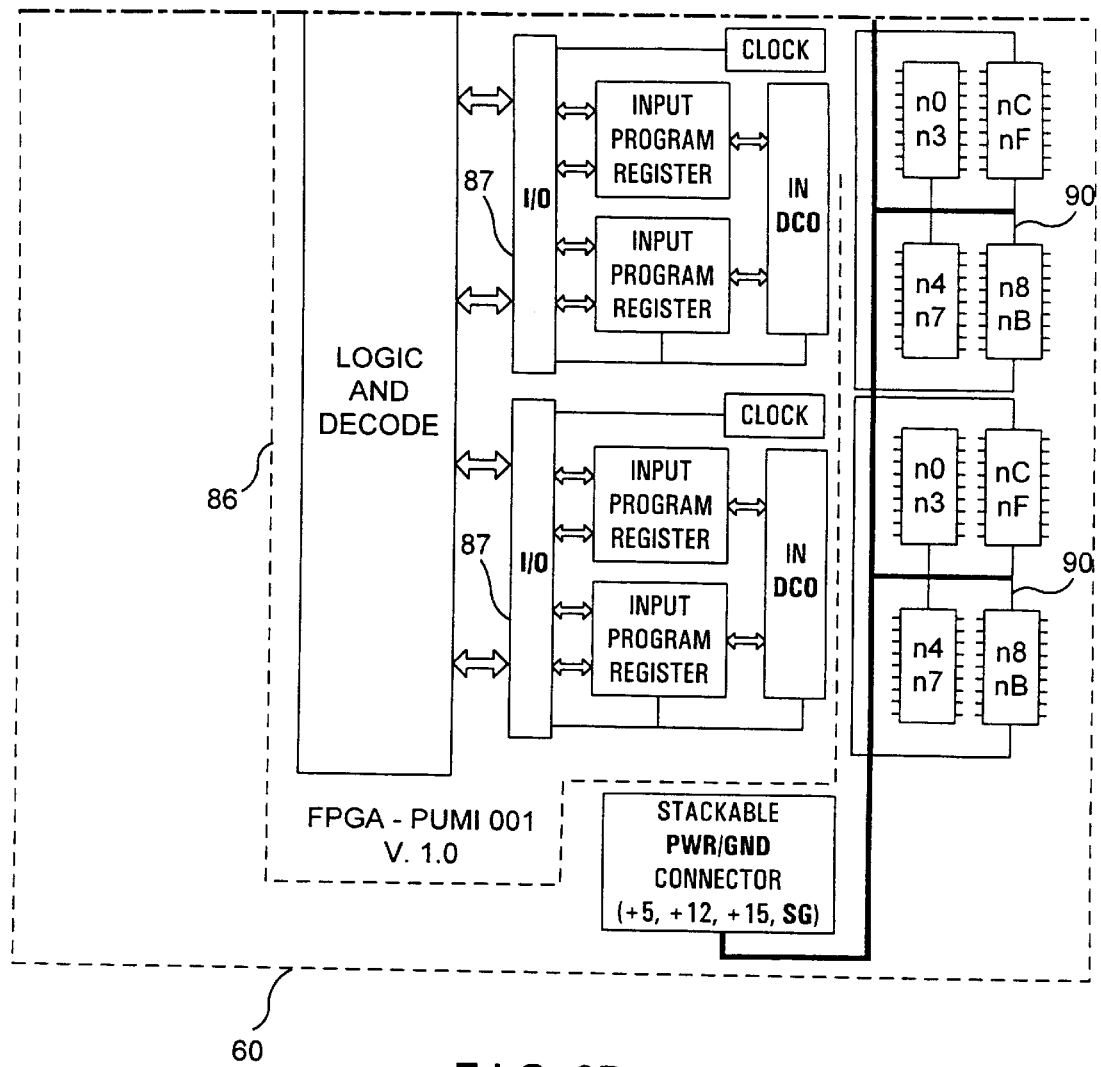

Referring now to FIG. 8, a block diagram of PUMI 60 is shown comprising a field programmable gate array or FPGA 86 containing a plurality of registers 87, programmable logic device or PLD 88, and six 16-bit I/O connectors 90. Also shown in FIG. 8 is the PC104 bus 62. Interconnection of these modules is accomplished using the PC-104 standard as described above.

Figure 9:
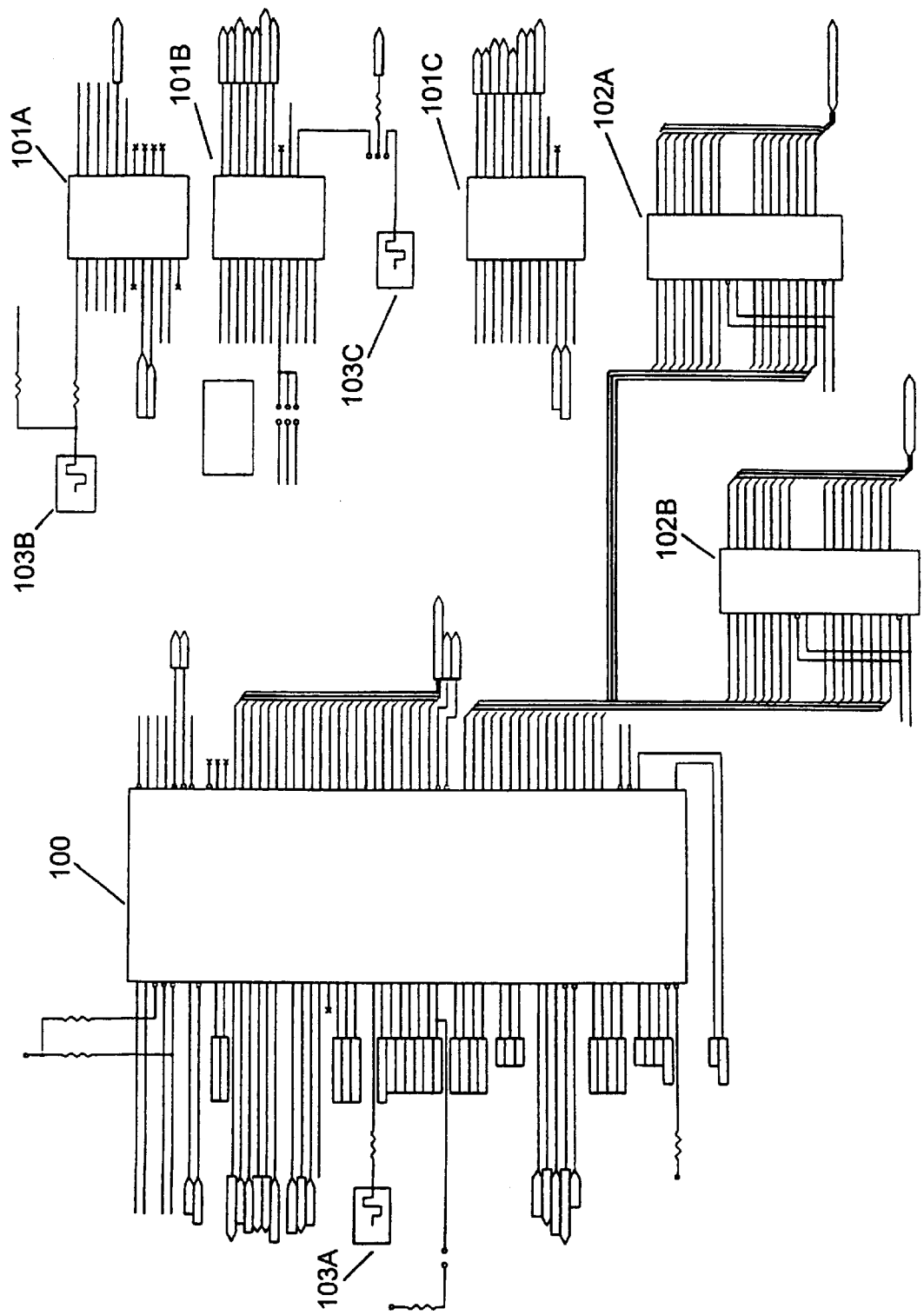
FIG. 9 and FIG. 10 are schematic circuit diagrams illustrate various aspects of the preferred construction of the main board shown in FIG. 7.
Figure 10:
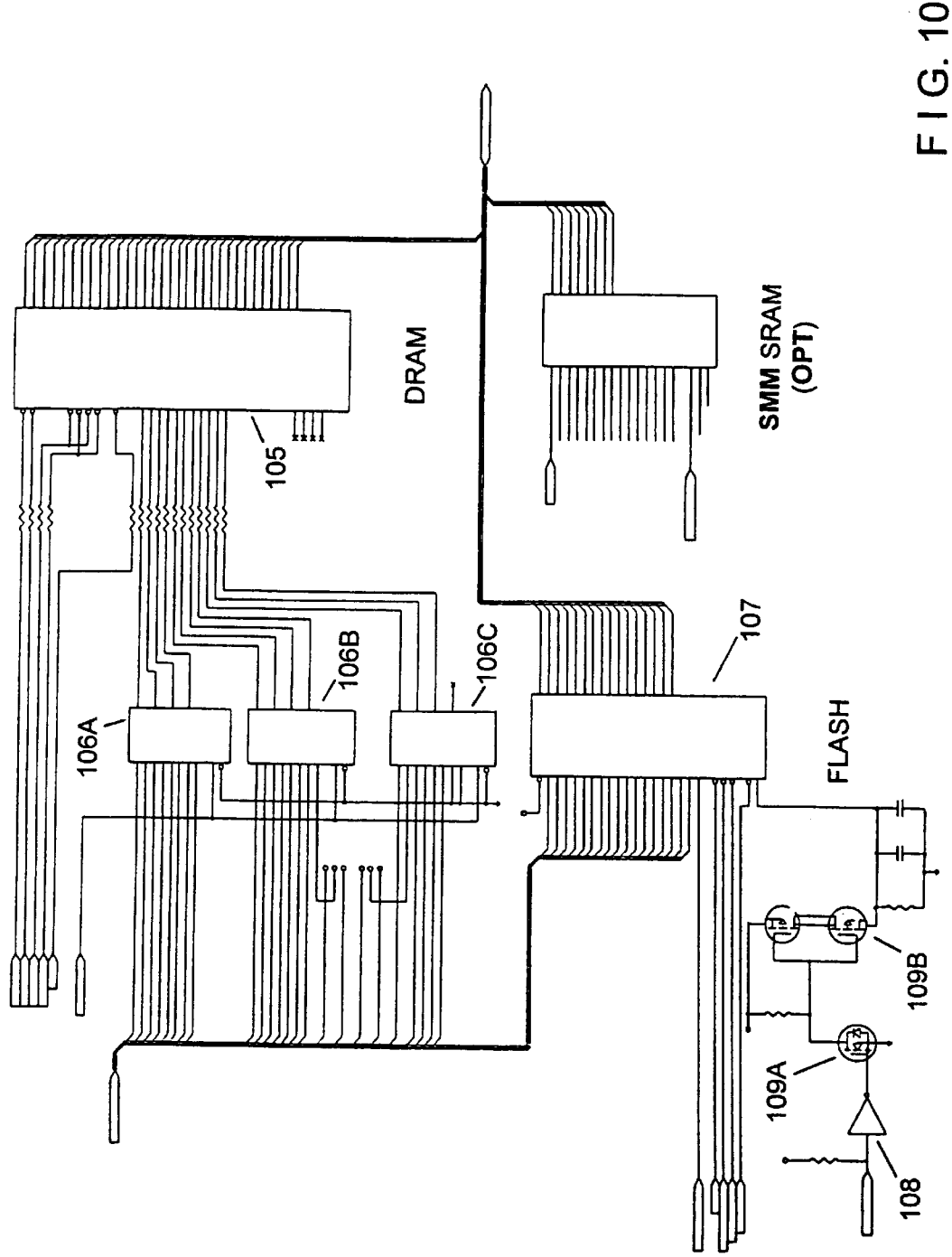

Referring now to FIGS. 9 and 10, main board 70 is illustrated. FIG. 9 shows microprocessor 100, such as an Intel 1386EXP, programmable logic arrays 101A, 101B and 101C, which provide I/O and memory management support to microprocessor 100, data buffer chips 102A and 102B, which provide data buffering to microprocessor 100, and oscillators 103A, 103B, and 103C, which provide clocks for microprocessor 100, COM control and I/O timing. FIG. 10 shows DRAM 105, address decoders 106A, 106B, and 106C, which provide management and interface of DRAM 105, flash RAM 107, which stores system files, a command interpreter, and the execution code used for operation of the RMP 12, and quad buffer 108 and FETs 109A and 109B, which provide 12 v necessary for programming flash RAM 107.

Functionally, programmable logic arrays 101A, 101B and 101C are used for bus control and, depending on the address and data that microprocessor 100 is currently executing, provide the proper logic levels and timing that are required to communicate with PC-104 bus 62, flash RAM 107 and DRAM 105. Flash RAM 107 provides a diskless alternative for non-volatile, read/writable storage for the operating system, data and programs.

RMP 12 is capable of reading gas meter 10A, electric meter 10B, and water meter 10C irrespective of the type of metering technology being used. PUMI 60 is the device through which acquisition of utility usage data occurs. Referring to FIG. 8, FPGA 86 is provided with six 16-bit I/O connectors which are then connected to at least one of gas meter 10A, electric meter 10B and water meter 10C in order to access utility usage data. Each meter which is connected to PUMI 60 through the 16-bit I/O connectors is given a specific address which is programmed into FPGA 86.

If the meter to be connected is a pulse type meter, two wires will be used to connect the pulse type meter to two of the I/O connections of one of the 16-bit I/O connectors so that usage data corresponding to meter pulses can be fed into PUMI 60. Meter pulses are accumulated by and stored in a register 87 located on FPGA 86.

If the meter to be connected is an encoder type meter, PUMI 60 is hardwired to the meter by using I/O connectors to directly access the digital signal representing the current meter reading of the meter. The number of I/O connectors is determined by the type of encoder meter being utilized.

Figure 11:
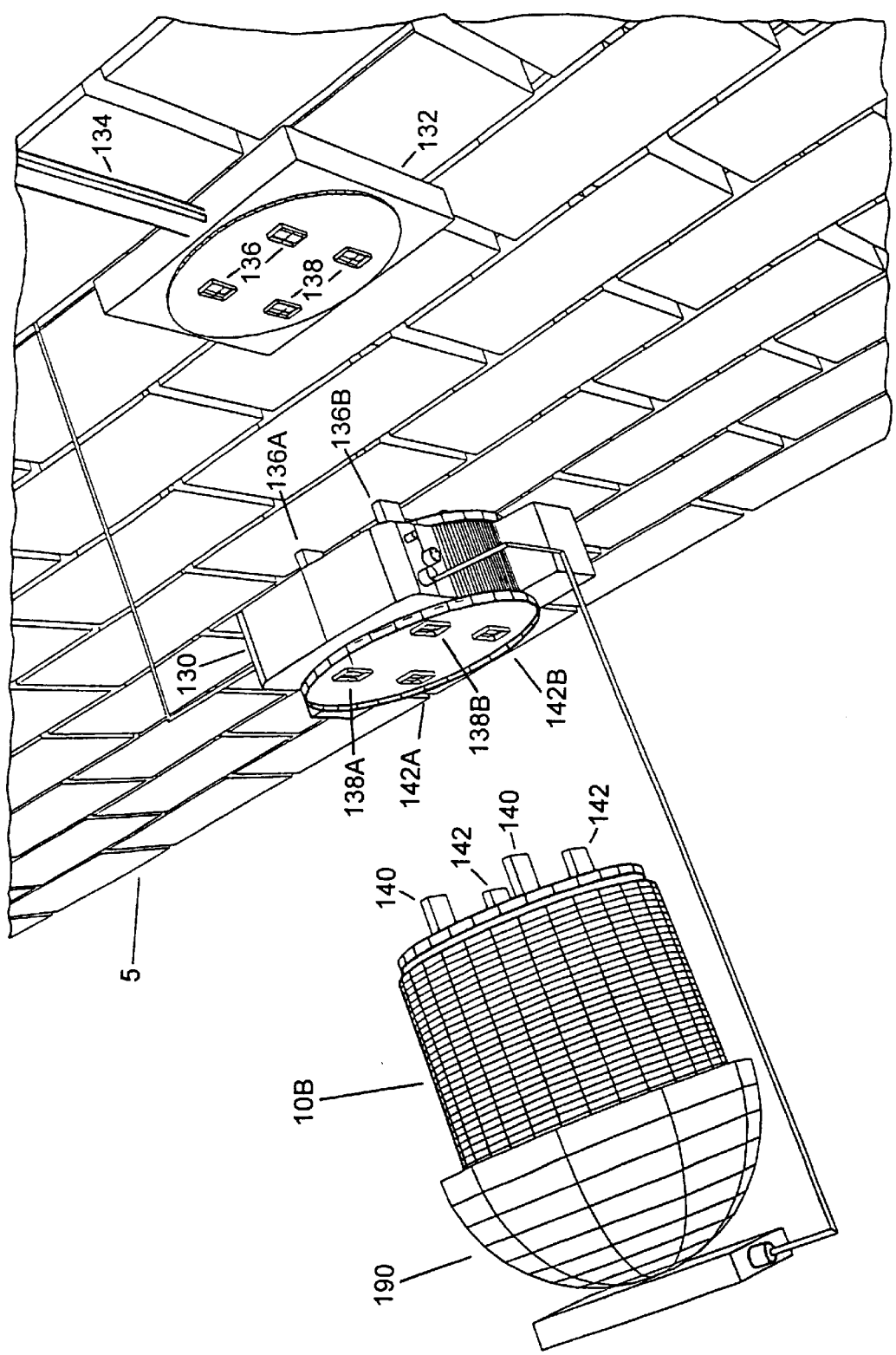
FIGS. 11 and 12 illustrate various aspects of an optical scanner arrangement for use in the preferred embodiment of FIG. 1.
Figure 12:
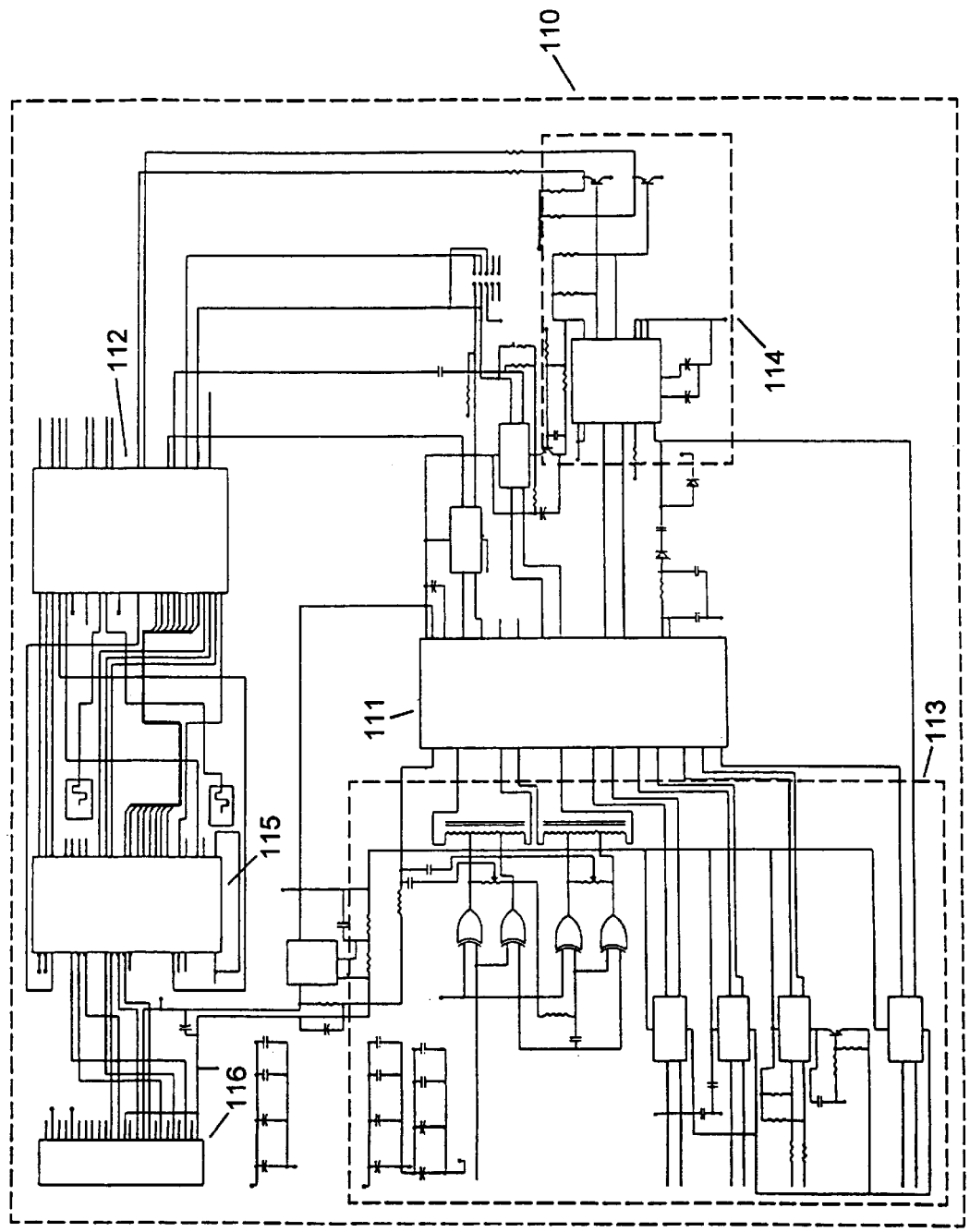

Referring now to FIG. 11, if the meter to be connected is a non-machine readable type of meter, optical scanner 110 or similar imaging device mounted to the face of the meter can be used for reading the meter. An example of such an imaging device is CID Technology, Inc. DIC2250D. Referring now to FIG. 12, a schematic of optical scanner 110 is provided. CID chip 111 is connected the main board 70 through serial connection 116 which is driven by UART 115. A masked programmed FLEX PLD 112 is used to generate clock signals that are conditioned by conditioning circuitry 113 and is also used to receive differential drive from drive circuitry 114. UART 115 then outputs a scan file which represents the current meter face, a corresponding signal of which is then fed electronically to PUMI 60 through the I/O connectors. The scan file is then sent to microprocessor 100. For meters which numerically indicate the meter reading, such as a meter using an odometer or digital display, an OCR system, such as Calera Recognition Systems OCR software, is used to convert the scan file into a signal representing usage data. For meters which indicate readings through a pointer and dial, a system which determines the meter reading from the location of the pointers on the dials is used, such as those designed to scan monochrome bitmaps for black and white levels.

Figure 14:
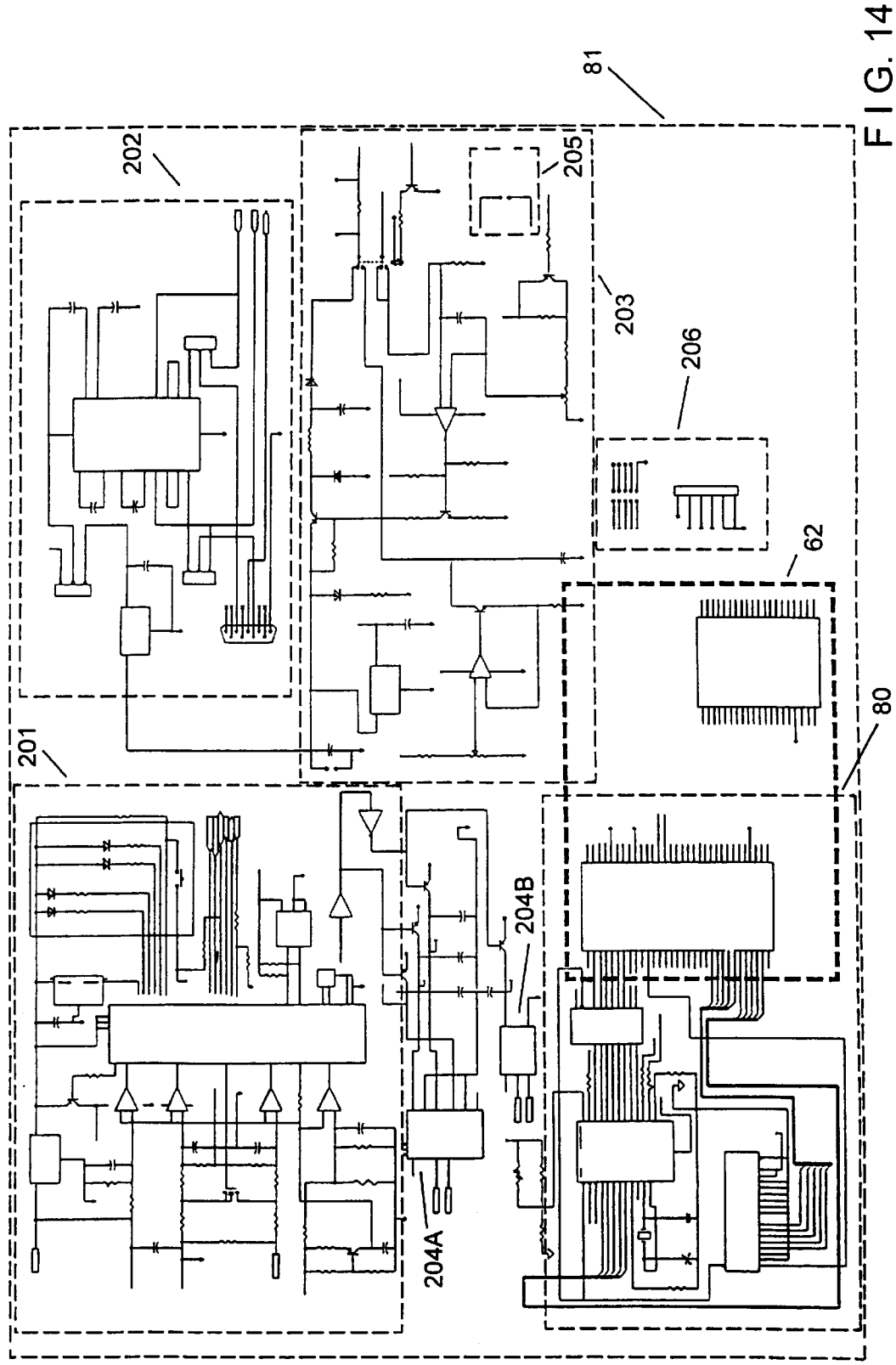
FIG. 14 is a schematic circuit diagram of a preferred construction of the baseboard of the RMP of FIG. 7.

Referring now to FIG. 14, real time clock 80 which is located on baseboard 81 is programmed with the specified time during the billing cycle at which RMP 12 is to read a particular meter for a particular utility and send such reading to SFS 24 during the autonomous update mode. The initial autonomous update mode time is programmed into real time clock 80 at the time of installation of RMP 12 and can later be updated by means of placing such information at SFS 24 for download by RMP 12 during its next autonomous update mode session. Real time clock 80 contains ten on-board alarm registers which are used to store such reporting times. Each alarm register corresponds to a particular meter and a particular reporting time. When real time clock 80 reaches a preselected time stored in one of the alarm registers, it sends an interrupt request signal or IRQ down PC 104 bus 62 to main board 70 and more particularly to microprocessor 100. Along with the IRQ signal, microprocessor 100 is also sent an address signal which indicates the particular alarm register 82 from which the IRQ signal came. Thus, microprocessor 100 is able to determine which meter address, and thus which particular meter is to be read. Microprocessor 100, having received the request, causes PUMI 60 to read a particular meter so that RMP 12 can later transmit the acquired data to SFS 24.

DRAM 105 stores information corresponding to each meter connected to the RMP 12 comprising the type of meter and the proper subroutine to be followed by the microprocessor 100 to read such meter. This information is stored in DRAM 105 at a specified address for each meter connected to RMP 12. Microprocessor 100 accesses the information in DRAM 105 based upon the address signal sent from the real time clock 80.

Microprocessor 100 then sends the address of the meter to be read to the FPGA 86. If the type of meter to be read is a pulse type meter, the FPGA 86 then accesses the current value stored in register 87 in FPGA 86 which corresponds to the meter to be read and then sends it to the microprocessor 100 through PC 104 bus 62. If the type of meter to be read is an encoder meter or a non-machine readable type meter, FPGA initiates a read of the meter by accessing the current meter value using either the encoder connections or the optical scanner connections, whichever is appropriate, and such value is stored in a register 87 in FPGA 86. FPGA 86 then sends the data to microprocessor 100 through PC 104 bus 62. Microprocessor 100 will then convert the data to ASCII and initiate transmission of the data through CIM 14 to SFS 24 through a standard boot-up sequence using hardware initialization and software execution.

Microprocessor 100 is also programmed with an adaptive calling process. In a conventional telephone network embodiment, the adaptive calling process is necessary to address the situation in which RMP 12 is attempting to transmit data in the autonomous update mode and telephone line 26 is unavailable because of use by the customer. The adaptive calling process alters the time at which autonomous update mode transmissions are initiated by analyzing previous connects and attempted connects to determine the optimum time period for initiating transmission.

When the utility company wishes to make a demand read, as has been previously described, the utility company computer 28 initiates a call which addresses RMP 12 and the particular meter 10A, 10B or 10C to be read. Microprocessor 100 then accesses the utility usage information from the desired meter or meters by the same procedure as previously described.

In a conventional telephone network embodiment, a demand read according to the above described procedure requires an actual telephone call to be made by the utility company computer 28 to the customer premises 5. The system monitors every incoming call to the customer premises 5 and is able to distinguish between innocent third party telephone calls and a demand read call from the utility company computer by using CND, a standard telephone function in which the source of a telephone call can be identified. The CND function enables RMP 12 to detect when a particular call is the utility company seeking to access information rather than a third party placing a call to the customer. To do so, microprocessor 100 is preprogrammed with the phone number to be used by utility company computer 28 such that when modem 30 detects an incoming call from that number, it signals Microprocessor 100. Microprocessor 100 in turn prevents the call from going through to the customer premises and instead initiates acquisition and transmission of the desired data to utility company computer 28. Innocent third party calls are permitted to pass through unimpeded. Such a function is not required when the other types of CIM 14 are utilized because the other types of CIM 14 each have a channel or line dedicated solely to the utility company.

Figure 13:
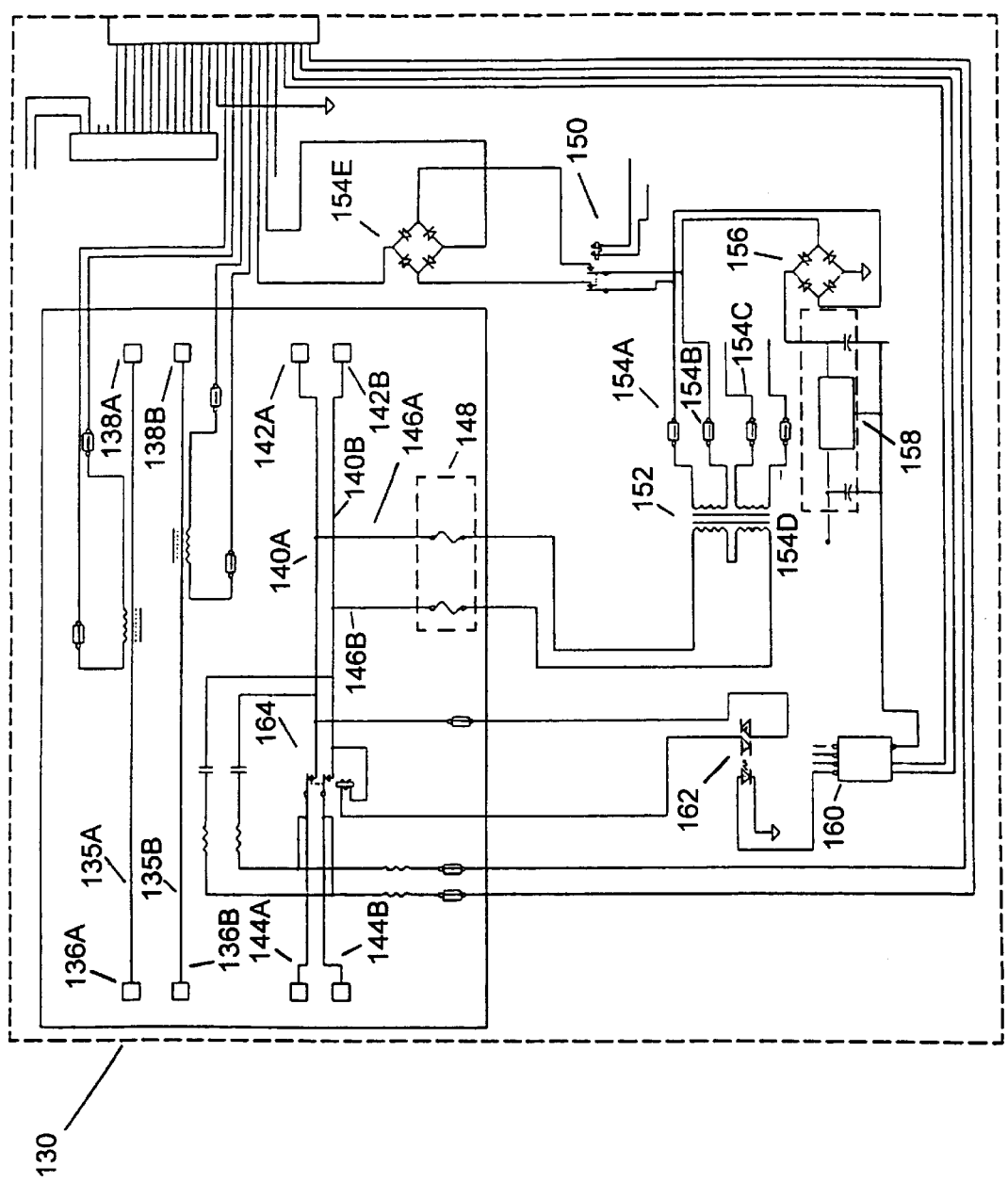
FIG. 13 is a schematic circuit diagram of a preferred construction of the power circuitry of the RMP of FIG. 7.

Power for RMP 12 is provided through power circuitry 130 as shown in FIG. 13. Power circuitry 130 provides the RMP with remote disconnect capability and unlimited access to power even after the disconnection of electricity to the customer premises. Meter socket 132 at customer premises 5 is connected to main electrical line 134 to customer premises 5, as shown in FIG. 11. Meter socket 132 has two power output connections 136 and two power input connections 138. Power input connections 138 lead into customer premises 5 to provide electrical service thereto. Electric meter 10B similarly has two input connections 140 and two output connections 142 and connects across power output connections 136 and power input connections 138 of meter socket 132, thereby completing the circuit such that electricity is fed into meter 10B for monitoring purposes and back out into customer premises 5 for use by the customer. Power circuitry 130 is contained in a collar assembly which is inserted between meter socket 132 and electric meter 10B as shown in FIG. 11. The collar assembly permits the meter to function normally.

Shunt lines 135A and 135B of power circuitry 130 are connected to main electrical line 134 through power output connections 136 using meter socket connectors 136A and 136B. Shunt lines 135A and 135B are then connected to the input connections 140 of electric meter 10B through connectors 138A and 138B, such that the 240V AC coming from main electrical line 134 is passed through to electric meter 10B.

Output connections 142 of the electric meter 10B are connected to shunt lines 140A and 140B through connectors 142A and 142B, which in turn are connected to the customer premises 5 through power input connections 138 using connectors 144A and 144B. The 240V AC power is then taken from shunt lines 140A and 140B using lines 146A and 146B. Fuses 148 are inserted in lines 146A and 146B for current limitation in the primary circuit of transformer 152. Also, relay 150 is placed in the secondary circuit that supplies power to RMP 12. Relay 150 will not close and provide power to RMP 12 until RMP 12 is properly connected. Transformer 152 is used to step the 240V present on lines 146A and 146B down to a lower voltage appropriate for use by RMP 12. Transformer 152 has four outputs, 154A, 154B, 154C and 154D, two of which provide a power connection to RMP 12 through full-wave rectifier 154E and through the CHGIN connection of power management system 201 as shown on FIG. 14, and two of which can be used to provide a power connection to auxiliary devices such as an optical scanning device. Two of the outputs are also used to drive bridge rectifier 156 which in turn drives voltage regulator 158. Voltage regulator 158 is used to provide local power to decoder chip 160 which provides 2-bit decoding of signal sent from RMP 12. When RMP 12 sends a service disconnect signal, as may be placed at SFS 24 by the utility company and downloaded by RMP 12, the decoder chip 160 feeds opto-isolator/TRIAC 162 which in turn operates relays 164 placed in shunt lines 140A and 140B, such that when relays 164 are open no power is able to get into customer premises 5. Thus, power circuitry 130 provides the electric utility with remote disconnect capability while still providing power to RMP 12.

In addition to using power circuitry 130, power to RMP 12 can be provided by a solar cell mounted outside customer premises 5, a wall-mounted adapter plugged into an outlet at the customer premises 5. As shown in FIG. 14, baseboard 81 consists of a power management system 201 and DC to DC converters 201A and 204B, which are used to supply power to PC-104 bus 62. Management of metal halide or nickel cadmium cell 205 is accomplished by controlling circuit 203 with commands from power management system 201. Interface of power management system 201 is provided through level shifter 202 using a standard asynchronous serial protocol.

Power management system 201 is a standard cell charge maintenance circuit and utilizes a Microchip MTA 11200 with the recommended support circuitry. Power is provided to the other elements of RMP 12 through PC-104 bus 62 and auxiliary power connection 206.

Figure 15:
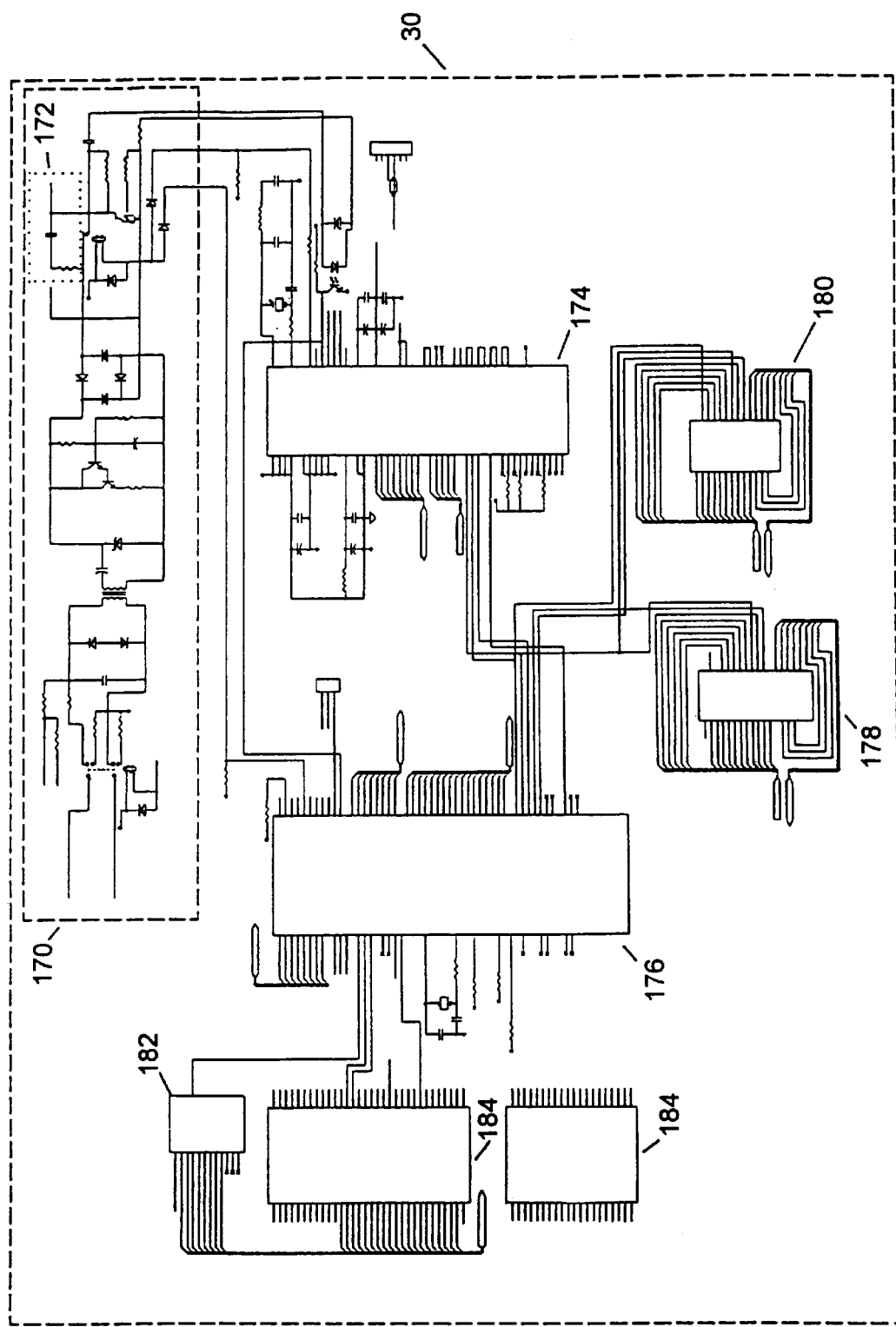
FIG. 15 illustrates an embodiment of a modem adapted for use with a conventional telephone network for use with the RMP of FIG. 7.

FIG. 15 illustrates an embodiment of modem 30 adapted for use with a conventional telephone network. DAA interface circuit 170 provides a direct access arrangement or DAA interface for isolation and signal conditioning. Within circuit 170, filter circuit 172 is provided which comprises a high pass RC filter. Filter circuit 172 permits the higher frequency, lower voltage portion of the telephone signal, which contains the caller ID information, to pass on to the remainder of modem 30 circuitry while blocking the 85–90V ring portion of the telephone signal. The remainder of modem 30 consists of data pump 174, such as the Rockwell DMP RC144ACL, microcontroller 176 for controlling data pump 174, such as the Rockwell microcontroller C40, ROM 178 and RAM 180, such as the Intel 27CO10 and 51256, respectively, for configuring data pump 174 and microcontroller 176, and programmable logic array 182, which is configured for address decoding of chip select for microcontroller 176. Connection of modem 30 to PC-104 bus 62 is provided by PC-104 connectors 184. CND detection is accomplished by selection of the components that make up filter circuit 172 to allow the CND signal through during on-hook operation of the telephone between the first and second ring signals as specified by BELCORE document TR-RSY-000031, "SPCS/Customer Premises Equipment Data Interface."

Figure 16:
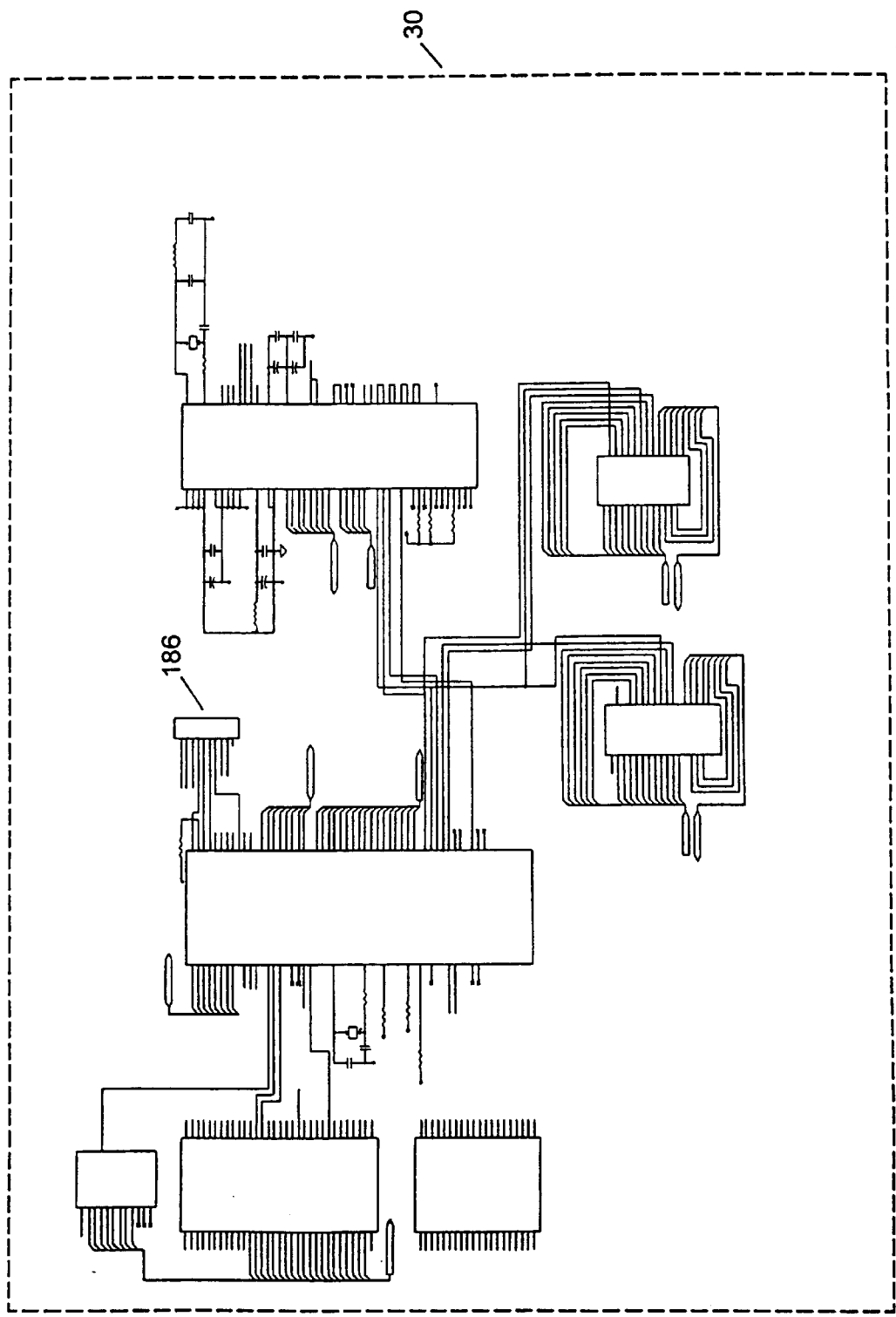
FIG. 16 illustrates an embodiment of a modem adapted for use with a cellular telephone network for use with the RMP of FIG. 7.

FIG. 16 illustrates an embodiment of modem 30 adapted for use with a cellular telephone network. The circuitry is essentially identical as that described in reference to FIG. 15 except for the absence of DAA interface circuit 170 and filter circuit 172. Data pump 174 and microcontroller 176 are configured to cellular operation through software configuration which allows microcontroller 176 to control the cellular phone firmware options which are cell phone manufacturer dependent. Reception and transmission of signals to and from modem 30 when adapted for use with a cellular telephone network are accomplished through connector 186, such as a multi-pin DIN or LIMA connector.

Figure 17:
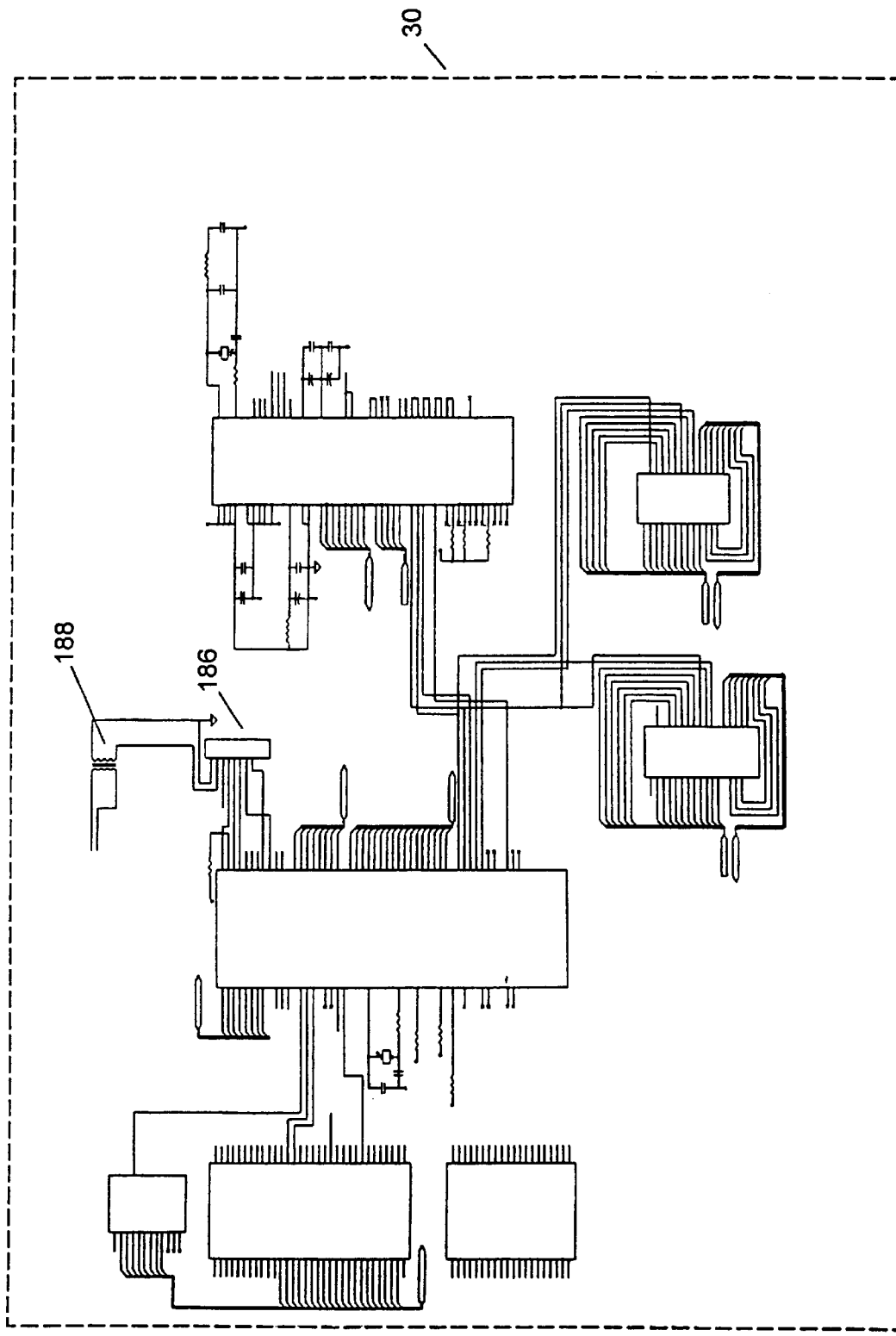
FIG. 17 illustrates an embodiment of a modem adapted for use with a cable television network, an RF network, or an ISDN network for use with the RMP of FIG. 7.

FIG. 17 illustrates an embodiment of modem 30 adapted for use with a cable television network, an RF network, or an ISDN network. The circuitry is essentially identical to that described in connection with FIG. 16. Connection to the cable, television, RF or ISDN service interface is accomplished through connector 186 using standard 4-wire serial protocols. Transformer 188 is used to provide differential drive for transmit in order to increase common mode rejection to the network interface.

Thus, advantageously, this embodiment of the present invention essentially comprises a modular system for automatically monitoring and controlling utility consumption at a customer site and transmitting such data to a remote storage facility where it can be accessed by a utility company for billing purposes and related functions. This embodiment is also capable of detecting leaks and tampering at the customer site, is completely independent of the type of meter technology used at the customer premises, and further does not rely upon a specific communication medium for transmitting the data to the storage facility. As such, this embodiment is completely modular. Also advantageously, as is discussed above, this embodiment includes hardware for automatically reading utility meters located at the customer premises and automatically transmitting data to and receiving data from a remote storage facility. In addition, the utility company can access such usage data from a particular customer premises or send data to the customer premises on demand.

Figure 18:
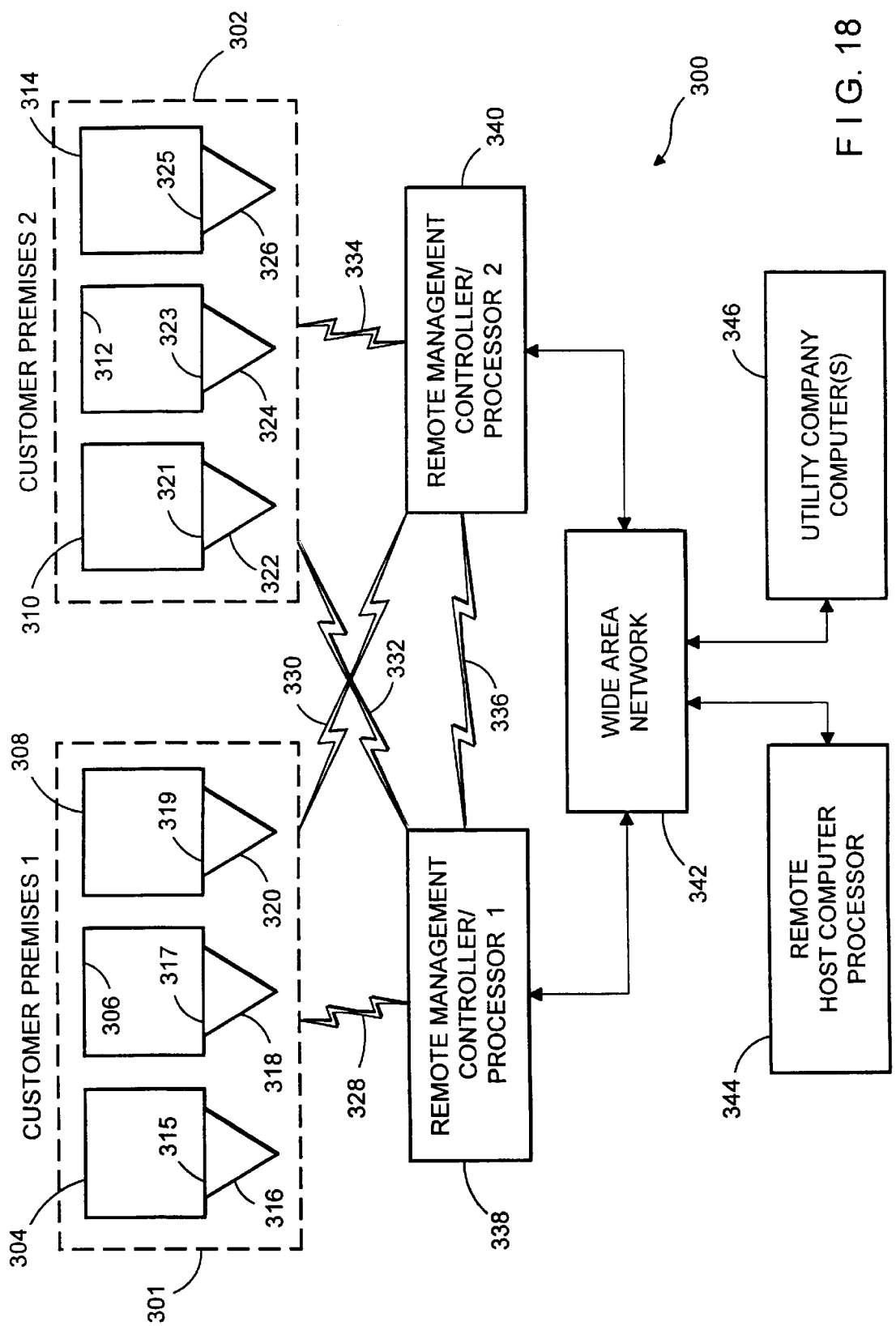
FIG. 18 is a functional block diagram of another preferred embodiment of the present invention.

With reference to FIG. 18, another preferred embodiment 300 of the remote data acquisition and processing system of the present invention will now be described. System 300 comprises at least one 316, and preferably a plurality of meter imaging devices 316, 318, 320, 322, 324, 326, removably, non-invasively mounted, in a manner that will be described in greater detail below, to the respective meter faces 315, 317, 319, 321, 323, 325 of respective conventional machine-readable or non-machine-readable utility meters 308, 306, 304, 310, 312, 314 at customer premises 301 and 302. As is typical of conventional utility meters, each of the conventional meters 304, 306, 308 . . . 314 comprises visual display means 500 located in the respective meter face portions 315, 317, 319, 321, 323, 325 of the meters 308, 306, 304, 310, 312, 314. The display means 500 of each meter includes one or more analog dials 502, alphanumeric digital displays 506 (e.g., alphanumeric LED or LCD displays), and/or odometers 508 for visually displaying representations (e.g., readings via the positions of dials 502 and numbers or other symbols displayed by digital displays 506 and odometers 508) indicative of measurement of the phenomena being monitored by the meter displaying such representations. Such phenomena may include, as is the case in embodiment 300, usage of utility services by the utility customer at the customer premises at which the meter is located, and/or other utility operation-related phenomena (e.g., in the case of water and gas meters, pressures at which water and gas, respectively, are being supplied to the customer premises from their respective utilities, or in the case of electric meters, voltage and current at which electricity is being supplied to the customer premises from the electric utility).

System 300 also includes at least one 338, and preferably a plurality 338, 340 of remote management controllers/processors. Each of the remote controllers 338, 340 controls separate pluralities of optical imaging devices 316, 318, 320 and 322, 324, 326, respectively, at each of the customer premises 301, 302, via control signals transmitted to each of the optical imaging devices via separate respective primary wireless communications links 328, 334 between the controllers 338, 340 and the scanners. Preferably, controllers 338, 340 are located in relatively inaccessible places (e.g.,. mounted atop conventional telephone poles). Preferably, as will be described in greater detail below, communications links 328, 334 each comprise separate spread-spectrum radio frequency communications links between each of the controllers and each of the scanners of each of the respective pluralities of scanners controlled by the controllers, each of which radio frequency links comprises two respective reception/transmission devices 377, one of said devices being located in a respective optical scanner and the other of which devices being located in the respective remote management controller/processor responsible for controlling that respective optical scanner. In this embodiment, controller 338 is adapted to be able to control each of the scanners 316, 318, 320 in the plurality of scanners 316, 318, 320 controlled by controller 338 independently of the other scanners in the plurality of scanners 316, 318, 320 controlled by controller 338. Likewise, controller 340 is adapted to be able to control each of the scanners 322, 324, 326 of the plurality of scanners 322, 324, 326 controlled by controller 340 independently of the other scanners in the plurality of scanners 322, 324, 326 controlled by controller 340.

As will be described in greater detail below, in embodiment 300, each of the scanners 316, 318, . . . 326 is adapted to optically scan the display means of the face portion 315, 317, 319, 321, 323, 325 of the respective meter 308, 306, 304, 310, 312, 314 to which it is attached, based upon control signals supplied thereto via wireless communications links 328, 334 from remote management controllers/processors 338, 340, in order to produce respective computer-readable (i.e., digital) image data of the display means 500 and the aforesaid visual representations being generated by the display means. Once generated, the image data is transmitted from the scanner or scanners generating same, along with respective scanner identifying information (e.g., scanner serial number information), via the appropriate wireless link 328 or 334 to the respective controller 338 or 340 responsible for controlling the scanner or scanners which generated the image data. The image data is then temporarily stored, in association with the identifying information, in the controller or controllers such that respective portion(s) of image data generated by the respective scanner(s) is associated with the respective identifying information of the scanner(s) that generated same, and thence, the image data and associated identifying information are transmitted to a remote host computer processor 344 via public or private wide area network 342, which network 342 connects the controllers 338, 340 and the host processor 344.

Host processor 344 is geographically remotely located from the customer premises 301, 302, meters 308, 306, 304, 310, 312, 314, scanners 316, 318, 320, 322, 324, 325, controllers 338, 340, and utility company computer 346. Network 342 preferably comprises a Internet-type of public, wide area computer network wherein data exchange is accomplished via Transmission Control Protocol/Internet Protocol (TCP/IP), although alternatively, network 342 may comprise other types of public and/or private communications networks, including public or private telecommunications or telephone networks. Host processor 344 is also connected to utility computer(s) 346 via network 342.

Figure 19:
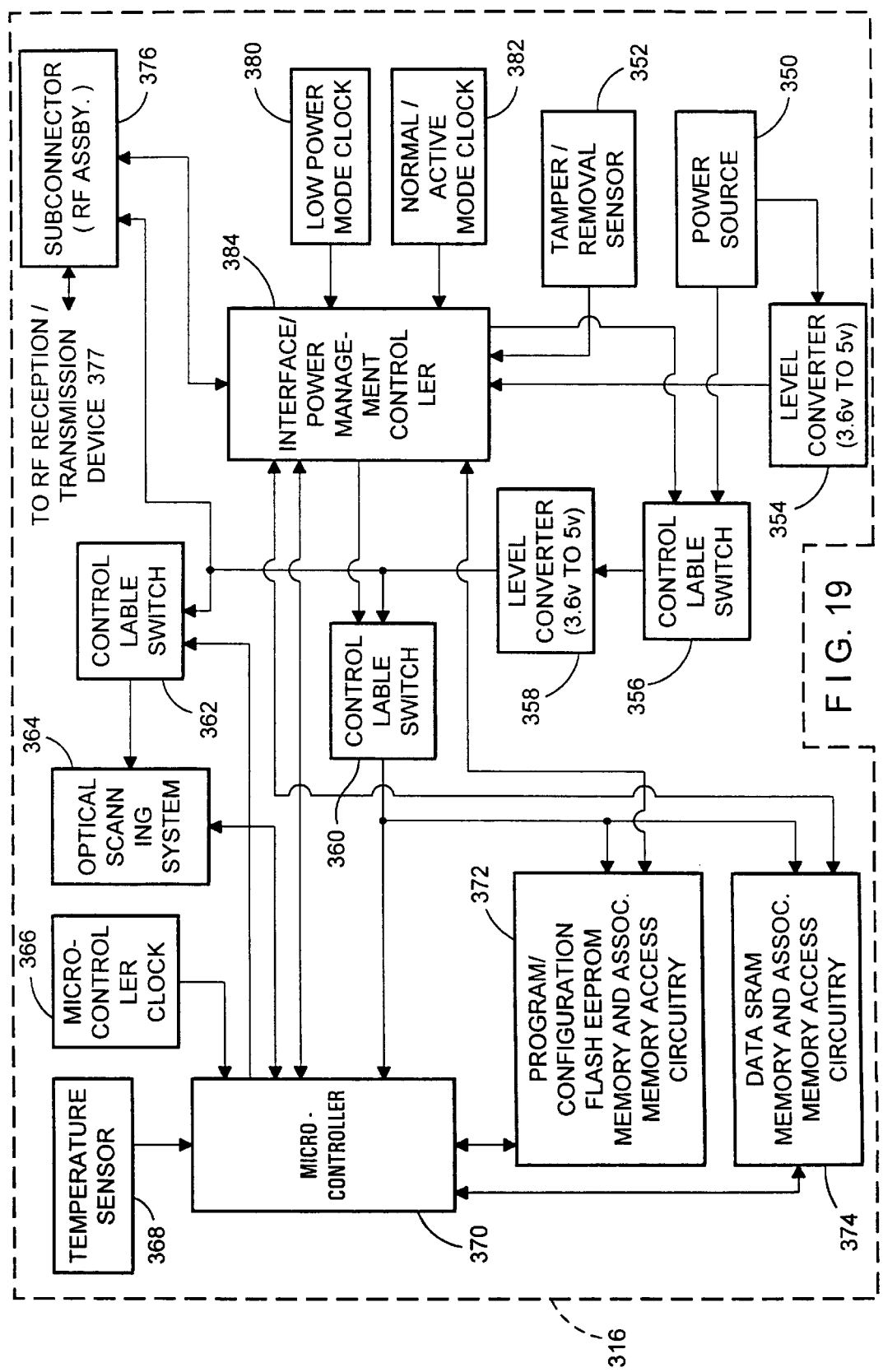
FIG. 19 is a functional block diagram of the electronic and electro-optical components of an optical imaging device in the preferred embodiment of FIG. 18.
Figure 21:
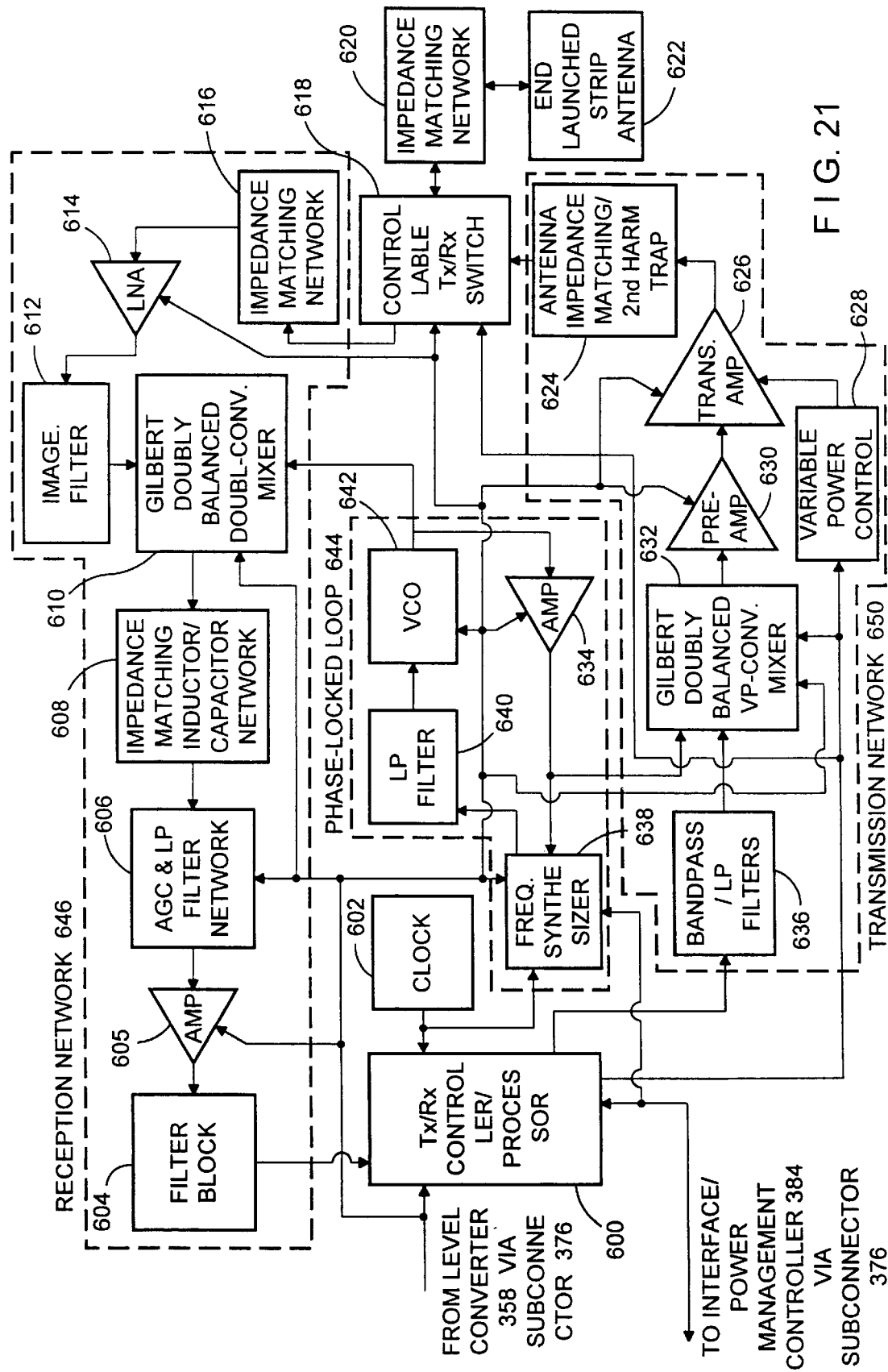
FIG. 21 is a functional block diagram of the spread spectrum radio frequency transmission/reception device of the optical imaging device of FIG. 19, which transmission/reception device is substantially identical to that of the remote management controller/processor of FIG. 20.
Figure 29:
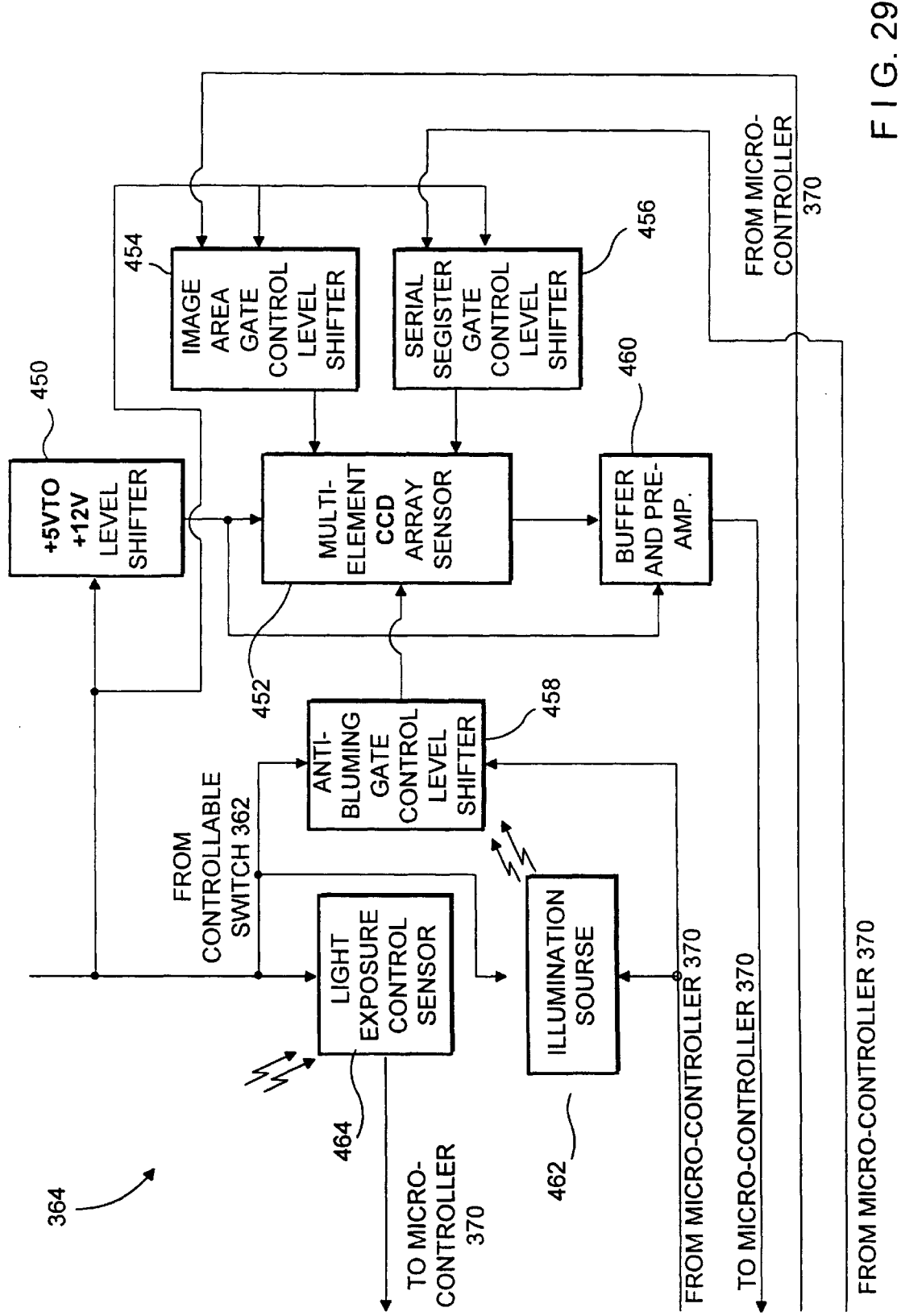
FIG. 29 is a functional block diagram of a preferred construction of the optical scanning system of the optical imaging device of FIG. 19.
Figure 30:
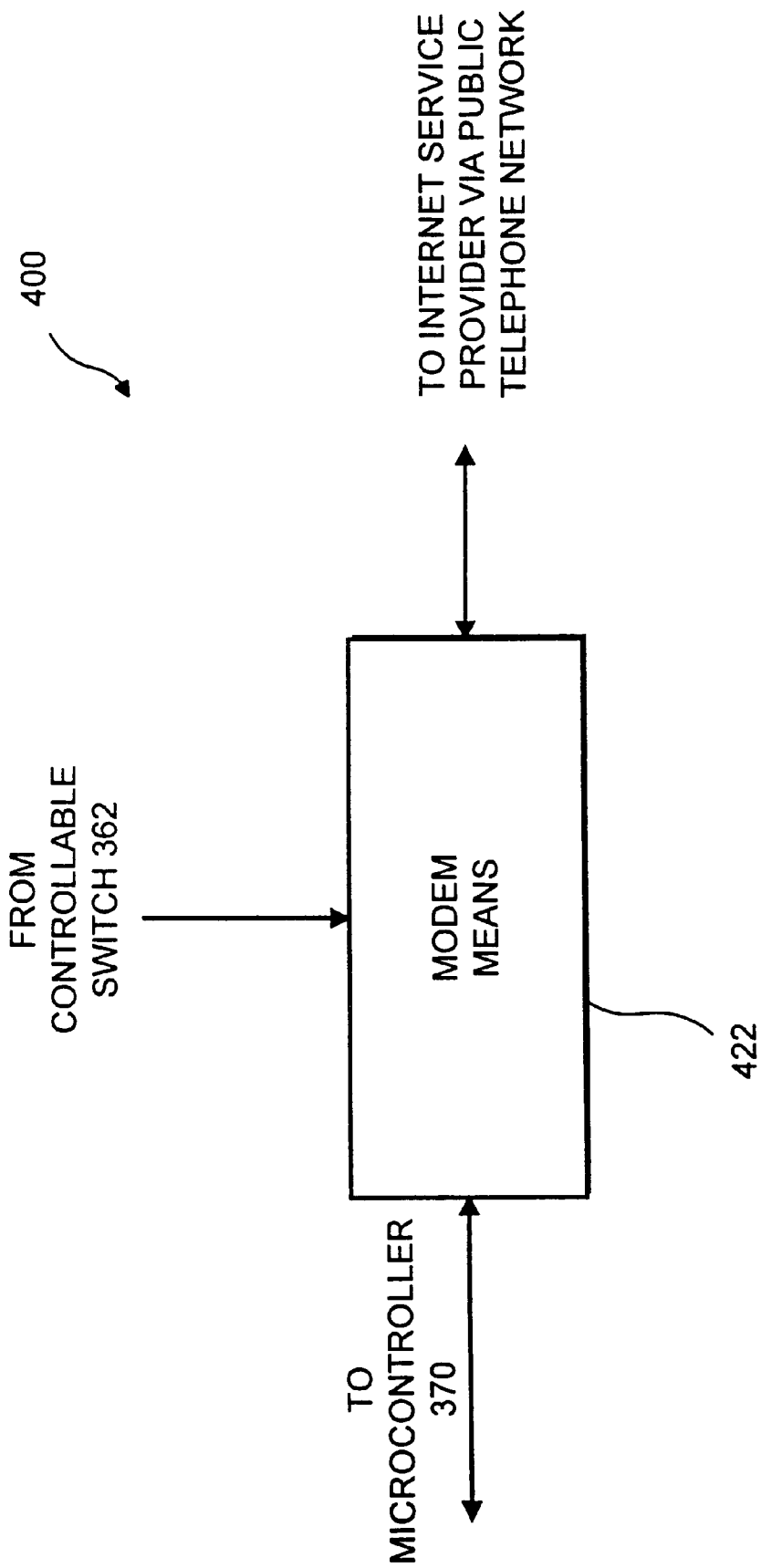
FIG. 30 is a functional block diagram of a preferred construction of the wide area network interface system of the remote management controller/processor of FIG. 20.
Figure 33:
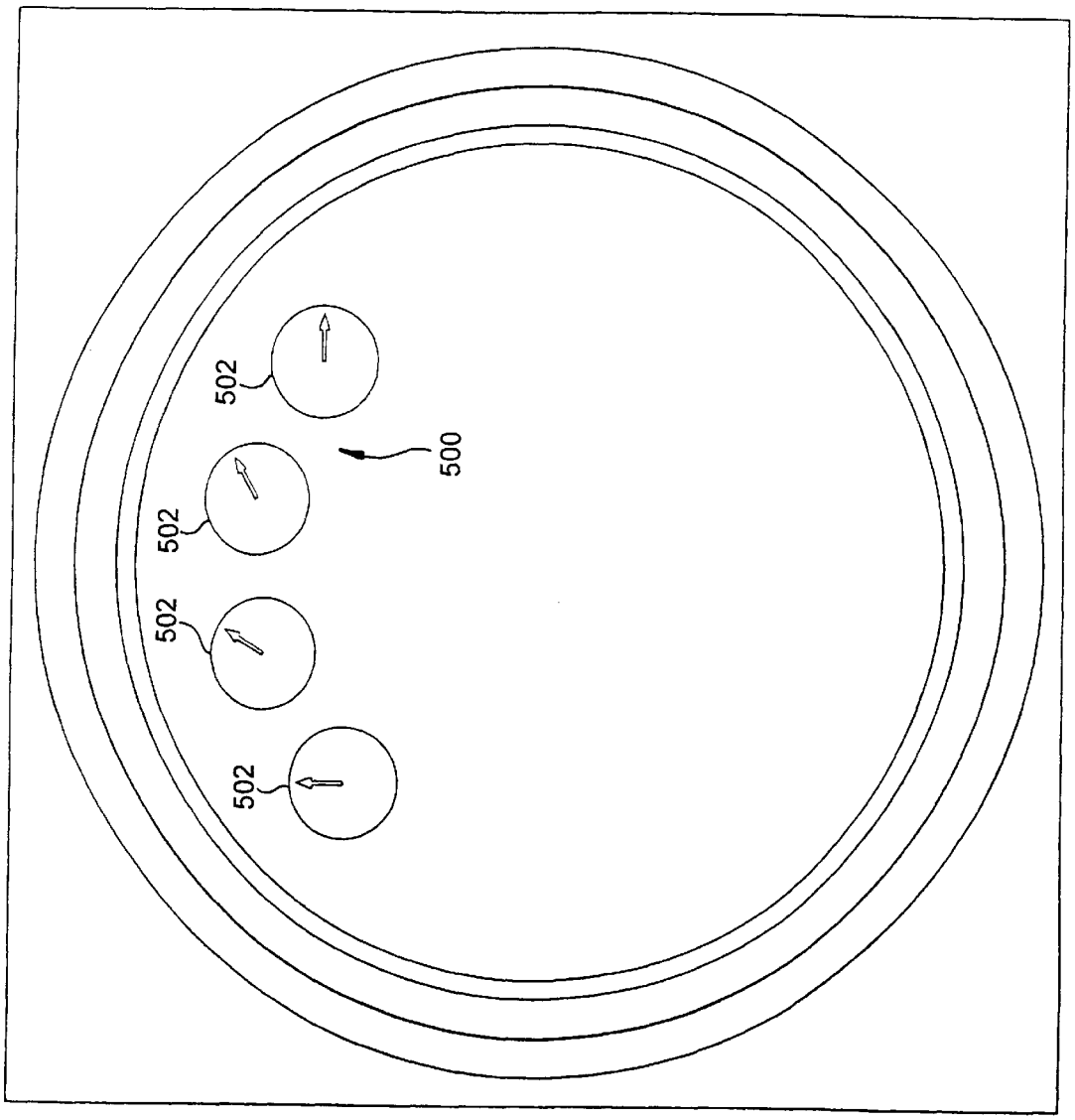
Figure 34:
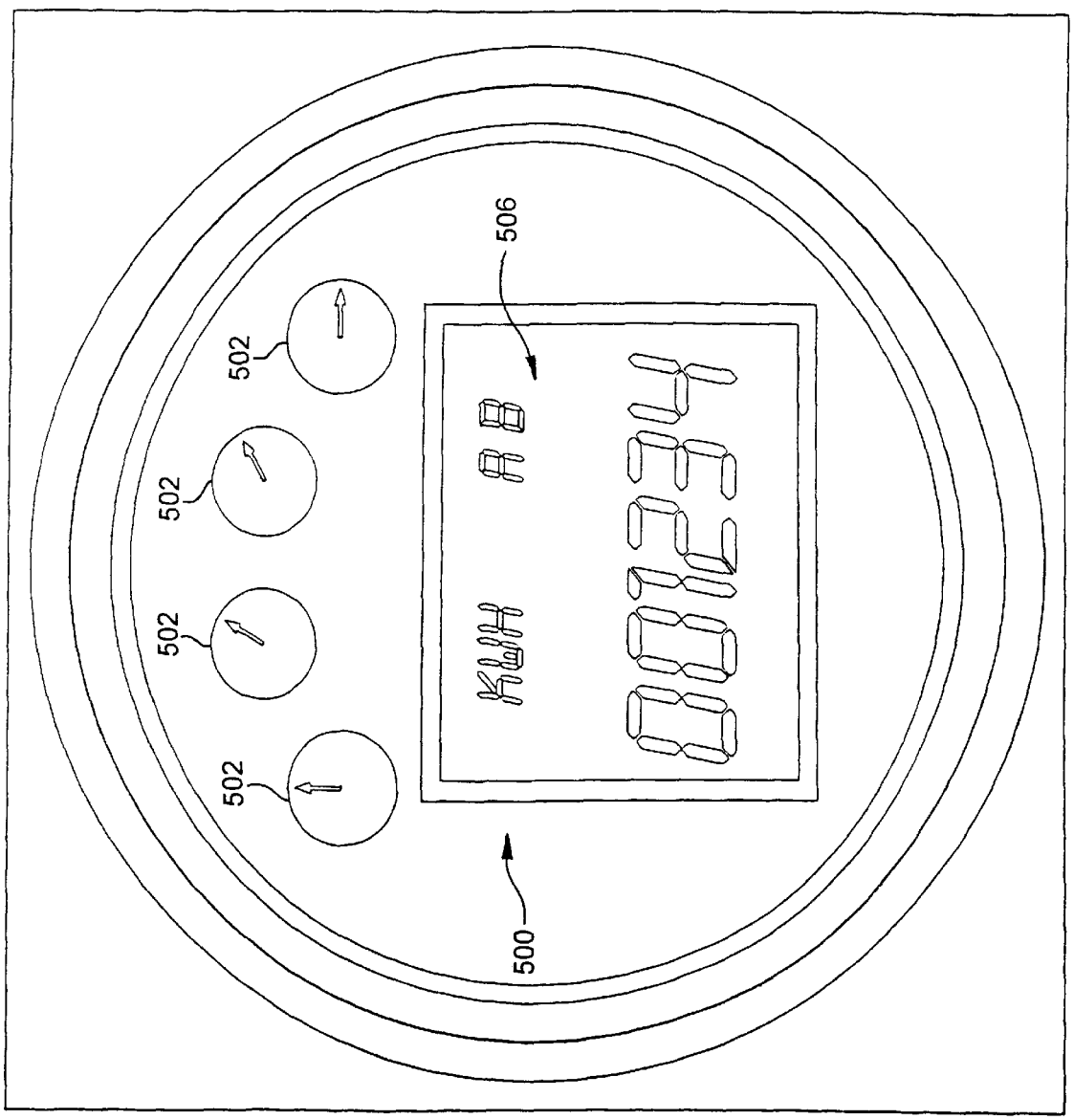

FIGS. 19, 21, and 29 illustrate a preferred construction of the optical and electronic components of the optical imaging devices 316, 318, 320, 322, 324, 326 shown in FIG. 18. As shown in FIG. 19, each of the imaging devices includes an optical scanning system 364 which is controlled by a microcontroller or microprocessor 370 (e.g., comprising conventional 8-bit Motorola 68HC811E2FN microprocessor). Each imaging device also includes an interface/power management controller 384 which controls power usage in the imaging device, and acts as an interface controller between the microprocessor 370, spread-spectrum radio frequency transmission/reception device 377, and optical imaging device tamper/removal sensor 352. Preferably, controller 384 comprises a conventional Microchip 16LC74A-04I/TQFP microcontroller. Microprogram code and imaging device configuration information for use by the microprocessors 370, 384 are stored in memory means 372, while data memory for use by the microprocessors 370, 384 is provided by memory means 374. Preferably, memory means 372 comprises conventional EEPROM memory and associated memory access circuitry for permitting the microprocessor 370 to read therefrom and write data thereto and for permitting the microprocessor 384 to read data therefrom. Preferably, data memory 374 comprises conventional SRAM memory and associated memory access circuitry for permitting reading of data therefrom and writing of data thereto by both microprocessors 370, 384.

Preferably, RF transmission/reception device 377 is comprised by a PC board 850 upon which is mounted the electronic components for implementing the functional blocks illustrated in FIG. 21, which PC board 850 is mounted on optical device PC mother board 854 by connector assembly 376. The mother board 854 includes electronics and opto-electronics 856 for implementing the functional blocks illustrated in FIG. 19 and RF PC board connector assembly 376 which comprises a conventional 20-pin connector for permitting interconnection between various of the components shown in FIGS. 19 and 21.

In one preferred form of the optical devices 316, 318, 320, 322, 324, 326, motherboard 854 and RF PC board 850 are mounted within an elastomeric housing 802, via conventional means 860 which attach the motherboard 854 to the inner surface of the housing 802 so as to be positioned within a generally cylindrical central portion 870 of the housing 802. Preferably, housing 802 is made of a weather-resistant elastomeric material (e.g., Santoprene™ material) which is permeable (i.e., substantially transparent) to the RF radiation transmitted and intended to be received by the transmission and reception device 377, and also includes two other generally cylindrical portions 880, 882 which extend outwardly from opposite ends of the central portions 870. Board 623, which comprises end launched strip antenna 622 used by the transmission/reception device 377, extends longitudinally in a central portion of one 880 of the two extended portions 880, 882. Cylindrical portion 882 comprises collar portion 800 which is removably attached to cylindrical lip portion 801 of the housing 802 by conventional means (not shown). Collar portion 800 is slightly oversized compared to the meter face portion 315 of the meter 308 to which the optical device 316 is intended to be attached, and includes raised portion 803 which engages the outer surface of the face portion 315. A waterproof sealant material may be disposed in the gap 807 in-between the face portion 315 and the collar portion 800 so as to prevent water and other contaminants from entering the housing 802 when the device 316 is attached to the meter 308. A focusing optical lens 855 is attached to the underside of the board 854 for permitting better scanning of the meter face portion 315 by the imaging system 364 of the device 316.

It should be understood that the foregoing discussion of the physical layout and construction of the optical imaging device 316 was made with reference to use with a specific type of metering device (i.e., a conventional water service utility meter), and therefore, the optical device housing 802 may also have other preferred forms depending upon type and dimensioning of metering device to which said housing is attached. For example, if meter 306 is a conventional gas service type of utility meter, imaging device 318 may have the physical layout and construction shown in FIGS. 24–25.

Figure 24:
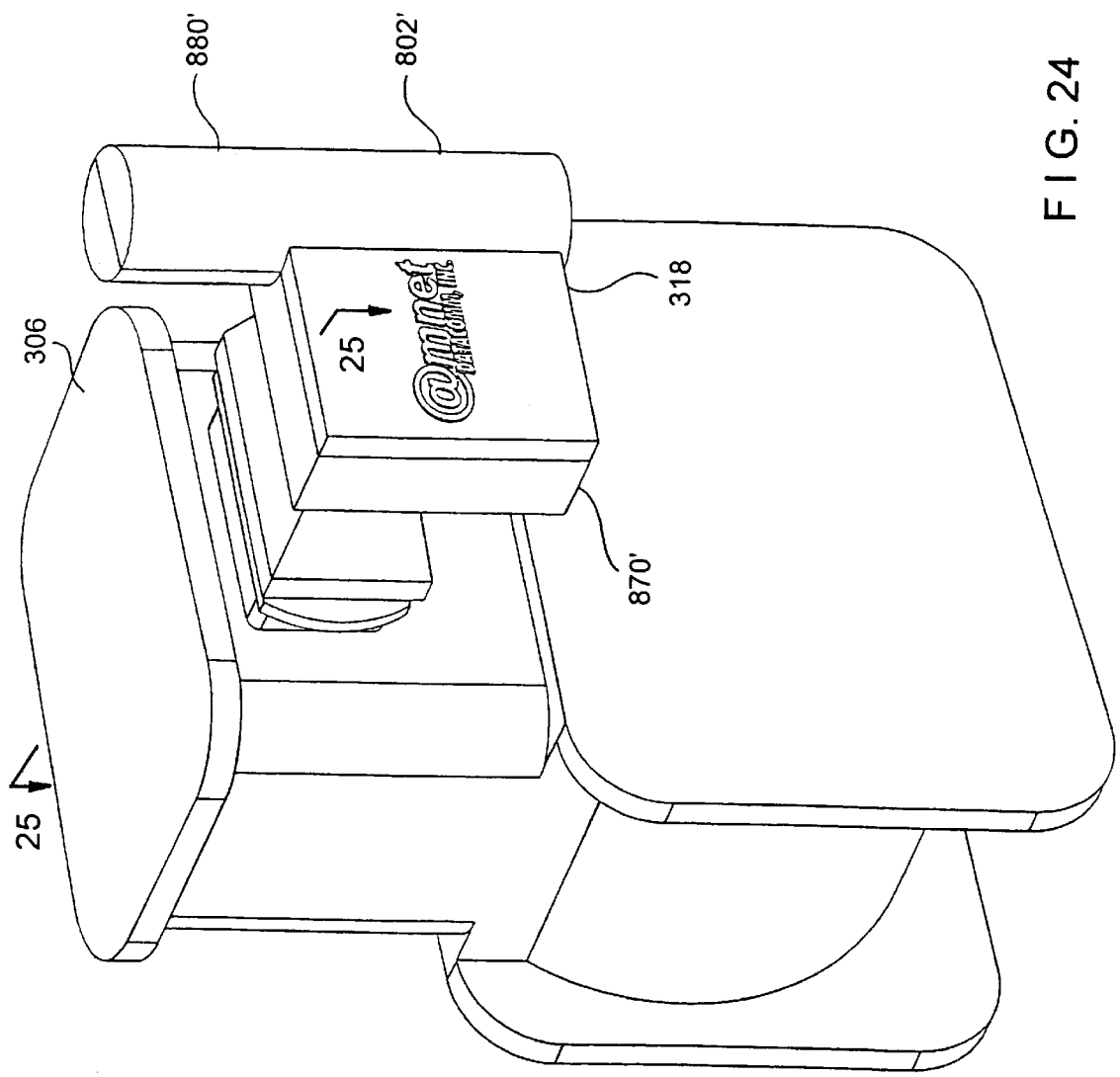
FIG. 24 is an outer, perspective view of another type of optical imaging device of FIG. 18, which device is for use, and is shown in conjunction with, a typical non-machine-readable or machine-readable gas service type of utility meter.
Figure 25:
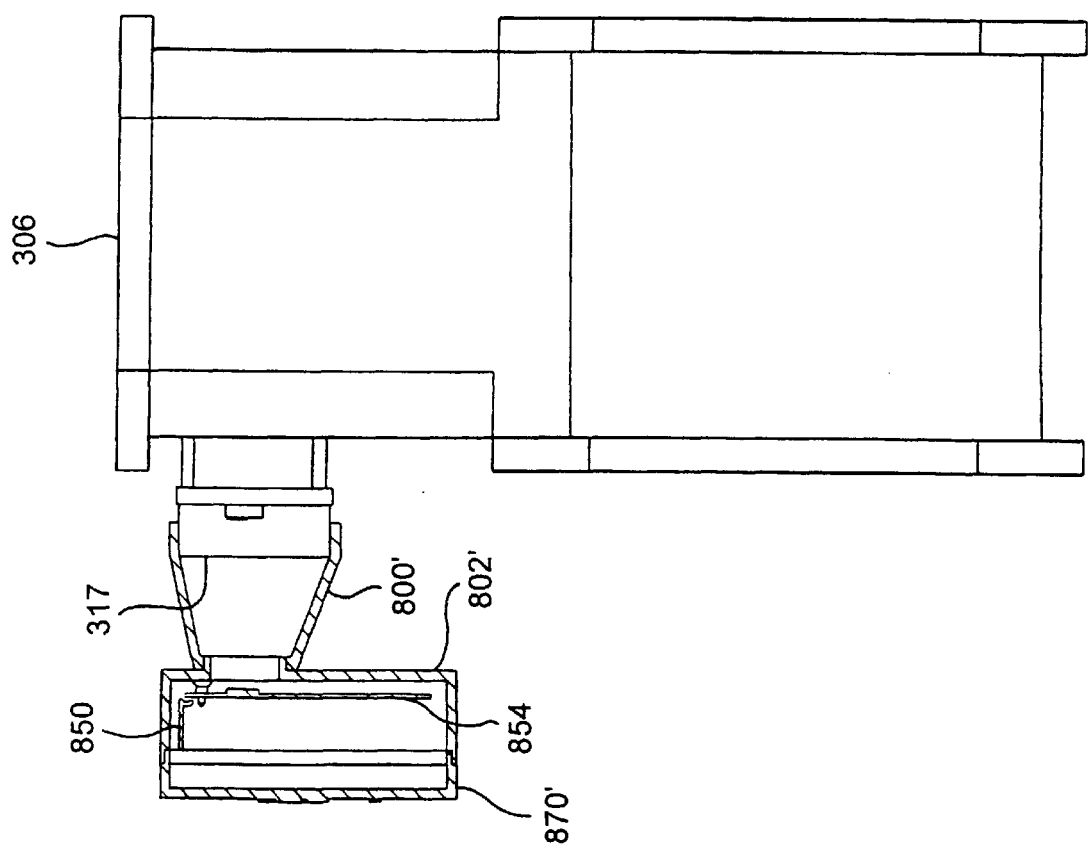
FIG. 25 is a cross-sectional view taken along lines 25—25 of the imaging device of FIG. 25.

As shown in FIGS. 24–25, device 318 comprises housing 802' which includes cylindrical portion 880' (wherein board 623 is disposed), rectangular portion 870' (wherein board 854 is disposed), and generally trapezoidal-shaped collar portion 800' (which attaches to the meter face portion 317). It should be understood that although various components of device 316 have not been shown in FIGS. 24–25 for purposes of clarity, the components and operation of device 318 are substantially identical to those of device 316, except that the components and operation of device 318 are appropriately adapted for use with the gas meter 306.

Figure 26:
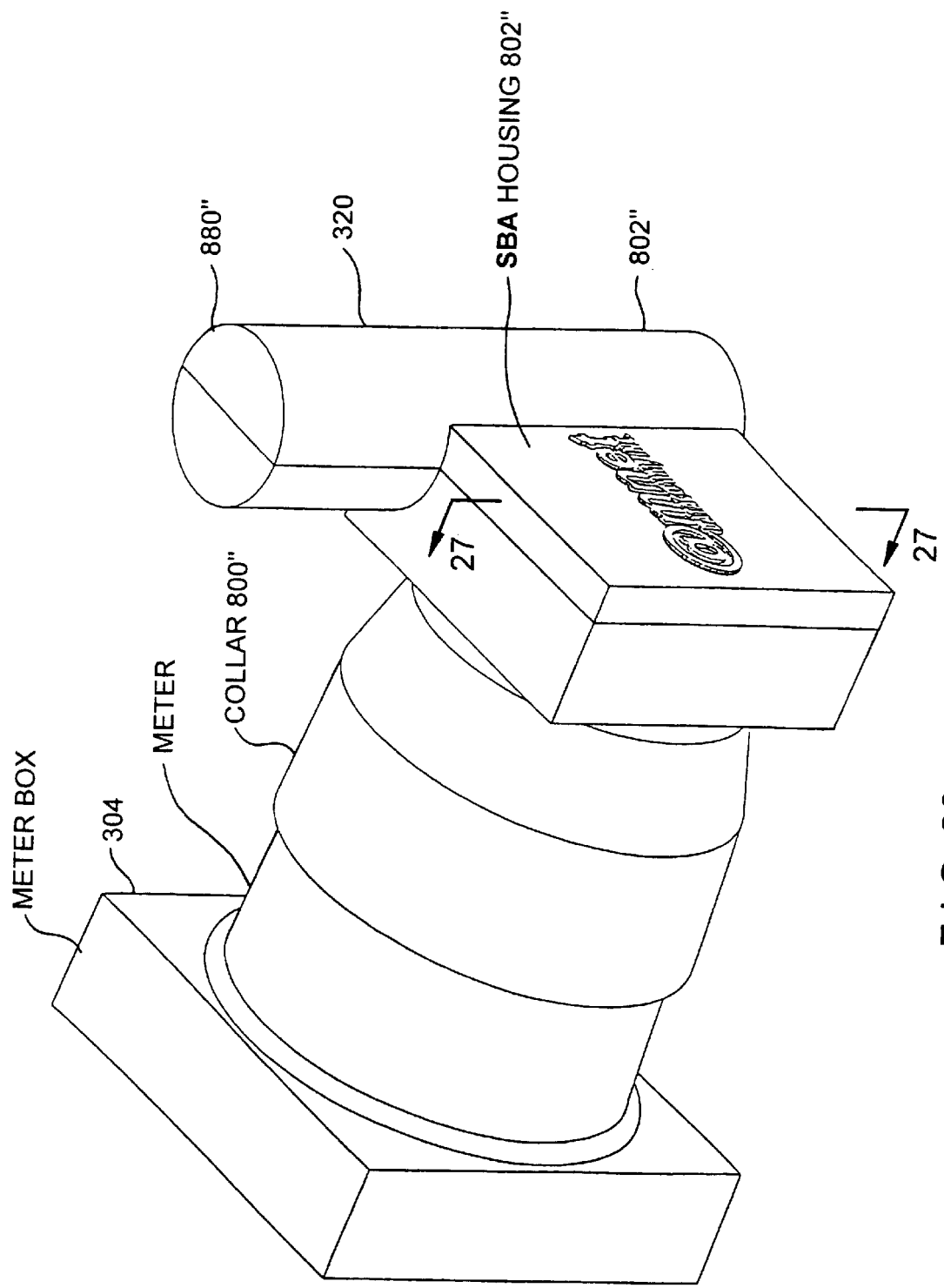
FIG. 26 is an outer, perspective view of yet another type of optical imaging device of FIG. 18, which device is for use, and is shown in conjunction with, a typical non-machine-readable or machine-readable electric service type of utility meter.
Figure 27:
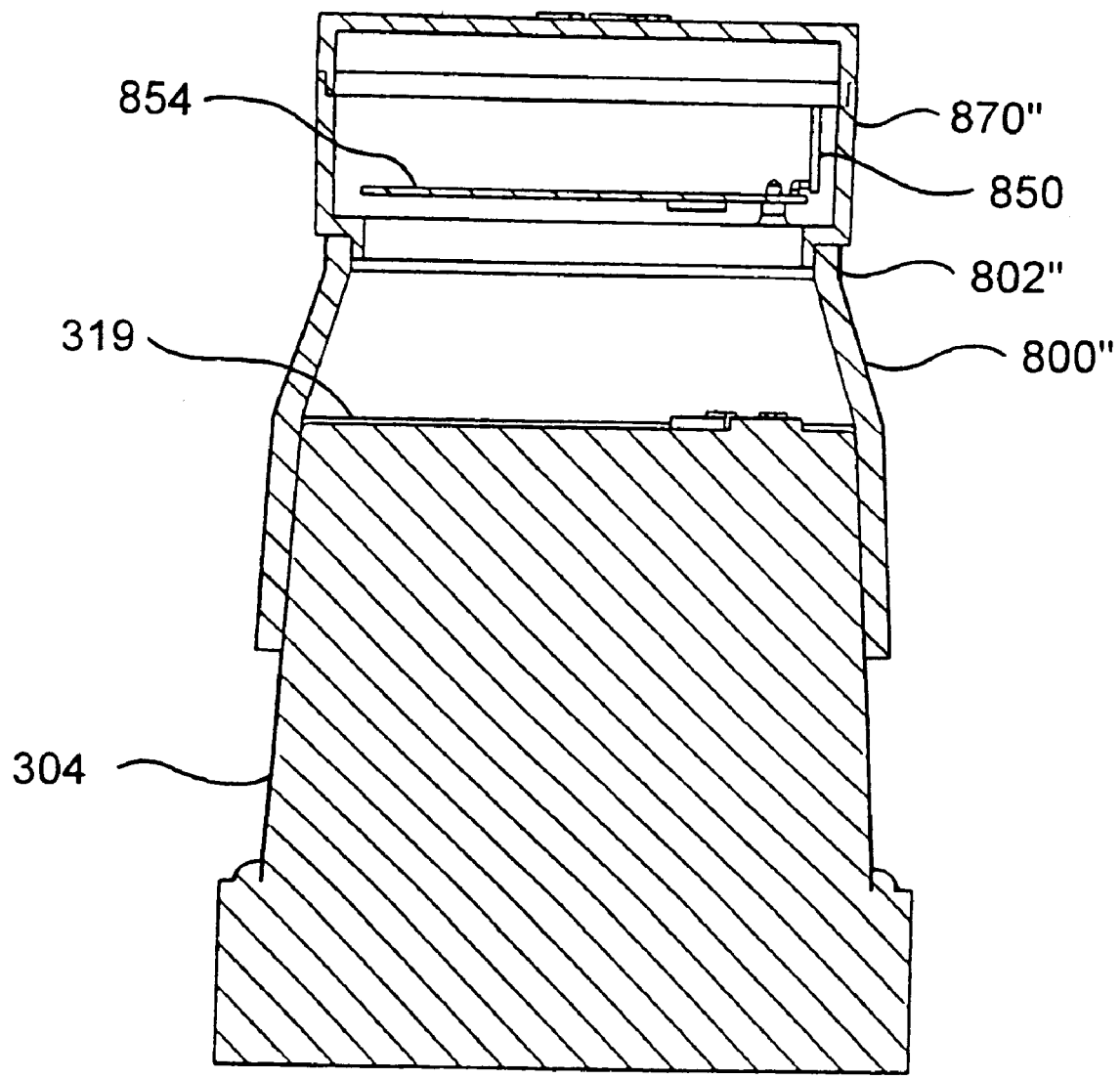
FIG. 27 is a cross-sectional view taken along lines 27—27 of the imaging device of FIG. 28.
Figure 28:
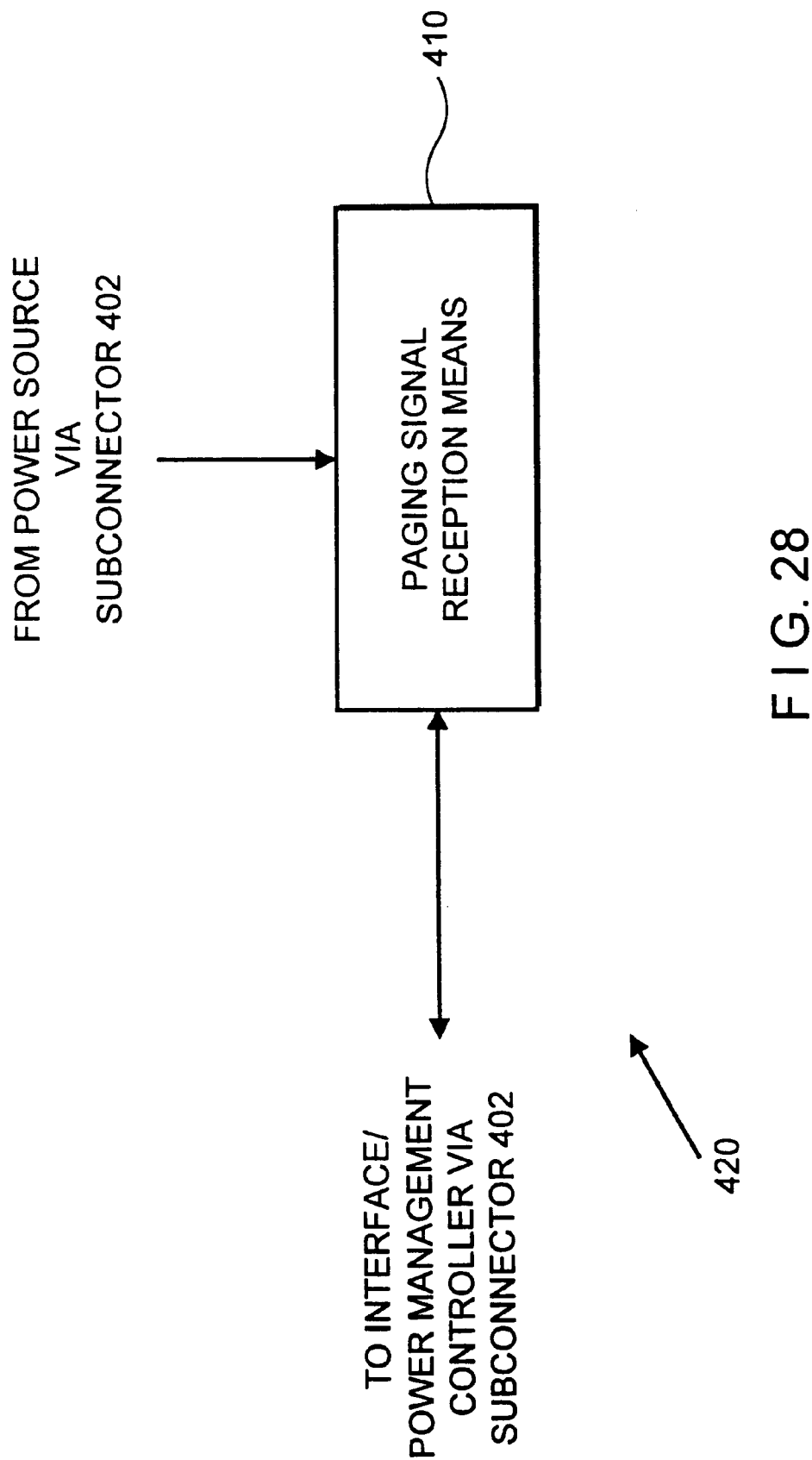
FIG. 28 is a functional block diagram of a preferred construction of the paging signal reception and processing system of the remote management controller/processor of FIG. 20.

Likewise, if meter 304 is a conventional electric service type of utility meter, imaging device 320 may have the physical layout and construction shown in FIGS. 26–27. As shown in FIGS. 26–27, device 320 comprises housing 802" which includes cylindrical portion 880" (wherein board 623 is disposed), rectangular portion 870" (wherein board 854 is disposed), and collar portion 800" (which attaches to the meter face portion 319). It should be understood that although various components of device 316 have not been shown in FIGS. 24–25 for purposes of clarity, the components and operation of device 320 are substantially identical to those of device 316, except that the components and operation of device 320 are appropriately adapted for use with the electric meter 304.

Returning now to the previous discussion concerning the various functional electronic components of the imaging devices, controller 384 is connected to the RF device 377 via the subconnector assembly 376, and clocked by two different clocks 380, 382. As will be described in greater detail below, controller 384 controls power usage of various components in the optical imaging device, and is adapted to enter a low power mode of operation under certain conditions (e.g., lack of reception/transmission activity via the device 377), in order to permit controller 384 to reduce the amount of power consumed by the optical imaging device when the optical imaging device not actively engaged in generation of image data and/or other important processing functions (e.g., receiving and transmitting data via the RF device 377). Low power mode clock 380 preferably comprises a 32.768 kHz quartz crystal oscillator which clocks the controller 384 when the controller 384 is in a low power ("sleep") mode. Normal ("active") mode clock 382 preferably comprises a 4

MHz quartz crystal oscillator which clocks the controller 384 when the controller 384 is in active (i.e., non-low power) mode. When in an active state, microcontroller 370 is clocked by an 8 MHz quartz crystal oscillator 366.

Each of the optical imaging devices 316, 318, 320, 322, 324, 326 also comprises a conventional power source 350, which preferably comprises one or more conventional 3.6 volt, rechargeable lithium thionyl chloride battery cells. Power source 350 continually supplies power to microcontroller 384 via conventional level converter 354, which converter 354 converts the 3.6 volt output of the power source 350 to the 5 volt level required to power the microcontroller 384. Preferably, converter 354 comprises a conventional Linear Technologies LT 1302CN8-5-ND voltage pump and associated conventional circuitry.

Each optical device 316, 318, 320, 322, 324, 326 also includes a plurality of controllable switches 356, 360, 362. Controllable switches 356, 360 are controlled by controller 384 when controller 384 is in active mode. Controllable switch 364 is controlled by controller 370 when controller 370 is powered-up. Preferably, each of the controllable switches 356, 360, 362 comprises a CPCLARE LCA 710 relay switch.

Switch 356 is connected to power source 350 and level converter 358, and receives switching control signals from controller 384, which control signals determine whether the switch 356 permits power supplied to the switch 356 from the source 350 to flow to the level converter 358, and thence to the controllable switches 360,362 and RF device 377 via the subconnector 376. Level converter 358 comprises a conventional Linear Technologies LT 1302-5 voltage pump and associated circuitry for converting the voltage level of power signals supplied to converter 358 from switch 356 (when switch 356 permits such supply) from a 3.6 volt level to a 5 volt level. The 5 volt level power signals supplied from the converter 358 are transmitted to the switches 360,362, and via the subconnector 376 to RF device 377.

Controllable switch 360 controls supply of 5 volt level power signals from the level converter 358 to the microcontroller 370, EEPROM memory 372, and SRAM memory 374, based upon control signals supplied to the switch 360 from the controller 384. Controllable switch 362 controls supply of 5 volt level power signals from the level converter to the optical scanning system 364, based upon control signals supplied to the switch 362 by the controller 370.

Thus, when the control signals supplied to the switch 356 by the controller 384 causes the switch 356 not to permit flow of power from the source 350 through the switch 356, the RF device 377 is powered-down (i.e., deactivated), and the microcontroller 370, optical scanning system 364, and memories 372, 374 are also powered-down, regardless of the states of the switches 360, 362. However, when the switch 356 permits flow of power from the source 350 through the switch 356, and the control signals supplied to the switch 360 by the controller 384 cause the switch 360 not to permit flow of power from the source 350 through the switch 360, the RF device is activated, but the microcontroller 370, memories 372,374, and optical scanning system 364 are deactivated. The optical scanning system 364 is deactivated in this situation since controllable switch 362 is adapted not to permit flow of power through switch 362 in the absence of supply of control signals to the switch 362 from the microcontroller 370, and such control signals cannot be supplied to the switch 362 in such situation, since controller 370 is deactivated.

When controller 384 is ready to enter sleep mode, controller 384 informs microcontroller 370 of same. Microcontroller 370 then saves its current program status into memory 374, and informs controller 384 that controller 384 is permitted to enter sleep mode, whereupon, controller 384 commands switch 356 to no longer permit flow of power through switch 356. This causes the RF device 376, microcontroller 370, memories 372, 374, and optical scanning system 364 to be powered-down. Controller 384 then enters its power-conserving sleep mode.

While controller 384 is in sleep mode, controller 384 periodically generates control signals for causing switch 356 to be in a state wherein RF device 377 is activated and initializes the RF device 377 (in a manner that will be described in greater detail below), so as to permit reception of signals being transmitted to the RF device 377 via the appropriate wireless link from the remote management controller/processor responsible for controlling the optical imaging device of which the RF device 377 is a part. Any such received signals are processed by the RF device (in the manner that will be described below in connection with the specific construction and operation of the RF device 377) to convert same into digital data bit stream useable by the controller 384, which bit stream is transmitted to the controller 384 via the connector 376.

Receipt by the controller 384 of the bit stream from the RF device 377 causes the controller 384 to enter active mode. The controller 384 then commands switch 360 to permit flow of power therethrough, thereby powering-up controller 370 and memories 372, 374. Microcontroller 370 restores its previously stored status from the memories, and informs controller 384 once controller 370 is in a stable internal state for receipt of data, whereupon, controller 384 transmits the data received from the RF device 377 to the microcontroller 370.

Microcontroller 370 is programmed (via appropriate program code stored in memory 372) to decode the data stream whereby to determine which commands are present in the data stream, and whether those commands are intended to be executed by the optical imaging device of which the microcontroller 370 is a part (e.g., whether the remote management controller/processor issuing the commands is the one responsible for controlling the optical imaging device receiving such commands and, if so, whether such commands identify the optical imaging device receiving such commands as being required to execute same).

As noted previously, such commands may include commands to the optical imaging device receiving such commands from the remote management controller/processor responsible for the device to generate and transmit image data representative of the meter face to which the device is attached. If such commands are determined by the microprocessor 370 to be present in the data stream supplied to the microprocessor 370 from the controller 384, microcontroller 370 generates control signals causing switch 362 to power-up optical scanning system 364, and also for causing optical scanning system 364 to generate the image data representative of the meter face and to transmit such image data to the microcontroller 370, in the manner described more fully below. Preferably, switch 362 is only commanded by the microprocessor 370 to permit flow of power to the optical scanning system 364 when it is desired to generate such image data. The microcontroller 370 then transmits the image data (and identifying data discussed more fully below) to the controller 384, which transmits the image data to the RF device 377 via the subconnector 376. RF device 377 then converts (in the manner described more fully below) the image data into spread spectrum transmission signals which are transmitted to the remote management controller/processor responsible for controlling the optical imaging device of which the device 377 is a part. Microprocessor 370 then transmits control signals to the RF device 377 via the controller 384 and connector 376 to cause the RF device 377 to switch to a reception mode from its previous transmission mode.

Once the remote management controller/processor intended to receive the spread spectrum transmission signals representative of the image data actually does receive (and processes, in manner described more fully below) such signals, the remote management controller/processor transmits spread spectrum signals indicative of such receipt together with spread spectrum signals indicative of the optical imaging device from which the spread spectrum signals representative of the image data was received. The RF device 377 of the optical imaging device receives such receipt acknowledgment signals from the remote management controller/processor, processes them (in the manner described more fully below) to produce a data bit stream representative of such signals, and transmits the bit stream to the controller 384 via the connector 376. The controller 384 transmits the bit stream to the controller 370, which controller 370 is programmed to decode the bit stream to determine therefrom that remote management controller/processor to which the spread spectrum signals indicative of the image data was transmitted has received same. The microcontroller 370 then completes execution of any other commands received from the remote management controller/processor responsible for controlling the optical imaging device of which the microcontroller 370 is a part, and thereafter, signals the controller 384 that processing of all such commands has been completed.

Upon receipt of such signals from the microcontroller 370, microcontroller 384 determines whether the aforesaid conditions are present under which microcontroller 384 is programmed to enter low-power mode. If such conditions are present, microcontroller 384 then informs the controller 370 that controller 384 is ready to enter sleep mode, and upon receipt from the controller 370 that controller 370 is ready to be powered down, microcontroller 384 powers down the RF device 376, microcontroller 370, memories 372, 374, and optical scanning system 364, and enters power-conserving sleep mode, in accordance with the procedure previously described.

Turning now to FIG. 29, the preferred construction and operation of the optical scanning system 364 will now be described. System 364 preferably comprises a conventional multi-element monochrome charge-coupled device (CCD) array sensor 452 (e.g., comprising Texas Instruments, Inc. TC211 192×165-pixel CCD image sensor), which array sensor 452 is mounted on the underside of the motherboard of the optical imaging device of which the sensor 452 is a part so as to be able to scan the meter face to which the optical imaging device is attached. When switch 362 is commanded by microcontroller 370 to permit flow of power into the optical scanning system 364, such power is provided to light exposure control sensor 464 and illumination source 462, and permits these components 464, 462 to be activated when microcontroller 370 also provides enabling signals to said components. Without such enabling signals from these controller 370, components 464, 462 cannot become activated.

Also, when the switch 362 is commanded by the microcontroller 370 to permit flow of power into the optical scanning system, such power is converted to a 12-volt level by level shifter 450 and this 12-volt power level is supplied by the shifter 450 to the sensor 452, and buffer and pre-amplifier 460, to active these components 452, 460.

When activated, illumination source (e.g. comprising a conventional light emitting diode) 462 provides sufficient light to the meter face to which the imaging device, comprising the illumination source 462, is attached to enable the sensor 452 to be able to generate useful image data representative of the meter face when commanded to do so by the controller 370; light exposure control sensor 464 (e.g., comprising a conventional photodiode or phototransistor) generates signals representative of lighting strength adjacent the meter face, and transmits said signals to the controller 370.

Controller 370 determines from the signals generated by the sensor 464 if sufficient lighting conditions exists adjacent the meter face to enable generation by the sensor 452 of such useful image data, and if such conditions exist, appropriate control signals are generated by the microprocessor 370 and applied to the anti-bluming, image area, and serial register gates (not shown) of the sensor 452, via level shifters 458, 454, 456, respectively, for causing the sensor 452 to generate transmit said useful image data to the micro-controller 370 (via buffer and pre-amplifier circuitry 460). The level shifters 458, 454, 456, respectively, comprise conventional circuitry for converting the respective voltage levels of the control signals generated by the microcontroller 370 for appropriately controlling the anti-bluming, image area, and serial register gates, respectively, of the sensor 452 to those respective voltage levels appropriate for input said gates.

As will be appreciated by those skilled in the art, the control signals applied to the image area gate of the sensor 452 select which of the pixel image lines of the sensor array 452 is imaged to generate image signals (indicative of the strength of light incident to the pixels of the selected image line), which image signals are transferred to the serial register (not shown) of the sensor 452. The control signals applied to the serial register gate of the sensor 452 cause the image signals currently present in the serial register to be serially transferred (via an output amplifier, which is not shown) to the buffer and pre-amplifier 460 circuitry, which circuitry 460 appropriately conditions for analog to digital conversion by the microprocessor 370. The control signals applied to the image area and serial register gates of the sensor 452 by the microprocessor 370 are adapted to cause each image line of the sensor 452 to be sequentially imaged, the image signals generated thereby to be transferred to the serial register of the sensor 452, and to cause the image signals transferred to the serial register to be transmitted to the micro-controller 370 for analog to digital conversion and transmission as image data representative of the meter face to the remote management controller responsible for commanding the optical imaging device to generate such image data.

Preferred construction and operation of the spread spectrum RF reception/transmission device 377 will now be described. It should be noted at the outset that although not shown expressly in FIG. 21 for purposes of clarity, various of the functional components shown in FIG. 21 should be understood as comprising various filtering, decoupling, impedance matching, noise choking, logic level adjusting networks, as needed, to permit the device 377 to operate in the manner described herein. As shown in FIG. 21, RF device 377 includes a transmission/reception controller/processor 600 connected to transmission network 65, reception network 646, and phase-locked loop (PLL) 644. Processor 600 preferably comprises an Intellon CELinx RF Spread Spectrum Carrier™ RF transceiver chip, which is clocked by a 25.2 MHz crystal oscillator 602.

As will be explained more fully below, device 377 is a simplex type of transceiver, and is designed such that the antenna 622 (which preferably is designed to be primarily resonant at the central frequency of the spread spectrum signals intended to be transmitted and received by the device 377, i.e., 915 MHz in this embodiment, and have a 50 ohm characteristic impedance at this primary resonance frequency, although the antenna 622 may be designed to be primarily resonant and have said characteristic impedance at other frequencies, e.g., 926 MHz) may only be in either a transmit mode or a receive mode at any given time. Processor 600 is able to control whether the antenna 622 is in transmit or receive mode by generating signals for controlling the state of transmit/receive mode selector switch 618. Switch 618 preferably comprises a conventional Motorola MRFIC0903 Broadband GaAs Switch. Depending upon the state of the switch 618, either the output of the transmission network 650 or the input of the reception network 646 is connected to the antenna 622 via impedance matching network 620 (e.g., comprising a plurality of discrete microstrip paths, and one or more inductors and/or capacitors, and designed to provide impedance matching at the primary resonance frequency of the antenna 622 between the output impedance of the switch 618 and the input impedance of the antenna 622). It is important to note that in the absence of either control signals from the processor 600 or supply of power from the source 350 (via the switch 356, converter 358, and connector 376), switch 618 will cause the antenna 622 to be in receive mode (i.e., the antenna 622 will be connected to the reception network 646 via the network 620).

As will be described more fully below, reception network 646 processes spread spectrum signals received via antenna 622 when antenna 622 is in receive mode and device 377 is powered-up, and transmits the processed signals to the processor 600. After receiving the signals processed by the reception network 646, the processor 600 spread spectrum baseband decodes the processed signals based upon the reference signals supplied to the processor 600 from the clock 602 and using conventional techniques well known to those skilled in the art, to convert the processed signals into a digital data bit stream representative of the information content of the spread spectrum signals received by the antenna 622 and usable by the controller 370, optionally performs conventional checksums on the bit stream to ensure that the bit stream consists of valid data, and transmits the bit stream to the controller 384 via the connector 376. Preferably, the baseband frequency used in such decoding (and for encoding data desired to be transmitted from the device 377) by the processor 600 is 4.2 to 6.3 MHz. The controller 384 then processes the bit stream in the manner previously described.

After passing through impedance matching network 616 (preferably comprising a plurality of capacitors, one or more inductors, and a plurality of microstrip lines, and designed to provide impedance matching at the central frequency of the spread spectrum signals intended to be received by the device 377 between the output impedance of the switch 618 and the input impedance of the low noise amplifier 614), the spread spectrum signals received by the antenna 622 when the antenna 622 is in receive mode are amplified by low noise amplifier 614. Amplifier 614 preferably is comprised within a Motorola MC13142D chip, and outputs amplified spread spectrum signals to image filter 612. Filter 612 preferably comprises a Ceramic Dielectric Filter chip, and is a bandpass filter which permits frequencies between 902 MHz and 928 MHz to pass through the filter 612 substantially unattenuated, but attenuates signals with frequencies outside this band by about 50 dB. The filtered signals are then transmitted to a Gilbert doubly balanced downconverter mixer 610.

Mixer 610 preferably is comprised within the same Motorola MC13142D chip comprising the low noise amplifier 614, and receives as its down converter reference signal the output signal from the voltage controlled oscillator (VCO) 642 comprised within PLL 644. Preferably, for reasons that will described in detail below, the output signal of the VCO 642 has a frequency of 915 MHz. This output signal is used by the mixer 610 to down convert the frequency of spread spectrum signal entering the mixer 610 such that, if, for example, the spread spectrum signal entering the mixer 610 has a central frequency of 915 MHz, the down converted spread spectrum signal exiting the mixer 610 has a central frequency of 4.2 MHz to 6.3 MHz and also has a further sideband at 14.7 to 16.8 MHz, which further sideband is attenuated.

The down converted spread spectrum signal is then transmitted to impedance matching network 608 (which preferably comprises an inductor/capacitor network, not shown). Network 608 provides impedance matching at the central frequency of the spread spectrum signal exiting the mixer 610 between the output impedance of the mixer 610 and the input impedance of the automatic gain control and low pass filter network 606.

The spread spectrum signals exiting the impedance matching network 608 enter the network 606, which includes an automatic gain control portion (not shown) which receives the signals exiting the network 608, and a low pass filter network (not shown) which receives the signals exiting the automatic gain control portion of the network 606. The low pass filter portion preferably comprises a plurality of discrete capacitors and inductors and has a 3 dB cutoff point of about 7.5 MHz. The signals filtered by the low pass filter portion of the network 606 are then amplified (preferably by between 0 and 85 dB, and most preferably by 18 dB) by the IF amplifier 605.

The spread spectrum signals exiting the amplifier 605 are then processed by filter block 604. Filter block 604 comprises discrete capacitor and inductor networks which together preferably have a 3 dB cutoff point at 7 MHz, and smooth the signals entering block 604 such that the spread spectrum signals exiting same resemble a changing sine wave, so as to accurately reproduce/reconstruct the original transmitting source baseband signals. The signals exiting the filter block 604 are then processed by the processor 600 in the manner discussed above. Preferably, networks 604, 606 are constructed such that together they attenuate signals more than 3 MHz outside of the band of 4.2 to 6.3 MHz by more than 60 dB.

Transmission network 650 processes digital, spread spectrum baseband encoded signals transmitted from the processor 600 to the network 650. Network 650 comprises bandpass and low pass filters 636 which initially receives the baseband encoded signals from the processor 600. Filters 636 comprise a plurality of discrete inductors and capacitors, and together have a 3 dB cut off point at 7 MHz so as to smooth the spread spectrum encoded digital signals transmitted from the processor 600 so as to have a waveform resembling a changing sine wave. Advantageously, this sharp cut off for frequencies outside of this band permits the transmitting gain and frequency out of band rejection characteristics of device 377 to be superior to that possible in the prior art, as result of superior transmit spurious sideband suppression characteristics caused by such attenuation characteristics.

These smoothed signals are transmitted to Gilbert doubly-balanced up converter mixer 632 (e.g., preferably comprising a Motorola MRFIC 2002 Transmit Mixer). Carrier signals are also supplied to the mixer 632 from PLL 644. When controller 600 supplies enable signals to mixer 632, mixer 632 up converts the smoothed spread spectrum signals supplied thereto, using the carrier mixing signals, to generate up converted spread spectrum signals with a primary frequency of 915 MHz plus or minus 6.3 MHz. These same enable signals supplied to the mixer 632 also cause the switch 618 to connect the transmission network 650 to the antenna 622.

The up converted spread spectrum signals are then amplified (preferably by 18 dB) by a conventional pre-amplifier 630, which amplified signals are then supplied to transmit amplifier 626. Transmit amplifier 626 (e.g., comprising a Motorola MRFIC0914 LDMOS Integrated Power Amplifier) has a controllable output gain which varies substantially proportionally as a function of the power level of control signals supplied thereto from variable power controller 628. Variable power controller 628 preferably comprises a user (i.e., human) adjustable network of resistors (not shown) which receive the same enable signals from the processor 600 as those received by the mixer 632. The attenuation provided to the enable signals received by the controller 628 is user-selectable by adjusting the resistor network (or adjustment pins associated therewith). Thus, by appropriately selecting the attenuation level provided to the enable signals by appropriately adjusting the resistor network, a user may select a desired amount of amplification to be applied to the spread spectrum signals by the transmit amplifier 626. Preferably, the resistor network is initially set (i.e., at time of manufacturing) to cause the amplifier 626 to amplify the spread spectrum signals supplied to the amplifier 626 by about 22 dB. Depending upon the amount of amplification provided by the amplifier 626, the output (i.e., transmit power) of the device 377 may vary between 10 mW and 950 mW.

Of course, it will be appreciated by those skilled in the art that the controller 628 need not comprise user-adjustable resistor network as discussed above. Rather, alternatively, if the device 377 is modified in ways apparent to those skilled in the art, the controller 628 may comprise a digitally programmable attenuator device that adjusts the power level of the control signals supplied to the amplifier 626 based upon digital program signals supplied thereto by the microcontroller 384.

The spread spectrum signals amplified by the amplifier 626 are then supplied to the antenna impedance matching/second harmonic trap network 624 which processes the spread spectrum signals transmitted therethrough by providing both impedance matching at the primary frequency of the spread spectrum signals (i.e., preferably 915 MHz) between the input impedance of the switch 618 and the output impedance of the amplifier 626 and second harmonic trapping of those signals. The signals processed by the network 624 are then transmitted to the antenna 622 via the switch 618 and impedance matching network 620.

PLL 644 comprises frequency synthesizer 638 (comprising e.g., Motorola MC145191 PLL Frequency Synthesizer) which receives as inputs control signals from controller 384 (via the connector 376), reference frequency signals generated by the crystal oscillator 602, and output signals from the VCO 642 (after said output signals are amplified by 18 dB by amplifier 634). Synthesizer 638 contains at least two programmable counter registers (not shown) of appropriate respective numbers of bits to accomplish the desired functionality therefor, which functionality will be described below. A first counter register is constructed to be incremented each time the clock signal generated by clock 602 cycles one period. Each time the counter overflows, a reference pulse is generated. A second counter register is constructed to be incremented each time the output signal from the VCO 642 cycles one period. Thus, the frequency of the pulses generated by the first counter is equal to the frequency of the clock signals divided by the number of bits of the first counter. The frequency of the pulses generated by the second counter is equal to the frequency of the output signal from the VCO divided by the number of bits of the second counter. The synthesizer 638 includes means (not shown) for comparing the frequency of the pulses generated by the first counter with the frequency of the pulses generated by the second counter, and for generating a feedback error signal whose voltage level varies between 0 and 5 volts, and is proportional to the degree of difference that exists between said frequencies.

The feedback error signal is supplied to low pass filter 640 (which preferably comprises low pass filter network (not shown) consisting of a plurality of discrete capacitors, resistors, and inductors, etc. configured to stabilize the VCO drive voltage.

VCO 642 preferably is comprised in the same Motorola MC13142D chip comprising the mixer 610 and amplifier 614. As will be readily appreciated by those skilled in the art, VCO 642 is constructed such that the frequency of the signal output by the VCO 642 is controlled by the feedback voltage control signal output by the synthesizer to the low pass filter 640, and the output signal from the synthesizer 638 causes the frequency of the signal output by the VCO to change until the frequencies of the pulses generated by the first and second counters are the same, at which point steady state ("lock") conditions exist. When such "lock" conditions exist, the synthesizer 638 transmits signals to the controller 384 to inform the controller 384 that such conditions are present.

In response to appropriate control signals from the controller 384, the first and second counters may be caused to load respective numerical scale factors, which have the effect of varying the respective frequencies of the pulses generated by the counters depending upon the value of the scale factors loaded into the counters. Thus, by appropriately changing the scale factors loaded in the counter registers, the lock frequency of the VCO 642 output signal may be changed to any arbitrary frequency within the VCO's lock range. In accordance with this embodiment of the present invention, the controller 384 is programmed to store in the first and second counter registers of the synthesizer 638, upon power-up of the device 377, scale factors sufficient to cause the lock frequency of the output signals of the VCO 642 to be 915 MHz.

Thus, advantageously, since the output signals from the VCO 642 are to up convert the baseband encoded signals generated by the processor 600, and to down convert the spread spectrum signals received by the antenna 622, the frequencies at which the device 377 transmits and receives spread spectrum signals may be adjusted (i.e., tuned) over a significant range solely based upon commands issued by the microcontroller 384 to the synthesizer 638, without the need to replace and/or physically adjust the components of the device 377. Of course, it will be appreciated that the first and second counter registers may each comprise a plurality of counter registers which together perform the functions described above for each of the first and second counter registers.

As discussed previously, when microprocessor 370 desires to transmit data from device 377 transmits the data to the controller 384 with appropriate control signals for causing the controller 384 to command the device 377 to transmit this data. The data to be transmitted is temporarily stored in the data memory 374, and controller 384 then commands the processor 600 to cause the switch 618 to connect the reception network 646 to the antenna 622, and the controller 384 waits a predetermined time period to ascertain detect whether another (i.e., external) device is broadcasting on the same frequency as that to which the device 377 is tuned to transmit. Once the predetermined time period has passed and no such other broadcasts are detected, the controller 384 determines from the synthesizer 638 whether the VCO 642 output signals are in "lock" condition, and if such conditions do not yet exist, the controller 384 waits for same to be signaled by the synthesizer 638.

Once such "lock" conditions are signaled to the controller 384, the controller 384 commands the processor 600 to cause the switch 618 to connect the transmit network 650 to the antenna 622, and to enable the mixer 632 and transmit amplifier 626. The controller 384 then commands the processor 600 to spread spectrum baseband encode and transmit a data packet indicating that the optical imaging device of which the device 377 is a part is going to begin broadcast. In response, the processor 600 spread spectrum baseband encodes the data packet and transmits the encoded data packet to the antenna 622 via the transmission network 650 and switch 618.

The controller 384 then commands the processor 600 again to switch the device 377 into reception mode for another predetermined time period, whereby to determine whether an external device is broadcasting on the transmission frequency of the device 377. After such time period has passed without reception of other such broadcasts, the controller 384 commands the processor 600 to switch the device 377 into transmission mode, retrieves the data to be transmitted from memory 374, and commands the processor 600 to encode and transmit the data as a bit stream containing preamble information identifying the optical imaging device transmitting the data and a trailer containing a checksum of the data transmitted and an end of data transmission packet symbol. In response, the processor 600 encodes and transmits the bit stream to the antenna 622 via the transmission network 650, switch 618, and matching network 620.

When switch 356 is commanded to permit flow of power therethrough, this results in supply of activating power to the device 377 via the level converter 358 and subconnector 376, and more specifically, results in supply of power to the processor 600, networks 606, Gilbert mixers 610, 632, frequency synthesizer 638, VCO 642, amplifier 634, low noise amplifier 614, controllable switch 618, pre-amplifier 630, and transmission amplifier 626. Supply of this activating power to these components causes the device 377 to be in powered-up state wherein the device 377 is able to transmit or receive spread-spectrum RF signals. Conversely, when controllable switch 356 is commanded not to permit transmission therethrough of power from the source 350, activating power is not supplied to these components, thereby causing the device 377 to be in a powered-down state wherein the device 377 is unable to transmit or receive such signals. In the absence of instructions from the controller 384 to the processor 600 to transmit signals from the antenna 622, when the processor 600 is activated, the processor 618 does not supply control signals to the switch 618, thereby causing the antenna 622 (and thus, also device 377) to be in receive mode.

The output signal from the converter 354 also used by the controller 384 to permit the controller 384 to determine based upon the strength of such signal whether the power source is in a low power state (i.e., output power from the source 350 has decreased to a level of 2.19 volts. If such a low power state is determined to exist, the controller 384 transmits data via device 377 to the remote controller/processor responsible for controlling the imaging device of which the controller 384 indicating that the controller 384 has sensed a low power condition. Upon receipt of such data, the remote controller/processor reports this information to the host processor 344 so as to permit appropriate human intervention to be initiated to correct the low power condition. Alternatively, controller 384 may be programmed to signal such low power condition when the sensed voltage level falls below 1.6 to 2 volts, and to transmit data indicating such low power condition to the remote controller/processor every time the optical imaging device of which the controller 384 is a part scans the meter to which said device is attached. Further alternatively, if modified in ways apparent to those skilled in the art, the microprocessor 370 (rather than the controller 384) may be adapted to determine whether a low power condition exists, and to report same in the manner discussed above.

Each optical imaging device also includes both a temperature sensor 368 and a tamper/removal sensor 352. Temperature sensor 368 preferably comprises a conventional thermistor (e.g., Dale NTHS-1206J0210K10%) for generating an output signal related to the temperature adjacent the electronic components on the mother board and the RF device 377; the output signal generated by the sensor 368 is transmitted to the microprocessor 370 and is used by the microprocessor 370 to calculate the temperature adjacent these electronic components.

Preferably, in this embodiment of the present invention, the EEPROM memory 372 contains a look-up table relating temperatures adjacent the electronic components on the mother board and RF device 377 to expected drifts in transmission/reception frequency calibration tuning of the RF device resulting therefrom. Microcontroller 370 is programmed via appropriate program code contained in the program memory 372 to determine (based upon the calculated temperature adjacent the electronic components on the mother board and RF device 377, and the drift in tuning calibration expected to result therefrom stored in the memory look-up table) to command the controller 384 to adjust the spread spectrum transmission and reception frequencies to which the device 377 is tuned, by controlling the synthesizer 638 to generate feedback control signals which cause the frequency of the signals output by the VCO to be appropriately adjusted, in order to ensure that the RF device 377 is in fact tuned to transmit and receive at the nominal spread spectrum central frequency to which it is desired to be set (e.g., between 902 MHz and 928 MHz, and most preferably 915 or 926 MHz).

In a similar fashion, microcontroller 370 may be programmed to ascertain the age of electronic components of RF device 377 critical to proper tuning of the device 377 (e.g., reference clock 602), and to use this age information to adjust the spread spectrum transmission and reception frequencies to which the device 377 is tuned so as to ensure that the device 377 is in fact tuned to transmit and receive at the nominal spread spectrum central frequency to which it is desired to be set. This may be accomplished by programming controller 384 to maintain a running clock of elapsed time since installation at the customer site of the imaging device of which the controller 384 is a part, and by storing in memory 372 a look-up table of calibration information relating the age of such components to expected drift in transmission/reception frequency calibration tuning of the RF device 377 resulting therefrom. Microcontroller 370 is programmed via appropriate program code contained in the program memory 372 to determine (based upon the age of the aforesaid electronic components, and the drift in tuning calibration expected to result therefrom stored in the memory look-up table) to command the controller 384 to adjust the spread spectrum transmission and reception frequencies to which the device 377 is tuned by controlling the synthesizer to generate feedback control signals which appropriately adjust the frequency of the signals output by the VCO, in order to ensure that the RF device 377 is in fact tuned to transmit and receive at the aforesaid nominal spread spectrum frequencies to which it is desired to be set.

Removal sensor 352 comprises a conventional means for detecting proximity of and/or engagement of the collar portion 800 of the optical imaging device housing 802 to the meter face portion 315 of the meter 308 to which the optical device 316 is attached. Preferably, proximity detector 352 comprises a conventional 3-way electromechanical switch mechanism (e.g., a Cherry DH2C-C4AA switch) 499 mounted to and within the collar portion 800 of the optical imaging device housing 802, which switch 499 has an spring-loaded, elongate end portion 804 which is adapted to be set into engagement with the meter face portion 315 of the meter 308 when the collar portion 800 of the housing 802 is brought into engagement with the face portion 315. When the switch 499 is set in this manner, a spring biasing force is applied to the end portion 804 by the spring-loading mechanism (not shown) of the switch 499, which biasing force is adapted to cause the end portion 804 to drop down if the collar portion 800 (and thus, also the end portion 804) is disengaged or otherwise moved from the meter face portion 315. Switch 499 is adapted to close when this happens and to supply a non-maskable interrupt request signal to the controller 384.

Upon receipt of this interrupt request signal from the switch 499, controller 384 is programmed to begin processing of an interrupt handler routine stored in program memory 372, which routine includes among its processing steps, causing the controller 384 to return to normal (i.e., non-low power consumption) processing mode, if prior to receipt of the interrupt request signal from the switch 499, controller 384 was in low power mode, and powering up the microcontroller 370, data memory means 374 and RF reception/transmission device 377 by appropriately controlling the power control switches 356 and 360 to supply power to these components, in the manner described previously. Once these components have been powered up, the controller 384 transmits to the microprocessor 370 appropriate signals for indicating to the microprocessor 370 that the collar portion 800 has been removed from engagement with the face portion 315 of the meter 308. In response to these signals from the controller 384, the microcontroller 370 commands the controller 384 to cause the transmission/reception device 377 to transmit to the remote controller/processor 338 that controls the optical imaging device 316, of which the microcontroller 370 is a part, signals indicative of such removal along with the optical imaging device's identifying information.

Once the controller 338 receives these signals and identifying information, the controller 338 contacts the remote host computer processor 344 via the wide area network 342 and informs the processor 344 of removal of the optical imaging device 316 from the face portion 315 of the meter 308. The processor 344 preferably is adapted to take appropriate steps to inform human personnel of such removal. For example, processor 344 may be adapted to display and/or sound appropriate warnings of such removal to human operators (not shown) of system 300, and inform the utility company computer 346 whose services are being monitored by the meter 308 being removed, via appropriate signals transmitted to the computer 346 via the network 342.

Figure 20:
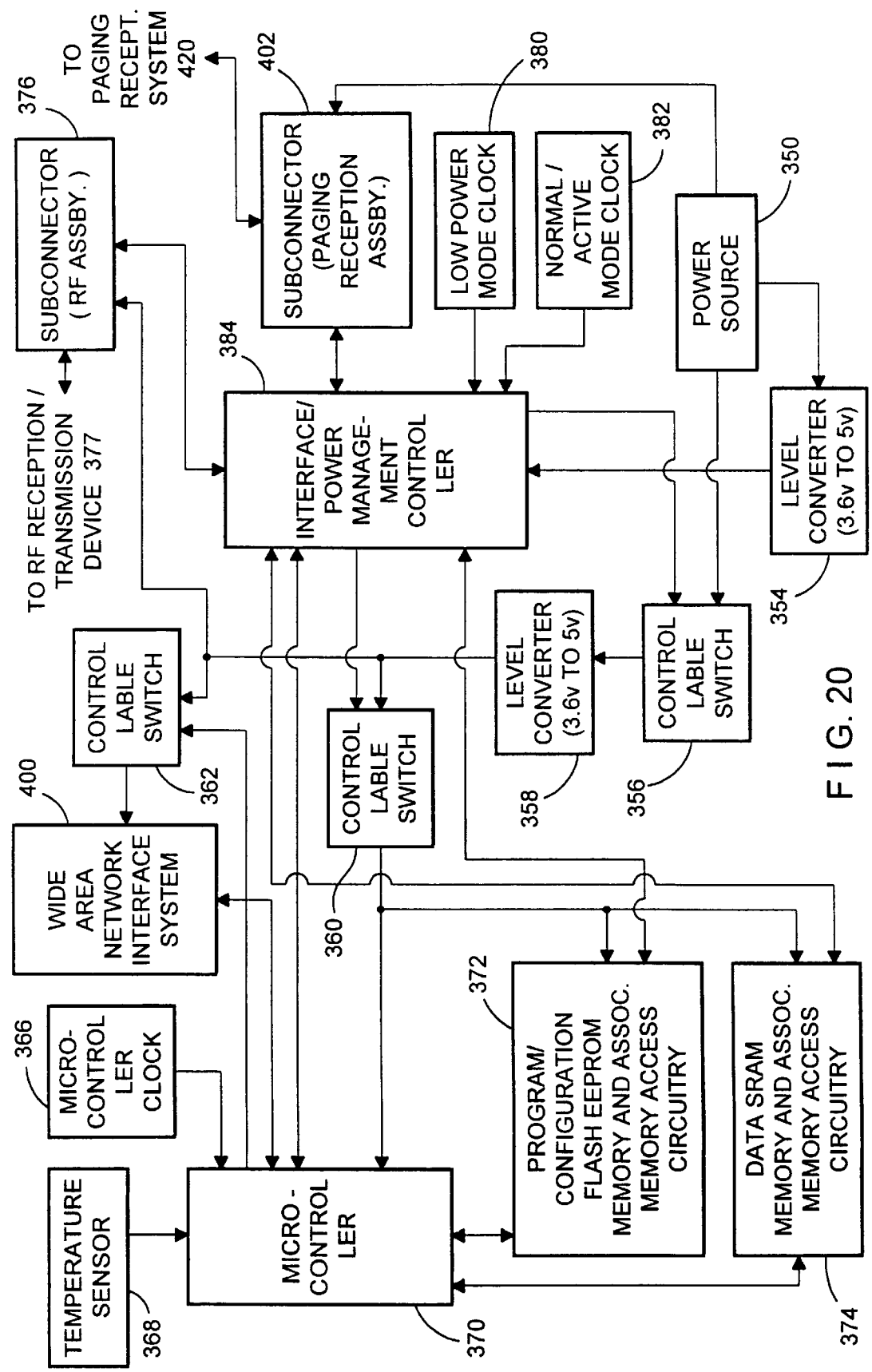
FIG. 20 is a functional block diagram of the electronic components of one remote management controller/processor of the preferred embodiment of FIG. 18.
Figure 35:
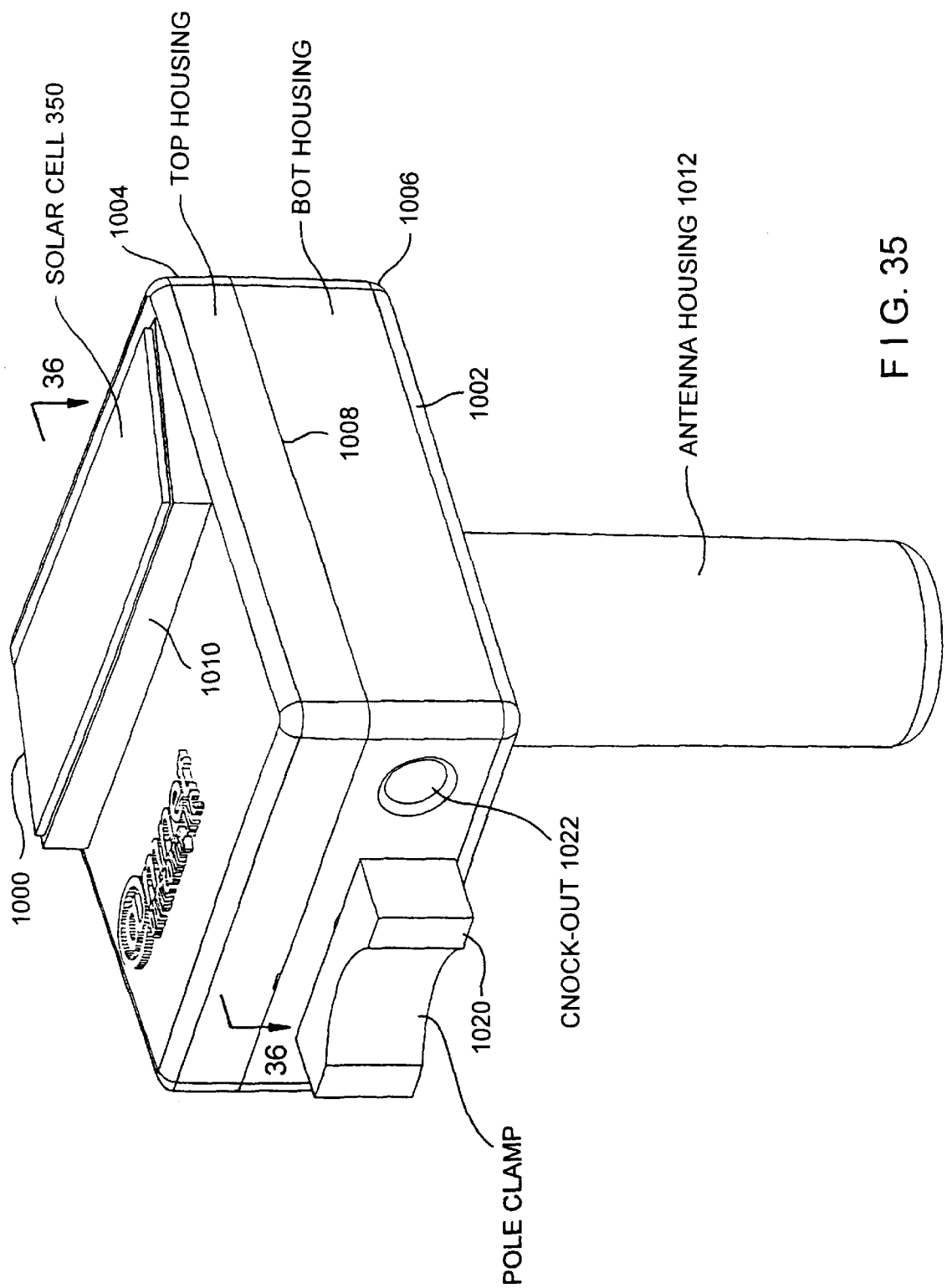
FIG. 35 is an outer, perspective view of the remote controller/processor of FIG. 20.
Figure 36:
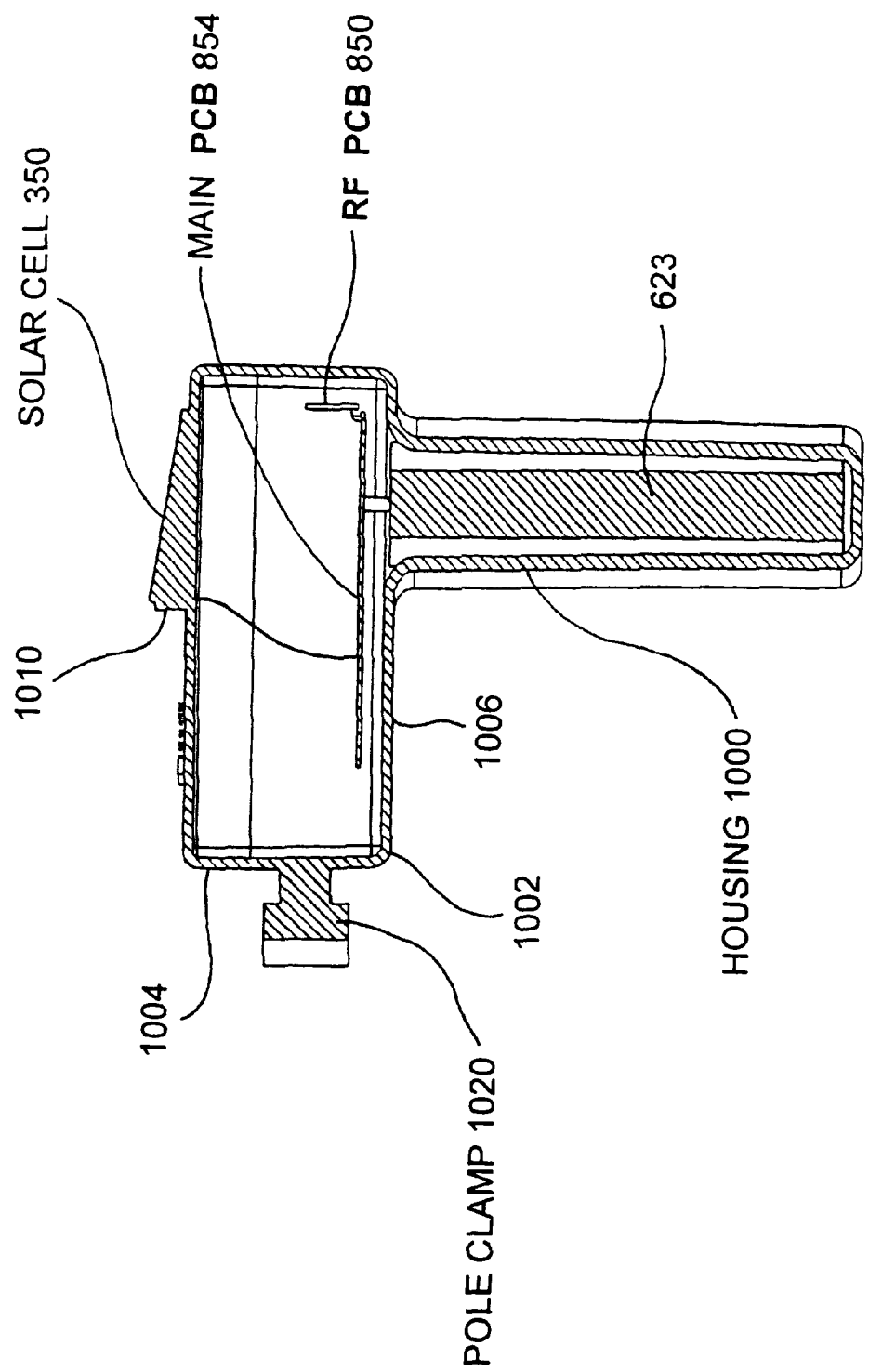
FIG. 36 is a cross-sectional view taken along lines 36—36 of FIG. 35.

Turning now to FIGS. 20, 35, and 36, a preferred construction and operation of remote controllers 338, 340 will now be described. It should be appreciated at the outset that unless stated to the contrary, the various functional components of the controllers 338, 340 are substantially identical to the functional components of like reference numerals in optical imaging devices 316, 318, 320, 322, 324, 326. As shown in FIG. 20, in each controller 338, 340, the optical scanning system 364 of the optical imaging devices is replaced with a wide area network interface system 400. Preferably, system 400 comprises conventional means 422 (e.g., including Rockwell RC224ATFPPLCC 2400 Baud modem configured in a conventional two-wire telephony direct access arrangement to interface with network 342) for permitting the microprocessor 370 to communicate and exchange data with the host processor 344 via wide area network 342. Preferably, microcontroller 370 only permits power to be supplied to the system 400 via switch 362 when microcontroller 370 is actively communicating with host processor 344.

Each controller 338, 340 also comprises a paging signal reception system 420 which is connected via a conventional 6-pin connector 402 to the controller's motherboard. The system 420 comprises a conventional paging signal reception means 410 which receives and processes (in a manner described more fully below) RF paging signals caused to be transmitted from a conventional RF paging system (not shown) by host processor 344. Paging system reception means 410 is continually supplied with power from the power source 350.

In each controller 338, 340, controller 384 preferably is programmed to put the remote management controller of which the controller 384 is a part into reduced power consumption mode when, for example, no information is being transmitted or received from the host processor 344, another remote management controller, or optical imaging device. When these conditions are determined to exist by the microcontroller 384, the microcontroller 384 informs the processor 370 that the controller 384 is ready to put the remote management controller of which the controller 384 is a part into such mode. In response, the processor 370 saves its current program status and related data in memory 374, and informs the microcontroller that same has been carried out.

Once the controller 384 receives this information from the processor 370, the controller 384 controls switches 356 and 360 to deactivate the RF device 377, microprocessor 370, and memories 372, 374. This causes system 400 to also be deactivated since microprocessor 370 is deactivated. Once this has been carried out, the controller 384 places itself into sleep mode, wherein it periodically powers-up the RF device 377 to ascertain whether messages are being sent from any of the optical imaging devices over which the remote management controller comprising the controller 384 has control. If such messages are received, the controller 384 powers up the components necessary to process such messages (and inform the host processor 344, if necessary). Otherwise, the controller 384 maintains these components in a deactivated state.

When paging signals are received by the reception means 410 which the means 410 identifies as being intended for reception by the remote controller of which the means 410 is a part, the means 410 signals receipt of such signals to the controller 384. This causes controller 384 return to active mode if it was previously in sleep mode, and controller 384 controls the switches 356, 360 to power-up the RF device 377, microprocessor 370, and memories 372, 374. After reaching a stable internal state, microcontroller 370 contacts the host processor 344 via system 400 and network 342, and requests that the host processor 344 provide it with instructions. The host processor 344 then transmits its instructions to the microprocessor 370 via the network 342 and the system 400. Alternatively, the paging signals provided by the host processor 344 may include one or more command strings for causing the microprocessor 370 to undertake appropriate actions (i.e., initiate meter reading) without having to contact the host processor 344 for instructions.

Upon receipt of these instructions, microprocessor 370 decodes the instructions and then causes them to be carried out. For example, if the host processor's instructions include commanding one or more of the optical imaging devices to scan the respective meter faces to which they are attached, after the microprocessor 370 has decoded these instructions, the microprocessor 370 commands the controller 384 to transmit such commands to the optical imaging devices from which such scans are requested by the host processor 344.

In response, the controller 384 causes the RF device 377 to transmit such scanning commands to the optical imaging devices from which such scanning is requested, using essentially the same transmission process described above in connection with the optical imaging devices, except that the identifying information provided in the transmission is that of the remote controller transmitting such commands, and information is included in such commands indicating that only those optical imaging devices specifically indicated in the transmission are to generate image data of the respective meter faces to which they are attached. The controller 384 of the remote controller transmitting these commands then causes the RF device 377 of the remote controller to switch into reception mode. When this transmission from the remote controller is received by the imaging devices, it is processed as described above, and the imaging devices transmit to the image data to the remote controller requesting same.

Once the respective image data are received and processed by the RF device 377 of the remote controller requesting same, the image data are transmitted to the controller 384, which stores them in memory 374 association with the respective identifying information of the respective imaging device that produced the data. Processor 370 then retrieves the data in association with the respective identifying information, and transmits the data in association with the respective identifying information to the host processor 344 via the system 400 and network 342.

Once the microprocessor 370 is finished carrying out all of the instructions transmitted from the host processor 344, the microprocessor 370 informs the controller 384 of same. Once the conditions under which the controller 384 is programmed to enter sleep mode are again determined by the controller 384 to be present, the controller 384 then puts the remote controller of which the controller 384 is a part into low power consumption mode in accordance with the aforesaid procedure.

As shown in FIGS. 35 and 36, preferably each of the remote controllers 338, 340 comprises an outer housing 1000 made of the same material as that used for the housing of the optical imaging devices. Housing 1000 includes a rectangular portion 1002 (containing main PC board 854 and RF PC board 850) having two separate portions 1004, 1006 which are attached together at interface portion 1008. A conventional solar cell and rechargeable battery power source 350 is mounted in and extends out of a triangularly shaped protrusion 1010 in portion 1004 of the rectangular portion 1002. Housing 1000 also includes a cylindrical portion 1012 for containing antenna board 623. Clamp mechanism 1020 extends out of portion 1004 and permits the housing 1000 to be removably attached to e.g., a telephone pole (not shown). Knock out button 1022 provides an user-actuable mechanism by which the mechanism 1020 may be released from the pole (not shown). It should be understood that although, for purposes of clarity, connection is not shown being made through the housing 1000 to the wide area network via which communication is made with the host processor 344, such connection should be understood to exist nonetheless.

As shown in FIG. 31, host processor 344 preferably comprises wide area network data transmission/reception interface 516 (which preferably comprises a Microsoft Internet Information Server™-based system), which interfaces the host processor 344 to the network 342 whereby to permit data exchange via the network 342 between the host processor 344 and the controllers 338, 340, and between the host processor 344 and the utility company computer(s) 346. Image data and associated scanner identifying information transmitted from the controllers 338, 340 to the host processor 344 via the network 342 are first received at the host processor 344 by the interface 516. Interface 516 then signals receipt of such data to the administration controller 514, which then issues commands to the interface 516 to transmit the received image data and associated scanner identifying information to network/data base data converter 500, which converter 500 translates the image data and associated scanner identifying information from the data transmission format (e.g., a TCP/IP compatible format, such as file transfer protocol or hypertext transfer protocol) used in the network 342 to the data storage format (e.g., Microsoft SQL format) used in the database 502. After being translated into the data format appropriate for storage in the database 502, the image data and associated scanner identifying information are then transmitted to the database 502 which stores the image data and associated scanner identifying information. Preferably, the database 502 also contains a data file wherein each of the meter scanning devices 316, 318, 320, 322, 324, 326 is associated by its identifying information with information related to the respective utility meter (e.g., the respective make, model, type of utility service being measured by the meter, utility customer whose service is being monitored by the respective meter, and utility company to which the meter readings are to be sent) being scanned by each of the scanning devices. Once the image data and associated scanner identifying information are stored in the database, the administration controller 514 commands the database to associate, based upon the aforesaid data file and the scanner identifying information associated with the image data stored in the database, the respective portions of the image data stored in the database with the aforesaid types of respective information related to the particular utility meters from which the respective portions of image data were generated. The database 502 then stores the respective portions of image data in data files wherein the respective portions of image data are associated with the aforesaid types of respective information related to the particular utility meters from the respective portions of image data were generated.

The respective portions of image data stored in the latter data files are then converted by decoder 504 into the respective data related to the respective phenomena being monitored by the respective meters from which the respective portions of image data were generated. Preferably, decoder 504 accomplishes this by processing the respective portions of image data using computer image processing techniques, including optical character recognition techniques to extract, from the respective portions of image data, data indicative of the respective visual representations of the respective data indicative of measurement of the respective phenomena being monitored by the respective meters, and thereafter, to generate therefrom the respective numeric data indicative of measurement of respective phenomena being monitored by the respective meters.

More specifically, the decoder 504 may be adapted to determine whether the respective image data being processed was generated from an analog dial type of meter (via e.g., appropriate meter type information stored in the host processor's database associating the types of the meters whose faces are being scanned by the system 300 with identifying information of the respective imaging devices scanning those meters), and if the respective image data was generated from a meter type other than an analog dial type of meter, the decoder 504 may utilize Mitec Systems, Inc. Quickstrokes™ software to extract the respective numeric data from the respective image data.

Alternatively, if the decoder 504 determines that the respective image data was generated from an analog dial type of meter, the decoder 504 may be adapted to generate such numeric data by using graphical analysis (e.g., to determine from the image data the directions in which the dial pointers of the analog dial meters are pointing and to thereby derive the numeric data). In this regard, although not shown in the Figures, it should be understood that the meter faces of dial-type meters being scanned by the system 300 are masked with respective overlays for masking out unwanted features (i.e., features not desired to be scanned) of these meters, and the decoder 504 is adapted to contrast enhance the image data generated from these masked meter faces to yield respective, contrast enhanced, two color images. These images are then processed using a data thinning algorithm to reduce the amount of data to be processed by the decoder 504 to produce the numeric data. The center of mass of each of the resulting images is then determined by the decoder 504; this algorithm essentially generates what can be thought of as a respective point lying on a respective line passing through each respective meter dial indicator, and another algorithm is used by the decoder 504 to determine therefrom slope of each of the meter dial indicators. Finally, potentially ambiguous readings slopes (e.g., 3 or 9, etc.) are identified from this information by the decoder 504, these readings are resolved by the decoder based upon the slopes generated above by identifying from the foregoing center of mass information the line segment when ends farther from the dial indicator axis line. Image data generated from meters having plural rows of analog dials are processed by the decoder 504 by utilizing the above center of mass algorithm twice, with a biasing factor being utilized in said algorithm so as to appropriately process each of the dial indicator axis lines.

Once extracted from the respective image data, the respective numeric data is then transmitted to the database 502 by the decoder 504, and is associated in data files with the respective portions of image data from which said respective data was generated.

In this embodiment, administration controller 514 may be programmed (e.g., in accordance with the desires of the utility companies whose operations are being monitored by the system 300) to periodically command report generator 506 to use the information contained in these latter data files (i.e., the data files containing the respective numeric data indicative of the measurement of the respective phenomena being monitored by the respective meters, and the other information stated above, associated therewith) to generate respective report files for each of the utility companies whose operations are being monitored by the system 300, and to store such report files in the database 502 for transmission to the utility company computer 346 for use in further processing (e.g., customer billing). In this embodiment, each such respective report file may contain (depending upon the desires of the respective utility company to which such report file is to be made available) readings of all of the respective utility company's meters made to date since the last generation of such readings by the system 300, in association with the respective utility company customers to whom billings are to be made for services consumed in this time period, and also in association with the respective portions of image data used to generate the respective readings. The report files thus generated are then stored in the database 502. Of course, it will be appreciated that, in addition to storing the most current of such report files, database 502 may also archive previous report files generated prior to generation of the most current report files (e.g.,. for use in statistical trend analysis to determine future trends in utility operations and service consumption, and for later recall in the event of utility customer billing disputes).

Preferably, in this embodiment, once the current report files are stored in database 502, database 502 indicates to administration controller 514 that the current reports files have been stored. Controller 514 then causes the database 502 to transmit the current report files to the network/database data converter 500, which converter 500 converts the report files from the data format that is appropriate for storage in database 502 to that which is suitable for data transmission over network 342. Converter 500 then transmits the converted current report files to the interface 516, and once the interface 516 receives the converted current report files from the converter 500, the interface 516 signals such receipt to the administration controller 514. Controller 514 then causes the network server 516 to transmit to each utility company 346 via the network 342 the respective current converted report file associated therewith.

Report files stored in the database 502 may also be accessed on demand by the utility companies whose operations are being monitored by system 300. For example, when a given utility company wishes to access report files associated with its operation stored in the database 502, the utility company may generate a request for such access in its computer system 346, which system 346 then transmits the request to the host processor 344 (together with any required security information, such as access passwords, etc.) via the network 342. Once transmitted to the host processor 344 via the network 342, the request is first received at the interface server 516, which transmits the request to the administration controller 514. The controller 514 then verifies any required security information, and if the requested access is authorized based upon such verification, controller 514 commands database 502 to transmit to the converter 500 the record files requested by the utility 346. Converter 500 then converts the requested record files to the form appropriate for transmission over the network 342, and transmits the converted record files to the interface server 516. Upon receipt of the converted record files, server 516 signals same to the controller 514, which controller 514 then commands the server 516 to transmit the converted record files via the network 342 to the utility company computer 346 that issued the request for such files.

Alternatively, a given utility company wishing to access report files associated with its operation stored in the database 502 may contact personnel (not shown) operating the host processor 344 via conventional means (e.g., conventional telephone service, not shown). Such personnel may then use user interface means 512 to command administration controller 514 to command database 502 to transmit the requested report files to the converter 500. The converter 500 then converts the requested record files to the form appropriate for transmission over the network 342, and transmits the converted record files to the interface server 516. Upon receipt of the converted record files, server 516 signals same to the controller 514, which controller 514 then commands the server 516 to transmit the converted record files via the network 342 to the utility company computer 346 of the utility company that requested such files.

In this embodiment, host processor 344 also controls initiation of scanning of the utility meters by the optical scanning devices. Preferably, this is accomplished by providing host processor 344 with a programmable meter read timing mechanism 510 which generates controls signals for initiating scanning of the meters by the scanners at periodic time intervals, which time intervals may be selected by a user via the user interface 512 or by appropriate control signals supplied to the host processor 344 from the utility company computer(s), as will be described in greater detail below. The control signals generated by the host timing mechanism 510 may be for causing system-wide scanning of the meters (i.e., scanning of all of the meters in the system 300 by the scanners) and/or for causing only a selected portion of the meters designated by the control signals to be scanned by a respective portion of the scanners. Thus, although for purposes of illustrating how the host processor 344 controls scanning of the meters by the scanners in the system 300 the following discussion will proceed on the basis of an example wherein the timing signals generated by the timer 510 are for causing on selected ones 308, 306 of the meters to be scanned by certain 316, 318 of the scanners, it should be understood that substantially the same process is undertaken when the signals generated by the timer 510 designate that all (or different ones) of the meters are to be scanned.

Returning now to the present discussion, the control signals generated by the read timer 510 are supplied to the administration means 514 which, in response, commands paging initiator 508 to supply signals to a conventional paging system (not shown) for causing the paging system to send out paging signals to the remote controller 338 that controls the scanners 316, 318 that are to scan the meters 308, 306 designated by the control signals generated by the timing mechanism. These paging signals are then received by the remote controller 338, which processes them in the above-described manner, whereby to cause scanners 316, 318 to generate image data of meters 308, 306, and to cause same to be sent to the host processor 344 for processing.

It should also be understood that alternatively, a user may select one or more optical imaging devices for demand reads via commands issued at user interface 512 or remotely from the utility computer 346 via network 342, which commands cause administration controller 514 to command page initiation via initiator 508 of those remote controller(s) responsible for the selected imaging device. Preferably, the utility computer 346 includes means (not shown) for permitting the image data to be displayed in the form of one or more computer-generated images of the respective meter face or faces from which the image data was obtained.

Preferably, in this embodiment, each of the functional components of host processor 344 illustrated block form in FIG. 31 are embodied as one or more distributed computer program processes running on one or more conventional general purpose computers networked together via conventional computer networking means. More preferably, each of these functional components is embodied by running distributed computer program processes (based upon the Microsoft Visual Basic™ language) on IBM-type, Intel 80×86 (and most preferably, Pentium™) microprocessor-based personal computers networked together by conventional networking means and including such additional conventional computer, and telephonic and network communications hardware (e.g., modems) and software as is appropriate to enable performance of the stated functionality. For example, decoder 504 may comprise a plurality of computer software modules (e.g., comprising optical character recognition software modules for generating numeric data from image data from the various types of meter display means being read by the system 300) running on one or more networked computers. Also preferably, these personal computers run the Microsoft Windows™, Windows NT™, Windows 95™, and/or DOS™ operating systems. However, the various functional components of the host processor 344 may alternatively be constructed out of custom, dedicated electronic hardware and software, without departing from this embodiment of the present invention. Further alternatively, rather than use IBM-type PC's, host processor 344 may instead utilize SUN™ TM and/or conventional RISC-based workstations.

Thus, it is evident that there has been provided a remote data acquisition and monitoring system that fully satisfies both the aims and objectives hereinbefore set forth. Although the present invention has been described in connection with preferred embodiments and methods of use, it will be apparent to those skilled in the art that many variations, modifications, and alternatives thereof are possible without departing from the present invention. For example, although the present invention has been described in connection with preferred embodiments for use in monitoring and controlling utility service usage and/or consumption of utility services by utility customers, it should be understood that the present invention is not intended to be limited to such preferred embodiments and uses. Rather, it should be understood that if appropriately modified in ways apparent to those skilled in the art, the above-described embodiments of the present invention may be used in other remote data acquisition and processing applications, such as remote acquisition and processing of data obtained from distributed pollution metering devices for use e.g. in pollution analysis and/or control applications, remote acquisition and processing of information gathered from metering devices which generate data related to vending machine usage and/or operation, and other uses.

Additionally, as shown in FIG. 18, a wireless communications link (also of the spread-spectrum radio frequency type, and of the same construction as that of links 328, 334) 336 may also be provided between controllers 338, 340 for permitting each of the controllers 338, 340 to ascertain whether the other controller is functioning properly. Preferably, each one of the controllers 338, 340 periodically transmits a predetermined "ping" or inquiry signal via the link 336 to the other controller which, if the other controller is functioning properly, causes the other controller to transmit a predetermined response signal via the link 336 to the controller that transmitted the inquiry signal. If after a predetermined number of transmissions of the inquiry signal, no response signals or incorrect response' signals are received from the controller to which such inquiry signals were sent by the controller transmitting the inquiry signals, the controller transmitting the inquiry signals assumes that the controller to which the inquiry signals were transmitted has failed, signals this failure condition via the wide area network 342 to the remote host computer processor 344. Host processor 344 may then transmit to the controller a number of predetermined inquiry signals for generating predetermined responses by the failed controller for verifying (in a manner similar to that used by the controller signaling the failure condition to the host processor) whether the failed controller has in fact failed, or whether other conditions exist which have given rise to signaling of the failure condition to the host processor (e.g., failure of the controller signaling the failure condition to the host processor). If the controller's failure condition is verified by the host processor, the host processor may inform via the user interface 512 personnel (not shown) operating the system 300 of the failure of the failed controller, so as to permit such personnel to undertake steps to correct such failure condition in the failed controller, transmit control signals to the failed controller to deactivate same, and transmit control signals to a normally functioning controller that is closest to the failed controller to cause the normally functioning controller to assume the role of a backup or redundant controller relative to the failed controller (i.e., assume the control and image data processing functions of the failed primary controller). Redundant wireless communications links (also of the spread-spectrum radio frequency type, and of the same construction as that of links 328, 334) 330, 332 may be provided between controller 340 and imaging devices 316, 318, 320, and between controller 338 and imaging devices 322, 324, 326, respectively, to permit controller 338 to assume the role of a backup controller relative to controller 340 in event of failure of controller 340, and to permit controller 340 to assume the role of a backup controller relative to controller 338 in event of failure of controller 338.

Likewise, the controllers 338, 350 may be adapted to "ping" the imaging devices under their respective commands to determine whether their imaging devices are functioning properly, and if not, to determine such failure condition to the host processor 344.

Other modifications are also possible. For example, the controllers 384 in the remote controllers 338, 340 may be programmed to initiate timed scanning of the meters and transfer of the image data generated therefrom to the host processor 344, thereby eliminating the need for read timer 510 in host processor 344.

Also alternatively, if appropriately modified in ways apparent to those skilled in the art, the modem means of the remote controllers 338, 340, and the interface means 516 of the host processor 344, may be replaced with appropriate U-NII communications devices for permitting wireless exchange of data between the controllers 338, 340 and host processor 344 at frequencies located between 5.15 and 5.35 GHz or 5.725 and 5.825 GHz.

Figure 21A:
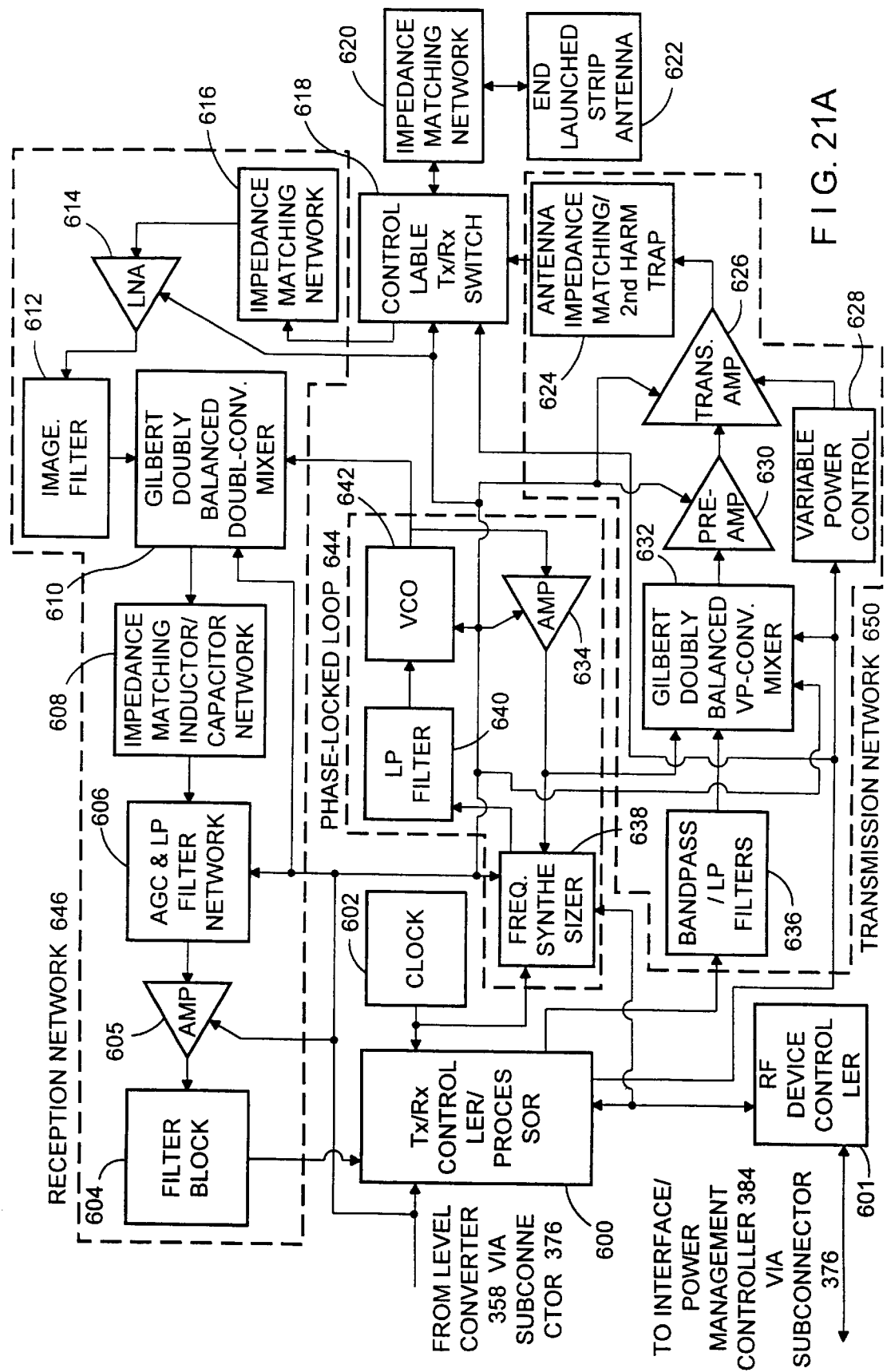
FIG. 21A is a functional block diagram of a modification of the device of FIG. 21.
Figure 22:
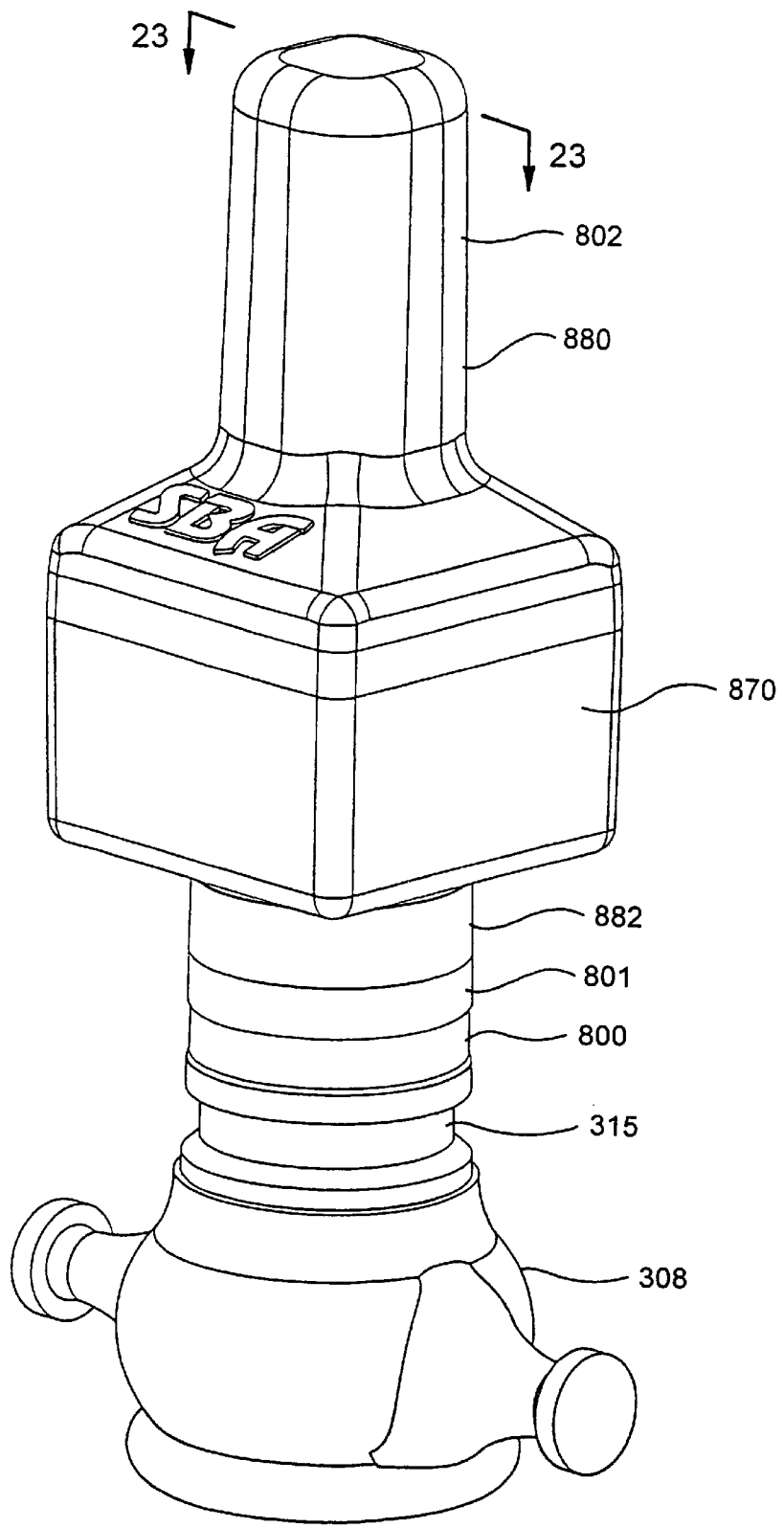
FIG. 22 is an outer, perspective view of one type of optical imaging device of FIG. 18, which device is for use, and is shown in conjunction with, a typical non-machine-readable or machine-readable water service type of utility meter.
Figure 23:
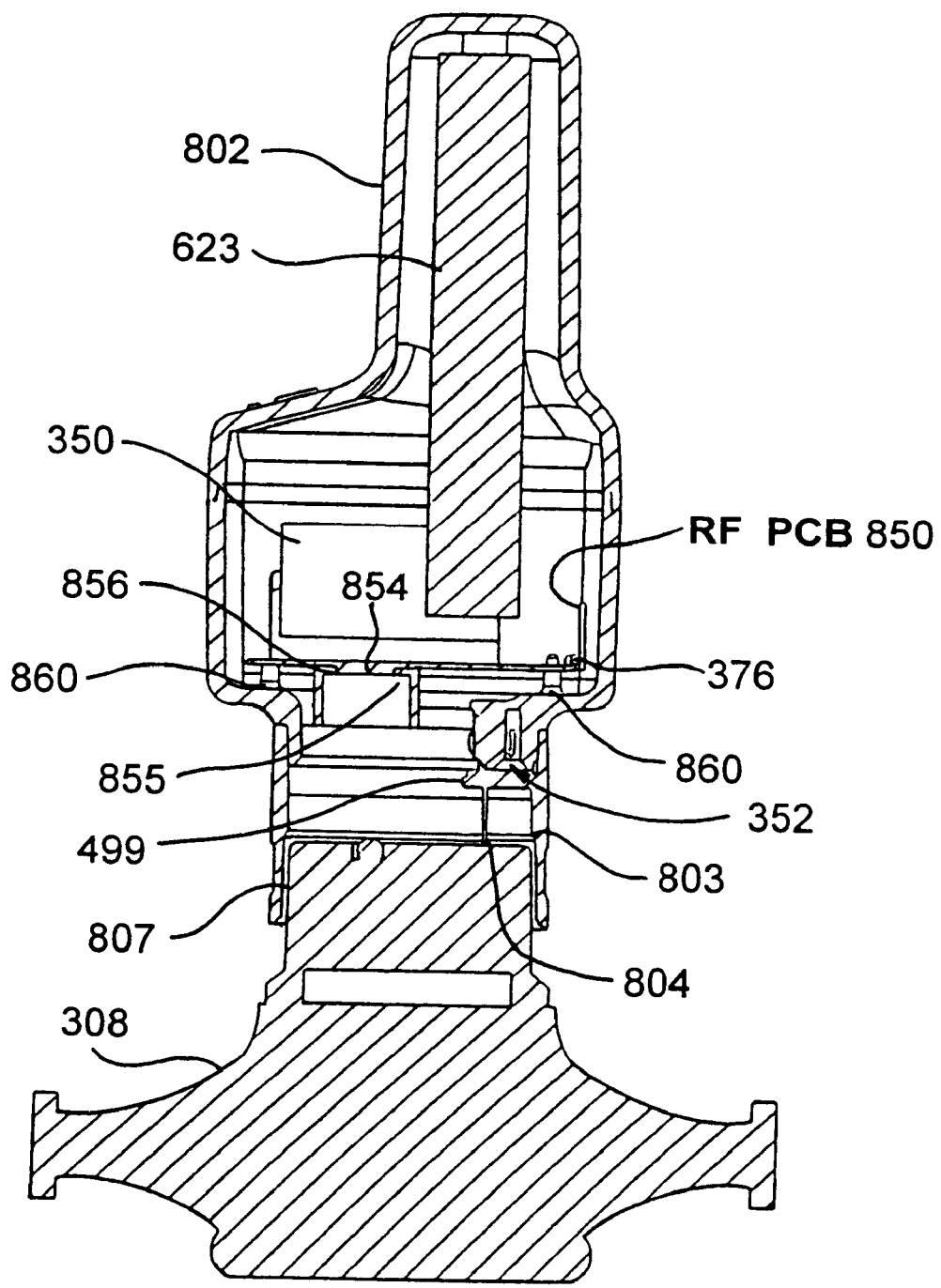
FIG. 23 is a cross-sectional view taken along lines 23—23 of the imaging device of FIG. 22.

Additionally, one alternative construction 377' of device 377 is shown in FIG. 21A. It should be understood that unless specifically stated to the contrary, device 377' includes substantially the same components and operates in substantially the same manner as device 377. Device 377' includes RF device controller 601 which preferably comprises an ATMEL 90S1200 or MICROCHIP P1C12C508 chip mounted on board 850. Controller 601 is connected to synthesizer 638 and to controller 384 (via subconnector 376), and may also be connected to processor 600. In this alternative construction, controller 601 controls the central transmission/reception frequencies of the device 377 by supplying appropriate controls signals, of the type discussed previously to synthesizer 638. Controller 601 generates these control signals based upon control signals supplied to the controller 601 from microcontroller 370 via controller 384 and subconnector 376. In this alternative construction, these control signals from the controller 370 are adapted to cause the controller 601 to select the central transmission/reception frequency of the device 377 from three possible central frequency channels of 911.5 MHz, 915 MHz, and 918.5 MHz; controller 601 may also be programmed to cause the device 377 to enter a test or diagnostic mode of operation for determining whether device 377 is functioning properly, when appropriate control signals for commanding entry into such mode of operation are received by the controller 601 from the controller 370.

Also alternatively, as shown in FIG. 21A, controller 601 may also be connected to the processor 600, and may be programmed to control data encoding and decoding by the processor 600 based upon control signals received by the controller 601 from the microcontroller 370. Additionally, controller 601 (rather than microprocessor 370) may be programmed (in the manner described previously in connection with microprocessor 370) to adjust the nominal transmission/reception frequencies of the device 377 to compensate for tuning drift associated with component age so as to ensure that the device 377 actually transmits and receives at the frequencies to which it is desired to be tuned. Further alternatively, if the embodiment 300 is further modified in ways apparent to those skilled in the art so as to permit the controller 601 to be powered-up continually, controller 601 (rather than microprocessor 384) may maintain a constant running clock of elapsed time since installation of the device of which the controller 601 is a part, and to use this information in adjusting the nominal transmission/reception tuning frequencies of the device 377 to account for tuning drift due to component aging.

Additional modifications are also possible. For example, rather than comprising an 8-bit Motorola 68HC811E2FN microprocessor, microprocessor 370 may alternatively comprise an appropriately clocked, 16-bit Motorola MC68HC 12A4 microprocessor having built-in memory access circuitry for permitting direct access and control of the memories 372, 374 by the microprocessor 370 without the need to utilize external direct memory access circuitry, and also having phase lock loop/oscillator circuitry for receiving the clock input signal. This 16-bit microprocessor exhibits faster processing and less power consumption than the aforesaid 8-bit microprocessor. In this alternative construction, it is preferred that the microprocessor 370 directly control the transmission/reception device 377, rather than control the device 377 via the controller 384.

Other modifications are also possible. For example, in order to simplify the power management scheme in the controllers 338, 340, one or more of the controllable switches 356, 360, 362 may be eliminated and/or the configured differently so as to permit different components to power up and power down together (i.e., different components from those specified previously).

Similarly, if the optical imaging devices are appropriately modified in ways apparent to those skilled in the art, switches 360, 362 may be made to independently control supply of power from switch 356 to the scanning system 364 and transmission device 377, respectively, based upon control signals supplied to the switches 360, 362 by the microprocessor 370. In this alternative construction, control of supply of power to the microprocessor 370 and memories 372, 374 may be controlled by the controller 384 via the switch 356.

Additionally, the optical imaging devices may also be modified to include means (not shown) for permitting the controller 384 to control and/or exchange information with systems (not shown) for managing various customer energy consumption and/or consumption of other utility services at the customer site via conventional CE-bus and LonWorks protocols.

In yet another modification, the imaging system 364 may utilize a VLSI Vision 5430 chip (not shown) or a FUGA 15D chip (marketed by C-Cam, and also not shown) for scanning the meter face. More specifically, when the imaging system 364 comprises a VLSI Vision 5430 chip, timing clock signals and pixel and frame scanning validation control signals are provided to the VLSI Vision 5430 chip by the microprocessor 370, and control register serial input/output signals are provided bi-directionally between the microprocessor 370 and the VLSI Vision 5430 chip. Serial input/output clock signals and image data are provided from the VLSI 5430 chip to the microprocessor 370, with the image data being amplified by an amplifier (not shown) prior to entering the VLSI 5430 chip and undergoing analog to digital conversion by an analog to digital converter comprised within the microprocessor 370.

The FUGA 15D comprises its own analog to digital converter (not shown) for converting the image data from analog to digital form prior to transmitting same to the microprocessor 370, and when the imaging system 364 comprises the FUGA 15D chip, the microprocessor 370 is adapted to control the FUGA 15D chip via signals provided to the FUGA 15D via the microprocessor's address and data lines (not shown) and via additional scanning control and timing signals provided to the FUGA 15D from the microcontroller 370, essentially by utilizing a direct memory access scheme in which the FUGA 15D writes its image data directly to the data bus of the microcontroller 370. Also, it is preferred that when the imaging system 364 comprises the FUGA 15D chip the power management scheme in the optical imaging device is modified such that switch 362 is eliminated and the imaging system 364 is powered up and down automatically with the microprocessor 370 and memories 372, 374.

Also, the operational flows of each of the controllers 338, 340 and each of the optical imaging devices 316, 318, 320, 322, 324, 326 may take other forms. For example, each time one 338 of the controllers 338, 340 is booted up or awakens from sleep mode, the controller 338 may first determine whether it is desired for the controller 338 to undertake initialization of communications with optical imaging devices 316, 318, 320 within its desired optical imaging device geographic control region. This determination may be accomplished by checking to see whether certain predetermined flags in the controller's memory have set (e.g, at time of manufacture of the controller, which flags are changed after such initialization), whether the controller has been moved from a previous control region (e.g., by comparing previous readings stored in the controller's memory and generated by a conventional global positioning system (not shown) comprised within the controller with current readings provided by the global positioning system), and/or being commanded to undertake such initialization by control signals supplied thereto by the host processor 344. If the controller 338 determines that it is desired to undertake such initialization, the controller 338 informs the host processor 344 as to the controller's initialization status and initializes itself to command scheduled readings in accordance with the host processor's schedule for same. Thereafter, the controller utilizes its reception/transmission device 377 to listen for current radio communications traffic from the other controller 340 within the control region of the controller 338. The controller 338 records data indicative of such traffic activity in memory, and once the other controller 340 has been determined to be finished communicating with the optical imaging devices with the control region of the controller 340, the controller 338 analyzes the traffic data to determine how to fit (i.e., time) its communication with the optical imaging devices in its control region within communications time table of the other controller 340, so as to prevent cross-talk of the controllers 338, 340. Thereafter, the controller 338 enters sleep mode.

If, however, it is determined that the above initialization has already been accomplished, upon awakening or booting up, the controller 338 may determine whether it is desired to take a prescheduled read of the meters within its control region. If such prescheduled read is not desired, after synchronizing its internal meter read schedule with those of the optical imaging devices under its command (i.e., if those imaging devices are adapted to perform scheduled meter reads without being initiated by the controller 338), the controller 338 may poll its control region to determine whether the optical imaging devices within its control region have been changed (i.e., whether optical imaging devices have been added or removed). If such change has occurred, the controller 338 may be programmed to modify its internal listing of optical imaging devices within its control region, and negotiate (e.g., exchange appropriate identifying and information, etc.) with any new optical imaging devices within the controller's control region so as to establish the controller's control over such new imaging devices; the updated information concerning the imaging devices under the controller's control is then transmitted to the host processor 344 for recording in and use by same.

However, if no such change has occurred, the controller 338 may be adapted to determine (via e.g., information stored in memory or by polling the imaging devices within its control region) whether any transfers of image data from the imaging devices under its command had been initiated but not completed when the controller 338 was last awake, and to cause any such image data to be transmitted to controller 338 for transmission to the host processor 344. Of course, if initiation of a prescheduled read is desired, the controller 338 may prompt generation and transmission of appropriate image data from the imaging devices under its command, and transmit such image data to the host processor 344. Thereafter, the controller 338 may enter sleep mode.

Likewise, each of the optical imaging devices may be adapted to determine upon booting up or awaking whether it is desired for the imaging device to undertake an initialization of its communications with a remote mangagement controller/processor. This determination may be made based upon whether predetermined flags in the imaging device's memory have set (e.g, at time of manufacture, which flags are changed after such initialization), or whether the imaging device has been moved from a previous control region (e.g., by comparing previous readings stored in memory and generated by a conventional global positioning system (not shown) comprised within the imaging device with current readings provided by the global positioning system). If such initialization is determined to be desired, the optical imaging device may "listen" in its geographic area using its device 377 for polling by one of the controllers 338, 340 for changes in the imaging devices in its control region, and when the imaging device determines that such polling has occurred, the imaging device may negotiate as described above with that controller and be included in the controller's list of imaging devices being controlled by that controller, whereafter the imaging device enters sleep mode. If, however, such initialization is not desired, the imaging device may "listen" via its device 377 for commands from the remote management controller/processor with which it last negotiated. If such commands are not forthcoming after a predetermined number of "listening" time outs, the imaging device may be adapted to seek out redundant controller by which to be controlled, in the manner described more fully above, whereafter the imaging device may enter sleep mode.

Accordingly, the present invention is intended to embrace all such variations, modifications, and alternatives as may be included within the spirit and scope of the hereinafter appended claims.

What is claimed is:

1. A data acquisition and processing system comprising at least one optical imaging device for generating computer-readable image data of a visual representation generated by a metering device of data related to at least one phenomenon being monitored by said metering device, and a host computer processor remotely located from said optical imaging and metering devices, said host processor being for generating the data related to said phenomenon from said image data and also for storing said image data, the system further comprising, at least one controller for generating control signals for controlling generation of said image data by said at least one optical imaging device and for gathering said image data generated by said imaging device for transmission to said host processor, a backup controller for controlling generation of said image data by said optical imaging device and for gathering said image data for transmission to said host processor, upon occurrence of failure condition of said at least one controller, and at least one communications link between said controllers for permitting exchange of information between said controllers.

2. A data acquisition and processing system comprising at least one optical imaging device for generating computer-readable image data of a visual representation generated by a metering device of data related to at least one phenomenon being monitored by said metering device, and a host computer processor remotely located from said optical imaging and metering devices, said host processor being for generating the data related to said phenomenon from said image data and also for storing said image data, the system further comprising, at least one controller for generating control signals for controlling generation of said image data by said at least one optical imaging device and for gathering said image data generated by said imaging device for transmission to said host processor, a wireless communications link between said at least one controller and said imaging device for permitting transmission of said control signals from said at least one controller to said optical imaging device and transmission of said image data to said at least one controller, and wherein said at least one controller is also for transmitting image data received from said optical imaging device to said host processor, said wireless communications link comprising one radio transmission/reception device included in said at least one controller and another radio transmission/reception device included in said at least one imaging device, each of said transmission/reception devices comprising a phase-locked loop for generating output signals for being mixed with received radio signals for facilitating generation of incoming data signals and also for being mixed with outgoing data signals for facilitating generation of radio signals to be transmitted, said phase-locked loop having a voltage controlled oscillator for generating said output signals and a phase detector for generating feedback control signals for controlling frequency of the output signals generated by said oscillator, said phase detector including an electronically programmable frequency synthesizer for generating said feedback control signals based upon reference clock signals, said output signals, and digital control signals supplied to said synthesizer.

3. A data acquisition and processing system comprising at least one optical imaging device for generating computer-readable image data of a visual representation generated by a metering device of data related to at least one phenomenon being monitored by said metering device, and a host computer processor remotely located from said optical imaging and metering devices, said host processor being for generating the data related to said phenomenon from said image data and also for storing said image data, the system further comprising, at least one controller for generating control signals for controlling generation of said image data by said at least one optical imaging device and for gathering said image data generated by said imaging device for transmission to said host processor, a wireless communications link between said at least one controller and said imaging device for permitting transmission of said control signals from said at least one controller to said optical imaging device and transmission of said image data to said at least one controller, and wherein said at least one controller is also for transmitting image data received from said optical imaging device to said host processor, said wireless communications link comprising one radio transmission/reception device included in said at least one controller and another radio transmission/reception device included in said at least one imaging device, each of said transmission/reception devices comprising a phase-locked loop for generating output signals for being mixed with received radio signals for facilitating generation of incoming data signals and also for being mixed with outgoing data signals for facilitating generation of radio signals to be transmitted, said phase-locked loop having a voltage controlled oscillator for generating said output signals and a phase detector for generating feedback control signals for controlling frequency of the output signals generated by said oscillator, said phase detector including an electronically programmable frequency synthesizer for generating said feedback control signals based upon reference clock signals, said output signals, and digital control signals signals supplied to said synthesizer, and each of said at least one imaging device including a microprocessor for generating said digital control signals whereby to permit said microprocessor to control generation of said feedback control signals by said synthesizer.

4. A data acquisition and processing system comprising at least one optical imaging device for generating computer-readable image data of a visual representation generated by a metering device of data related to at least one phenomenon being monitored by said metering device, and a host computer processor remotely located from said optical imaging and metering devices, said host processor being for generating the data related to said phenomenon from said image data and also for storing said image data, the system further comprising, at least one controller for generating control signals for controlling generation of said image data by said at least one optical imaging device and for gathering said image data generated by said imaging device for transmission to said host processor, a wireless communications link between said at least one controller and said imaging device for permitting transmission of said control signals from said at least one controller to said optical imaging device and transmission of said image data to said at least one controller, and wherein said at least one controller is also for transmitting image data received from said optical imaging device to said host processor, said wireless communications link comprising one radio transmission/reception device included in said at least one controller and another radio transmission/reception device included in said at least one imaging device, each of said transmission/reception devices comprising a phase-locked loop for generating output signals for being mixed with received radio signals for facilitating generation of incoming data signals and also for being mixed with outgoing data signals for facilitating generation of radio signals to be transmitted, said phase-locked loop having a voltage controlled oscillator for generating said output signals and a phase detector for generating feedback control signals for controlling frequency of the output signals generated by said oscillator, said phase detector including an electronically programmable frequency synthesizer for generating said feedback control signals based upon reference clock signals, said output signals, and digital control signals supplied to said synthesizer, each of said at least one imaging device including a microprocessor for generating said digital control signals whereby to permit said microprocessor to control generation of said feedback control signals by said synthesizer, and each of said at least one imaging device including a temperature sensor, and said microprocessor being adapted to control the generation of said feedback control signals by said synthesizer based at least partially upon temperature sensed by said sensor.

5. A data acquisition and processing system comprising at least one optical imaging device for generating computer-readable image data of a visual representation generated by a metering device of data related to at least one phenomenon being monitored by said metering device, and a host computer processor remotely located from said optical imaging and metering devices, said host processor being for generating the data related to said phenomenon from said image data and also for storing said image data, the system further comprising, at least one controller for generating control signals for controlling generation of said image data by said at least one optical imaging device and for gathering said image data generated by said imaging device for transmission to said host processor, a wireless communications link between said at least one controller and said imaging device for permitting transmission of said control signals from said at least one controller to said optical imaging device and transmission of said image data to said at least one controller, and wherein said at least one controller is also for transmitting image data received from said optical imaging device to said host processor, said wireless communications link comprising one radio transmission/reception device included in said at least one controller and another radio transmission/reception device included in said at least one imaging device, each of said transmission/reception devices comprising a phase-locked loop for generating output signals for being mixed with received radio signals for facilitating generation of incoming data signals and also for being mixed with outgoing data signals for facilitating generation of radio signals to be transmitted, said phase-locked loop having a voltage controlled oscillator for generating said output signals and a phase detector for generating feedback control signals for controlling frequency of the output signals generated by said oscillator, said phase detector including an electronically programmable frequency synthesizer for generating said feedback control signals based upon reference clock signals, said output signals, and digital control signals supplied to said synthesizer, each of said at least one imaging device including a microprocessor for generating said digital control signals whereby to permit said microprocessor to control generation of said feedback control signals by said synthesizer, each of said at least one imaging device including a temperature sensor, and said microprocessor being adapted to control the generation of said feedback control signals by said synthesizer based at least partially upon temperature sensed by said sensor, and said microprocessor being adapted to determine age of said transmission/reception device whose synthesizer is controlled by said microprocessor and to control the generation of said feedback control signals based at least partially upon said age.

6. A system according to claim 2, wherein each said transmission/reception device includes a transmission network, a reception network, and a controllable switch, said switch being for controllably connecting and disconnecting each of said networks to an antenna whereby to permit the antenna to operate in only one of a transmission mode and reception mode at any given time.

7. A system according to claim 6, wherein said antenna is adapted to be primarily resonant at 915 MHz.

8. A system according to claim 6, wherein said switch is adapted to be controlled based upon a transmission/reception mode select signal, and said transmission network is adapted to be disabled when said select signal is in a condition indicative of reception mode.

9. A system according to claim 8, wherein said transmission network includes a transmission amplifier network adapted to be disabled when said select signal is in said condition indicative of reception mode and to be enabled when said select signal is in a condition indicative of transmission mode.

10. A system according to claim 9, wherein said transmission network also includes a frequency up-converter mixer for mixing said output data signals and said output signals of oscillator, said mixer being adapted to be disabled when said select signal is in said condition indicative of reception mode and to be enabled when said select signal is in a condition indicative of transmission mode.

11. A system according to claim 6, wherein said reception network includes a frequency down-converter mixer for mixing said output signals and at least a portion of said radio signals so as to generate a pair of differential output signals for facilitating generation of said incoming data signals.

12. A system according to claim 11, wherein said mixer comprises a double balanced Gilbert mixer.

13. A system according to claim 10, wherein said mixer comprises a double balanced Gilbert mixer.

14. A system according to claim 9, wherein said transmission amplifier network is also adapted to have a controllable output gain selectable based upon strength of said select signal when said select signal is in said condition indicative of transmission mode.

15. A system according to claim 14, further comprising a controllable attenuator for controlling said strength of said select signal.

* * * * *